United States Patent
Konkle

(10) Patent No.: US 9,067,150 B2
(45) Date of Patent: *Jun. 30, 2015

(54) SYSTEM AND METHOD FOR PROVIDING INTERACTIVE CONTENT FOR MULTIPLE NETWORKED USERS IN A SHARED VENUE USING SHORT MESSAGING SERVICE COMMUNICATION

(75) Inventor: Tim Konkle, El Dorado Hills, CA (US)

(73) Assignee: Lamplight Games, El Dorado Hills, CA (US)

( * ) Notice: Subject to any disclaimer, the term of this patent is extended or adjusted under 35 U.S.C. 154(b) by 1138 days.

This patent is subject to a terminal disclaimer.

(21) Appl. No.: 12/009,368

(22) Filed: Jan. 19, 2008

(65) Prior Publication Data

US 2009/0186700 A1    Jul. 23, 2009

(51) Int. Cl.
| | |
|---|---|
| G06F 15/173 | (2006.01) |
| A63J 25/00 | (2009.01) |
| H04L 29/06 | (2006.01) |
| A63F 13/30 | (2014.01) |
| G06Q 10/10 | (2012.01) |

(52) U.S. Cl.
CPC .............. *A63J 25/00* (2013.01); *H04L 29/06* (2013.01); *A63F 13/12* (2013.01); *A63F 2300/537* (2013.01); *A63F 2300/8023* (2013.01); *A63F 2300/8064* (2013.01); *A63F 2300/8088* (2013.01); *G06Q 10/10* (2013.01)

(58) Field of Classification Search
CPC .......................... H04L 29/08072; H04L 29/06
USPC ................ 709/203, 220, 227, 222, 228, 224; 463/11, 26
See application file for complete search history.

(56) References Cited

U.S. PATENT DOCUMENTS

| | | | |
|---|---|---|---|
| 4,477,069 A | 10/1984 | Crudgington | |
| 4,976,438 A | 12/1990 | Tashiro et al. | |
| 5,215,464 A | 6/1993 | Marshall et al. | |
| 5,618,045 A | 4/1997 | Kagan et al. | |
| 5,835,715 A | 11/1998 | Dahl | |
| 6,257,982 B1 | 7/2001 | Rider et al. | |
| 6,346,045 B2 | 2/2002 | Rider et al. | |
| 6,363,075 B1 * | 3/2002 | Huang et al. | 370/412 |
| 6,470,180 B1 | 10/2002 | Kotzin et al. | |
| 6,629,129 B1 | 9/2003 | Bookspan et al. | |
| 6,760,595 B2 | 7/2004 | Inselberg | |
| 6,766,374 B2 | 7/2004 | Trovato et al. | |
| 6,860,810 B2 | 3/2005 | Cannon et al. | |
| 7,056,217 B1 | 6/2006 | Pelkey et al. | |
| 7,092,670 B2 | 8/2006 | Tanaka et al. | |
| 7,124,372 B2 | 10/2006 | Brin | |
| 7,169,052 B2 | 1/2007 | Beaulieu et al. | |
| 7,203,665 B2 | 4/2007 | Donner | |

(Continued)

*Primary Examiner* — Khanh Dinh
(74) *Attorney, Agent, or Firm* — Kunzler Law Group

(57) ABSTRACT

Computer-implemented systems and methods supporting multiple networked users in a shared venue using short messaging service communication is described. In a particular embodiment, the system includes a game server, a display system in data communication with the game server, the display system including a shared screen, and a plurality of communication devices in data communication with the game server, each communication device including a text messaging transceiver to convey options and selections between the communication device and the game server, each communication device including functionality to use text messaging to interact with a game controlled by the game server, at least a portion of the game being displayable on the shared screen.

22 Claims, 39 Drawing Sheets

(56) References Cited

U.S. PATENT DOCUMENTS

| | | |
|---|---|---|
| 7,240,093 B1 | 7/2007 | Danieli et al. |
| 7,278,920 B1 * | 10/2007 | Klamer et al. ............... 463/34 |
| 7,280,975 B1 | 10/2007 | Donner |
| 7,287,052 B2 | 10/2007 | Chen et al. |
| 7,344,084 B2 | 3/2008 | DaCosta |
| 7,458,029 B2 * | 11/2008 | Agrawala et al. ............ 715/744 |
| 7,458,894 B2 | 12/2008 | Danieli et al. |
| 7,518,501 B2 | 4/2009 | Huston |
| 7,636,783 B2 | 12/2009 | Heutchy et al. |
| 7,702,545 B1 * | 4/2010 | Compton et al. ............ 705/26.9 |
| 7,796,155 B1 | 9/2010 | Neely et al. |
| 7,853,474 B2 | 12/2010 | Ullah |
| 7,881,702 B2 | 2/2011 | Heyworth et al. |
| 7,938,727 B1 * | 5/2011 | Konkle ........................ 463/42 |
| 7,983,611 B2 | 7/2011 | Rao |
| 8,842,841 B2 * | 9/2014 | Hook et al. ................... 380/284 |
| 2001/0027128 A1 | 10/2001 | Rider et al. |
| 2002/0023265 A1 | 2/2002 | Metcalf |
| 2003/0036428 A1 | 2/2003 | Aasland |
| 2005/0071481 A1 | 3/2005 | Danieli |
| 2005/0245317 A1 | 11/2005 | Arthur et al. |
| 2006/0046849 A1 | 3/2006 | Kovacs |
| 2006/0068917 A1 | 3/2006 | Snoddy et al. |
| 2006/0111186 A1 | 5/2006 | Hattori |
| 2007/0033419 A1 * | 2/2007 | Kocher et al. ................ 713/193 |
| 2007/0105613 A1 | 5/2007 | Adams et al. |
| 2007/0111794 A1 | 5/2007 | Hogan et al. |
| 2007/0150368 A1 * | 6/2007 | Arora et al. .................. 705/26 |
| 2008/0102954 A1 | 5/2008 | Schueller |
| 2008/0139167 A1 * | 6/2008 | Burgess ...................... 455/404.1 |
| 2008/0184127 A1 * | 7/2008 | Rafey et al. ................. 715/736 |
| 2008/0214273 A1 * | 9/2008 | Snoddy et al. ............... 463/19 |
| 2008/0216022 A1 * | 9/2008 | Lorch et al. ................. 715/847 |
| 2008/0220878 A1 | 9/2008 | Michaelis |
| 2008/0263446 A1 * | 10/2008 | Altberg et al. ............... 715/706 |
| 2008/0268931 A1 * | 10/2008 | Alderucci et al. ............. 463/11 |
| 2008/0301228 A1 * | 12/2008 | Flavin ......................... 709/204 |
| 2009/0089379 A1 * | 4/2009 | Pegg ........................... 709/206 |
| 2009/0093300 A1 * | 4/2009 | Lutnick et al. ............... 463/26 |
| 2009/0111458 A1 * | 4/2009 | Fox et al. .................... 455/422.1 |
| 2009/0186700 A1 | 7/2009 | Konkle |
| 2010/0223314 A1 * | 9/2010 | Gadel et al. .................. 709/200 |
| 2011/0088071 A1 | 4/2011 | Yerli |
| 2011/0145863 A1 | 6/2011 | Alsina et al. |
| 2011/0159962 A1 | 6/2011 | Yerli |
| 2011/0185437 A1 | 7/2011 | Tran et al. |
| 2011/0223996 A1 | 9/2011 | Yerli et al. |
| 2013/0174273 A1 * | 7/2013 | Grab et al. ................... 726/28 |
| 2013/0294755 A1 * | 11/2013 | Arme et al. .................. 386/344 |
| 2014/0096215 A1 * | 4/2014 | Hessler, Christian J. ......... 726/7 |

\* cited by examiner

SYSTEM AND METHOD FOR PROVIDING INTERACTIVE CONTENT FOR MULTIPLE NETWORKED USERS IN A SHARED VENUE USING SHORT MESSAGING SERVICE COMMUNICATION

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006-2008, Tim Konkle. All Rights Reserved.

BACKGROUND

1. Technical Field

This disclosure relates to systems and methods supporting multiple networked users in a shared venue using short messaging service communication.

2. Related Art

The seats of a motion picture theater or similar entertainment facility could be equipped with individual user stations, each having its own games and its own video screen, such as the arrays of user stations that are found in conventional video game arcades. However, the enjoyment of the game is heightened by a large screen, and is enriched by sharing the collective reactions of a large number of other concurrent users, playing a single or multiple interactive games.

Existing popular video games include those where only a single user can play at a time, and others that allow two or several assembled users to play simultaneously. Neither of these types of games can be played concurrently by a large number of multiple users.

Recently, a third variety of video game has appeared which allows a large number of multiple users to play concurrently, but from remote user stations that are linked by means of a local area network or the Internet. The users are not all assembled together so there is no opportunity to share the experience of each other's reactions.

Other video game systems and facilities have also been proposed that permit play by multiple users. Rider et al. (U.S. Pat. No. 6,257,982), for example, discloses a system and facility for video games with a large number of user stations and a single screen upon which the video game images are displayed visible from each of the user stations. The system allows for simultaneous use by a large number of users who share the experience of playing the game and their combined reactions together. The system is particularly suited for installation in a motion picture theater or similar entertainment facility.

Crudgington, Jr. (U.S. Pat. No. 4,477,069), for example, discloses a futuristic styled theatre which contains a plurality of game consoles, one for each player. All players participate in the same performance which is controlled by a master computer but each player has his own monitor to view the game.

Tashiro et al. (U.S. Pat. No. 4,976,438) discloses a system where a number of players are arranged in a circle at individual consoles. The players can simultaneously play a game using a common screen (110) which surrounds the players. The apparatus contains a wide variety of mechanical systems to move the seats used by the players.

Marshall et al. (U.S. Pat. No. 5,215,464) discloses a system for law enforcement or military weapons training. Multiple trainees (who are on foot and mobile) interact with a simulated training exercise displayed on a single large video screen. The trainees utilize firearms to shoot an infrared beam at opponents on the screen. The infrared beams are detected by the computer system running the simulation and the system will fire back an infrared beam in the direction of the originating shot. Trainees wear detectors that indicate if they have been hit.

Kagan et al. (U.S. Pat. No. 5,618,045) discloses a system of multiple hand held playing devices that communicate over a wireless LAN to allow multiple players to play the same game. The individual playing devices may also communicate to a large display to show the game scenario.

Dahl (U.S. Pat. No. 5,835,715) discloses a theatre based system for allowing users to make choices as to what content they wish to see on the main screen, sub-screens of the main theatre screen, or a screen in their individual seat computer. The theatre also incorporates a series of robots in front of the screen to simulate an imaginary creature to add to the video presentation.

None of the systems known to the inventor disclose or suggest a gaming system for use in a motion picture theater or similar public venue in which a large number of simultaneous multiple users can share the same game or multiple game experiences together using short messaging service communication, heightened and enriched by also sharing in the reactions of the total group.

Thus, systems and methods supporting multiple networked users in a shared venue using short messaging service communication is needed.

BRIEF DESCRIPTION OF THE DRAWINGS

Embodiments illustrated by way of example and not limitation in the figures of the accompanying drawings, in which.

DETAILED DESCRIPTION

In the following description, for purposes of explanation, numerous specific details are set forth in order to provide a thorough understanding of an embodiment of the present invention. It will be evident, however, to one of ordinary skill in the art that embodiments may be practiced without these specific details.

Below are described various aspects of several example embodiments of systems and methods supporting multiple networked users in a shared venue using short messaging service communication. A system architecture of example systems is illustrated in FIGS. 1-5. Several sample display screen snapshots are illustrated in FIGS. 14-19 and described in more detail below.

Figure 1:
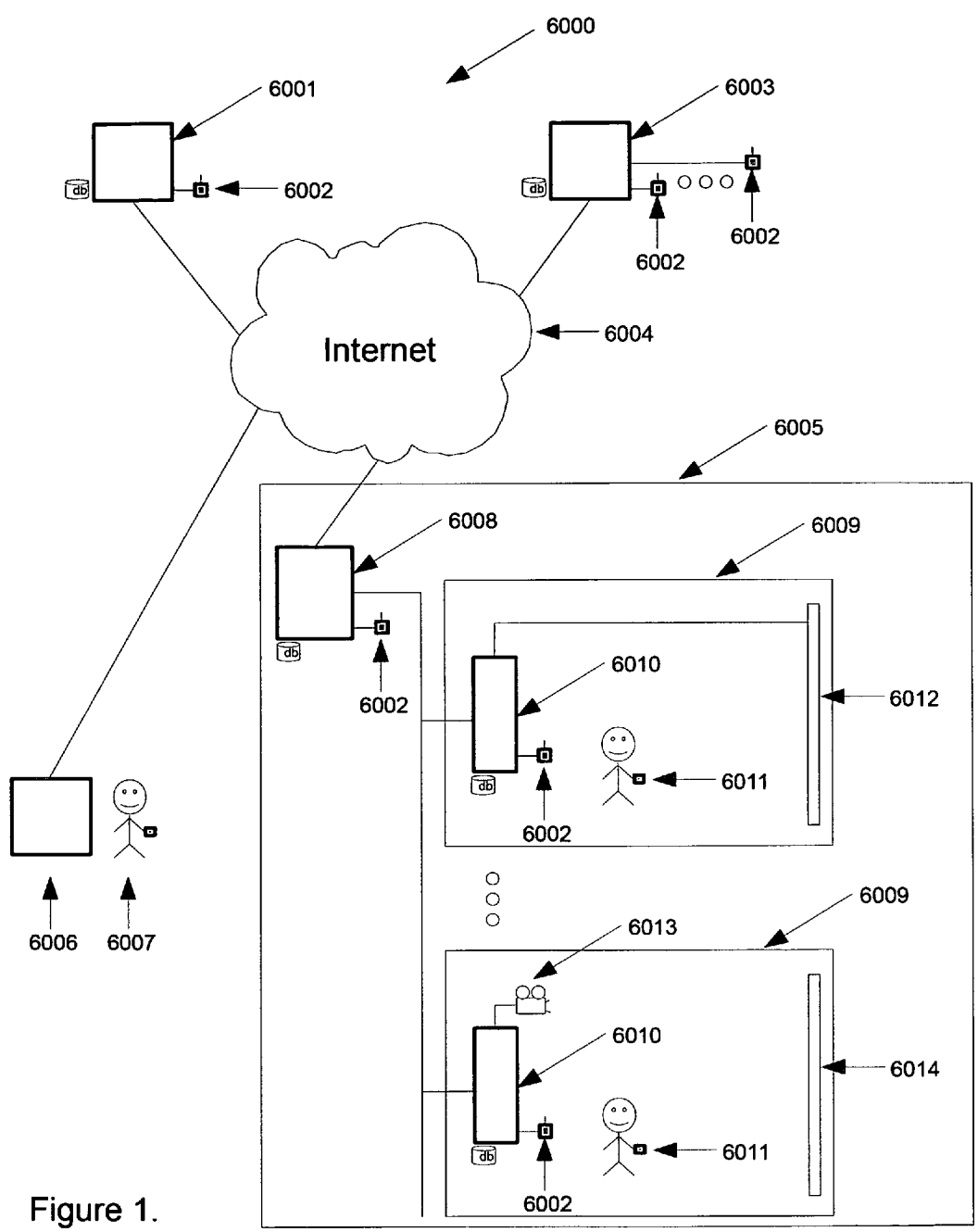
FIG. 1 illustrates an example system of a particular embodiment that supports multiple networked users in a shared venue using short messaging service communication.

Referring to FIG. 1, an example system of a particular embodiment provides interactive content supporting multiple networked users in a shared venue using short messaging service communication. As described herein, a theater-like gaming area is provided with a wireless network and multiple wireless communication devices allowing people within the theater-like gaming area to participate in one or more multimedia experiences, and to possibly connect with multiple other locations. In a particular embodiment, the wireless network is provided within the wireless theater site, while communications between theater sites can be configured as a wired network. As shown in FIG. 1, a wireless theater site 6005 includes a theater access server 6008 with access to Internet 6004 and one or more theater auditoriums 6009 which enable web services and multimedia content to be downloaded from secure Internet web servers 6001. The theater site 6005 is typically a public location supporting ticket sales for event sessions (movies, games, presentations, discussions), events themselves, consumers/groups at these events and products/services sold to these customers/groups. In a particular embodiment, the theater access server 6008 functions as the local site gateway between remote data services from secure Internet web access/content servers 6001 and local systems involved with providing multimedia content, scheduling, ticket sales, advertisement/promotion services, and data on local customers and collectively groups of customers that hold events on theater site 6005. The theater auditorium 6009 includes an auditorium area Typically, a theater auditorium is filled with rows of seats with either a projector and large projection screen or large display such as a LCD or plasma display system 6012 or 6014 that connects to a theater game server 6010 that has video card(s) to present a composite image to display system 6012 or 6014. Note that display system 6012 or 6014 may also have multiple physical display devices, e.g. dual screen monitors driven by a computer with dual port video cards, dual video cards, or the like. Conventional computer vendors sell dual/quad display set-ups. In a particular embodiment, Game Server 6010 can be implemented with multiple video cards, such that Game Server 6010 can drive multiple (1, 2 or 4) displays/projectors. Similarly, various embodiments can support multiple game servers 6010 and display systems 6012 or 6014 in the same or multiple auditoriums to support multiple multimedia streams and multiple view perspectives. Theater auditorium 6009 may also include a wireless network consisting of a cellular network modem 6002 (e.g. CDMA, GPRS, and the like), which provides a communication path for multimedia content and customer input from one or more wireless communication devices 6011, such as Short Messaging Service (SMS) enabled cellular telephones, personal digital assistants (PDA's), and the like.

The theater Game Server 6010 device pulls multimedia content (movies, videos, games) and data from theater access server 6001 to present the multimedia content in a composite video image on display system 6012 or 6014. Theater Game Server 6010 also sends and receives network traffic via SMS communications between wireless communication devices 6011 as input for events such as games or presentations. Theater Game Server 6010 can also peers with other on-site theater game servers 6010 via a shared network between theater access server 6001 and its networked resources.

Display system 6012 or 6014 may consist of a projector and large screen or a large video display such as LCD or plasma, taking a composite image generated from theater Game Server 6010 video card(s) and displaying images on its display screen for a large, shared, common screen for all of the audience in the auditorium area 6009.

Wireless communication devices 6011 allow for local (player) display of text and/or images related to either display system 6012 or 6014 multimedia content (e.g. movies or games), player profile data of a customer logged into the device, group profile data related to a customer, or local applications such as theater site 6005 provided product and service sales/promotions. Wireless communication devices 6011 also allow general communication between customers either locally in auditorium area 6009, other auditorium areas 6009 in local theater site 6005 or remotely through theater Game Server 6010 and out to Internet 6004 via theater access server 6008 for instant messaging type text chat, text messaging such as SMS (via 3rd party web services), email, or other common Internet protocols.

Referring still to FIG. 1, wireless communication devices 6011, can be conventional wireless communication devices, such as Short Messaging Service (SMS) enabled cellular telephones, personal digital assistants (PDA's), and the like. System 6000 shown in FIG. 1 includes a kiosk 6006 (described in more detail below) with which a user may log in via a web application or a dedicated application to play a game along with other game players in the auditorium 6009. The kiosk game player 6007 may receive an SMS invite from a player in an auditorium 6009 or the kiosk game player 6007 may have previously indicated a desire to play a game.

System 6000 shown in FIG. 1 also includes a $3^{rd}$ party server (e.g. web server) 6003 that can be used to convert SMS messages to TCP/IP messages. The server 6003 may be connected with a plurality of cellular network modem 6002 to receive SMS messages from a plurality of players in auditorium(s) 6009. The server 6003 may route messages based on a registered telephone number, or the like. In a particular embodiment, $3^{rd}$ party server 6003 supports call back routing. The server 6003 may optionally mask the server identity and use a "declared" name and number for return messages.

Figure 2:
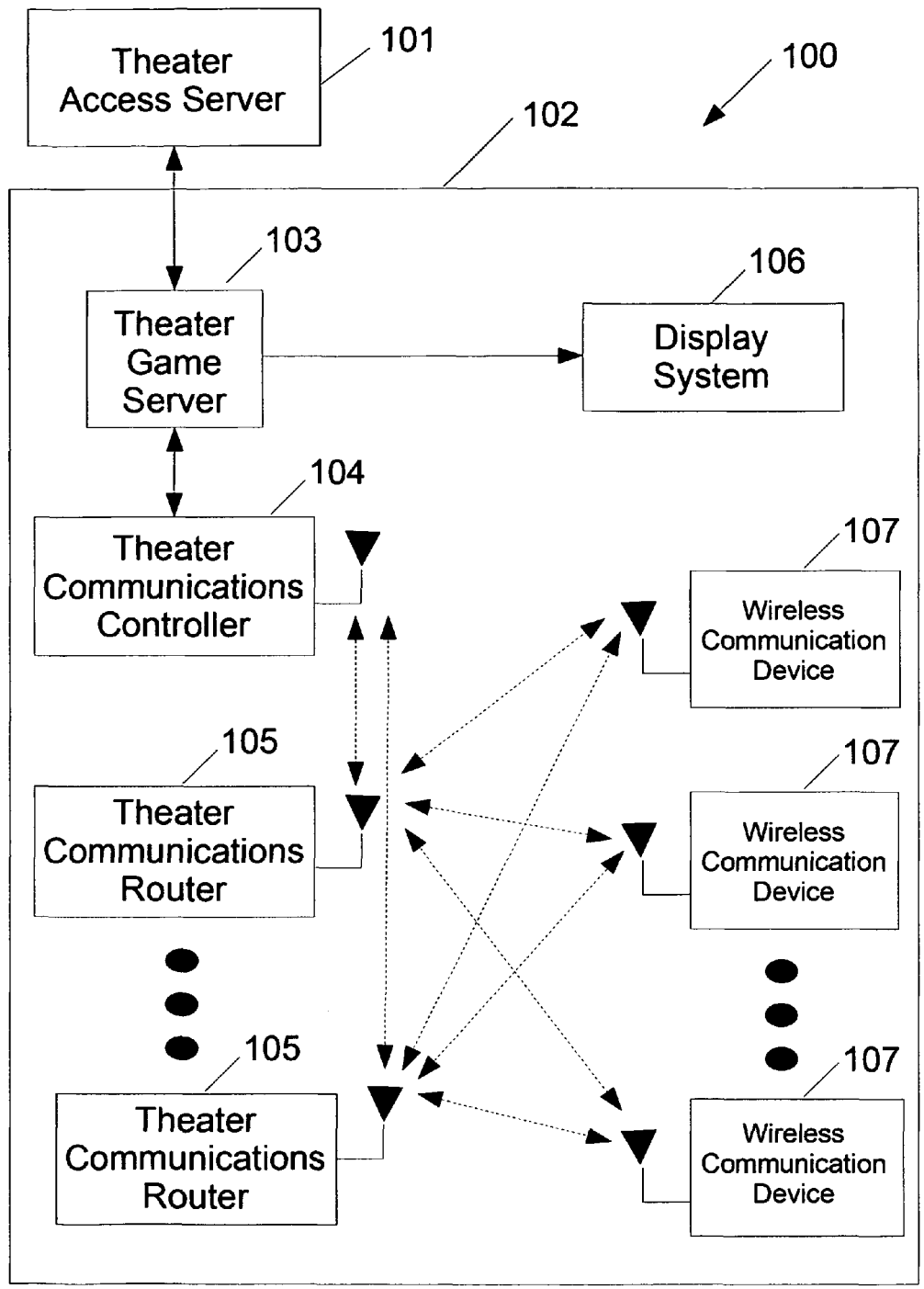
FIG. 2 illustrates another example system of a particular embodiment that provides a wireless theater site with interactive content for multiple networked users in a shared venue.

Referring to FIG. 2, an example system of a particular embodiment provides interactive content for multiple networked users in a shared venue. As described herein, a theater-like gaming area is provided with multiple wireless communication devices allowing people within the theater-like gaming area to participate in one or more multimedia experiences, and to possibly connect with multiple other locations. In a particular embodiment, the wireless network is provided within the wireless theater site, while communications between theater sites can be configured as a wired network. As shown in FIG. 2, a wireless theater site 100 includes a theater access server 101 with access to Internet and one or more theater auditoriums 102 which enable web services and multimedia content to be downloaded from secure Internet web servers 301 (shown in FIG. 3). The theater site 100 is typically a public location supporting ticket sales for event sessions (movies, games, presentations, discussions), events themselves, consumers/groups at these events and products/services sold to these customers/groups. In a particular embodiment, the theater access server 101 functions as the local site gateway between remote data services from secure Internet web access/content servers 301 and local systems involved with providing multimedia content, scheduling, ticket sales, advertisement/promotion services, and data on local customers and collectively groups of customers that hold events on theater site 100. The theater auditorium 102 includes an auditorium area. Typically, a theater auditorium is filled with rows of seats with either a projector and large projection screen or large display such as a LCD or plasma display system 106 that connects to a theater game server 103 that has video card(s) to present a composite image to display system 106. Note that Display System 106 may also have multiple physical display devices, e.g. dual screen monitors driven by a computer with dual port video cards, dual video cards, or the like. Conventional computer vendors sell dual/quad display setups. In a particular embodiment, Game Server 103 can be implemented with multiple video cards, such that Game Server 103 can drive multiple (1, 2 or 4) displays/projectors. Similarly, various embodiments can support multiple game servers 103 and display systems 106 in the same auditorium to support multiple multimedia streams and multiple view perspectives. Theater auditorium 102 may also include a wireless network consisting of communications controller 104 and one or more communications routers 105 which provide multimedia content and gather customer input from one or more wireless communication devices 6011, such as Short Messaging Service (SMS) enabled cellular telephones, personal digital assistants (PDA's), and the like.

The theater game server 103 device can pull multimedia content (movies, videos, games) and data from theater access server 101 to present the multimedia content in a composite video image on display system 106. Theater Game Server 6010 also sends and receives network traffic via SMS communications between wireless communication devices 6011 as input for events such as games or presentations. Theater game server 103 also peers with other on-site theater game servers 103 via a shared network between theater access server 101 and its networked resources.

Theater Communications Controller 104 can be an SMS message aggregator providing an access point enabling SMS message input/output to possibly one or more wireless communication devices 6011. Theater Communications Controller 104 can alternatively be a radio frequency (RF) communications controller employing local, low power, shared RF communications, such as IEEE 802.11 based WiFi, WiMax, or ZigBee protocols. In a particular embodiment, the auditorium 102 is managed by the communications controller as an access point providing input/output to possibly one or more other RF communication routers and a plurality of wireless communication devices.

Theater Communications Router 105 can provide multimedia content and gather customer input from one or more wireless communication devices 6011, such as Short Messaging Service (SMS) enabled cellular telephones, personal digital assistants (PDA's), and the like. Theater Communications Router 105 can alternatively be an RF communications router employing wireless access such as IEEE 802.11 based WiFi, WiMax or ZigBee protocols over multiple low power RF channels. In this manner, data communication between communications controller 104 and wireless communication devices 107 can be mediated in a peer to peer, client-server or mesh network topology.

Display System device 106 may consist of a projector and large screen or a large video display such as LCD or plasma, taking a composite image generated from theater game server 103 video card(s) and displaying images on its display screen for a large, shared, common screen for all of the audience in the auditorium area 102.

Wireless communication devices 107 allow for local (player) display of images related to either display system 106 multimedia content (e.g. movies or games), player profile data of a customer logged into the device, group profile data related to customer, or local applications such as theater site 100 provided product and service sales/promotions. Wireless communication devices 107 also allow general communication between customers either locally in auditorium area 102, other auditoriums areas in local theater site 100 or remotely through theater game server 103 and out to Internet via theater access server 101 for instant messaging type text chat, text messaging such as SMS (via 3rd party web services), email, or other common Internet protocols.

Figure 3:
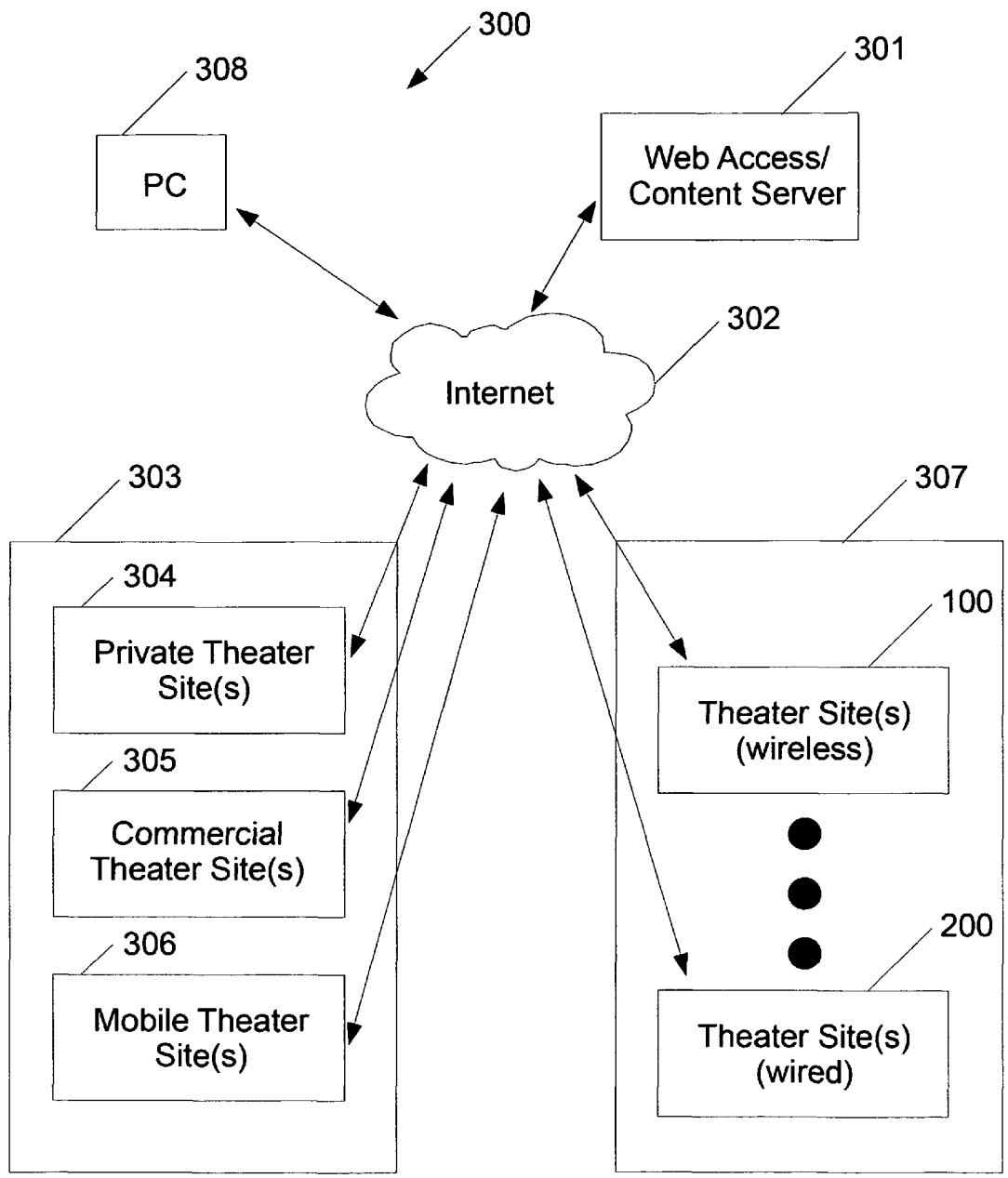
FIG. 3 illustrates a Multi-Theater Site system architecture featuring traditional theaters (chains), home theaters, and commercial sites.

FIG. 3 illustrates a Multi-Theater Site system architecture featuring traditional theaters (chains), home theaters, and commercial sites such as hotels, schools, offices, conference rooms, plus mobile locations such as airplanes and automobiles. The various embodiments described herein enable logically grouping gaming sites, managing content across a network to both wired and wireless players who may be in either homes, theaters or theater-like environments playing a plurality of games with others organized in a community of groups and events exhibiting in a plurality of interactive modalities. As shown in FIG. 3, Theater Sites (wireless) 100 and Theater Sites (wired) 200 can be included in the overall system architecture. The Multi-Theater Site network 300 groups multiple theater sites together, such as theater chains, but classifies sites on a public versus a private basis, where public sites may feature ticket sales where private sites would primarily feature a subscription model instead.

As shown in FIG. 3, Web Access/Content Servers 301 handle both content and management data flow, both in from content producers as well as out to content consumers, both commercial and private. The content may consist of multimedia and games, logical theater chain details, details on theater sites, customers, groups, events, advertisers, promotions and more. The management of correlating events hosted by groups, suggestions/ratings of events by both people and collectively groups, plus schedules of people as customers of future events. The Internet 302 allows a shared medium of communication over well-known open protocols such as HTTP, SSH, VPN, web services (extensions to HTTP and HTTPS), FTP email and instant messaging or RSS. Web Access/Content Servers 301 and users of personal computers (PC) 308 (e.g. content producers or content consumers) can be accessible via network 302 to Multiple Commercial and Private Theater Sites 303. Multiple Commercial and Private Theater Sites 303 are typically not logically grouped, but include sites such as private home theaters 304, commercial sites 305, and mobile sites 306. Private Theater Site(s) 304 includes theater sites such as 401 (shown in FIG. 4) that are residential sites where no ticket sales would be expected. Instead, these sites can include a capability for user log on with a wireless communication device 6011 (e.g. SMS-enabled cellphone or PDA) and play from a subscription model service. Individual Commercial Site(s) 305 include theater sites such as hotels, offices, schools and places where either a ticket sales model is used or a subscription model is used. Mobile Theater Sites 306 is a subscription model site without ticket sales that may be an airplane, RV, bus, SUV, boat, or generally a portable/mobile theater-like environment. Commercial Theater Site(s) 307 are typically logically grouped in a plurality of theater chains with sites that can either have subscription or ticket sales models, and can share information, such as movie schedules and group/event details.

Figure 4:
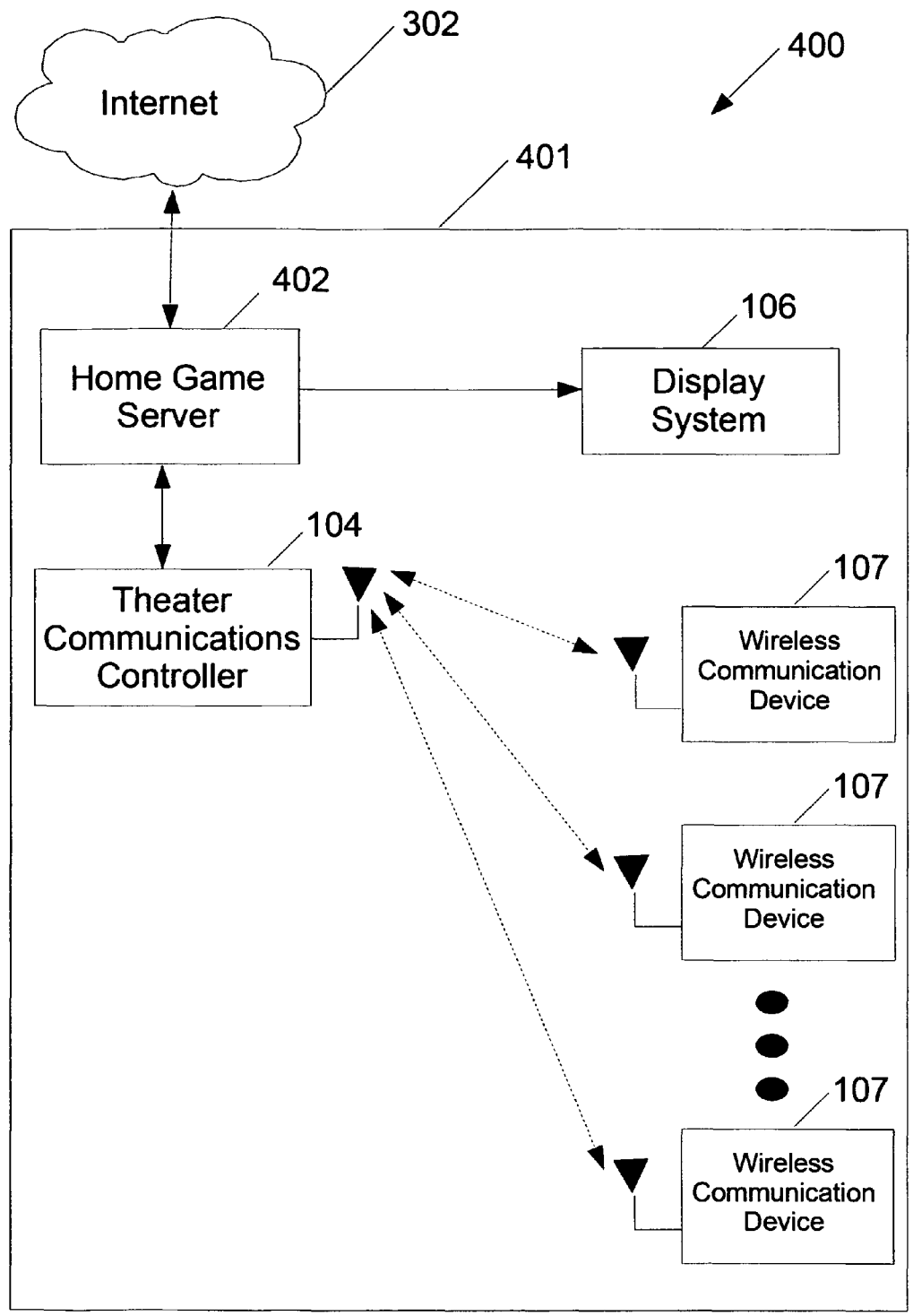
FIG. 4 illustrates a Private Home Theater Site (wireless).

FIG. 4 illustrates a Private Home Theater Site (wireless) 400. As described in various embodiments, the Private Home Theater 400 allows players to wirelessly play one or more multimedia experiences possibly connected to multiple other locations via network 302. Private Home Theater Site (wireless) 400 is a theater site typically without ticket sales and features a network connection between the communications controller 104 and wireless communication devices 6011. Theater Communications Controller 104 can be an SMS message aggregator providing an access point enabling SMS message input/output to possibly one or more wireless communication devices 6011. Theater Communications Controller 104 can be a radio frequency (RF) communications controller employing local, low power, shared RF communications, such as IEEE 802.11 based WiFi, WiMax, or ZigBee protocols. The communications controller 104 can act as an access point providing input/output to possibly one or more other RF communication routers and a plurality of wireless communication devices 6011. Display System device 106 is generally a device such as a television, (e.g. LCD, plasma, oled, etc.) monitor or projector and screen set-up. Display System device 106 can still feature multiple concurrent multimedia streams, however, size, resolution, merge/divide screen region areas may be optimized; plus, region timeouts may be disabled by customer configuration removing the movie interrupt (uses whole screen) limitation or expectation. The wireless communication devices 6011 shown in FIGS. 6A and 6C are described in more detail below. Private Home Theater Auditorium area 401 consists of a home game server 402, network communications controller 104 and multiple wireless communication devices 6011. Home Game Server device 402 can be similar to a theater Game Server 6010 device configured in software to provide default configuration and services for a home, thereby removing theater management restrictions (e.g. approving events) and multiple auditorium settings. As used herein, the term, 'game server' can be considered to include both theater game server and home game server features. In regard to electronic commerce transactions performed with a particular embodiment in a home setting, home theater sites can be primarily subscription based. In a subscription model, the subscription fee paid by the consumer provides the value offered by the consumer in return for goods and services ordered via the particular embodiment described herein. The subscription model may include payment options for quota or tokens. In another embodiment, a transactional model may be used, wherein the home game server 402 receives a goods/service order from a consumer and then in real-time accesses the web access/content server 301 via Internet 302 to authenticate the payment for the order from a consumer credit card, credit account, or the like. In this manner, the consumer can use a particular embodiment in a home setting to perform e-commerce transactions and financial transactions. If products/goods are to be delivered to a home site, then transactions may involve third parties, perhaps external to the system via Internet email or the (secure) web. Services and virtual products, such as software items, can be delivered directly to home (e.g. in game virtual player items or information such as business analytics) via a network 302 download.

Figure 5:
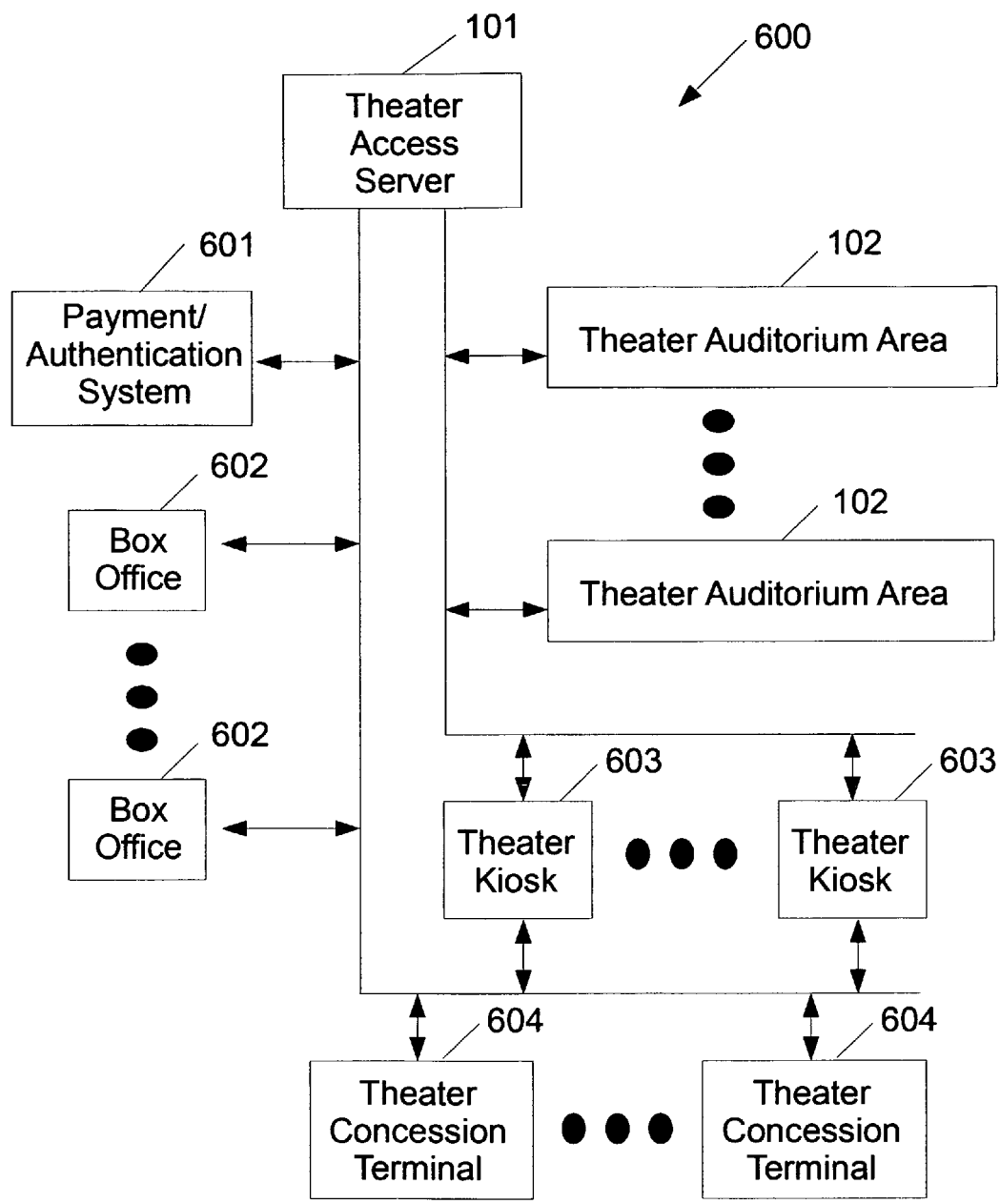
FIG. 5 illustrates a Theater Site with On-Site Event, Product and Service Sales Support.

FIG. 5 illustrates a Theater Site with On-Site Event, Product and Service Sales Support 600. As described in various embodiments, Theater Site 600 provides a system architecture allowing event searches, ticket purchases, wireless remote product/service ordering and delivery. Theater Site with On-Site Event, Product and Service Sales Support 600 includes Auditorium area(s) 102, and a theater access server 101 with both a customer facing network and a content/product/services based network. The customer facing network includes payment/authentication systems 601, multiple box office 602 devices, multiple theater concession terminals 604, and a bridged connection to multiple theater kiosk(s) 603. The content/product/services based network includes multiple theater auditoriums 102, and bridged connection to multiple theater kiosk 603 devices. Theater Site Payment/Authorization System device 601 is the credit card/ATM processing device such as a modem with card reader common to retail stores for VISA/MASTERCARD/bank ATM that facilitates remote authentication, authorization and account debit for funds on behalf of a customer. Ticket Box Office (location/devices) 602 is the theater site location where customers can visually/verbally ask about events and schedules, purchase with cash or credit either tickets or a member magnetic striped card to establish an on-site (or theater chain) cash equivalent account. The box office would for customers/member cards additionally create an account with a globally unique identifier provided from the theater access server 101 via web access/content server 301, and upon event ticket sales, print out session codes or SMS messaging phone numbers for events on tickets that are used to login with wireless communication devices 6011. Theater Kiosk device 603 has a display and input devices such as keyboard and trackball/mouse, card reader (atm/credit or loyalty cash cards) and local network access. The Kiosk device 603 shows movie and game trailer videos, up-coming event schedules, plus allows a customer to search for and buy tickets to events such as game sessions and movies. The kiosk 603 can forward payment authorization and account setup details to the theater access server 101 for a customer, while allowing them to join groups and events, plus print their tickets or schedules. The kiosk 603 can also be used to define a customer's buddy list and group memberships, check on presence/activity of buddy list or fellow group members and send cell phone text messages or email invites for events out to their friends, which is a request routed out to theater access server 101 which forwards the request to web access/content server 301 to either send text message/email directly or use a third party web service. Theater Concession Terminal 604 is basically a personal computer (PC) with card reader (atm/credit/loyalty card) and order printer, but also has software and databases to support logins by either theater staff or management for use in specifying product inventory, creating and running product sales (advertisements) and promotions, plus viewing/auditing customer orders.

Figure 6:
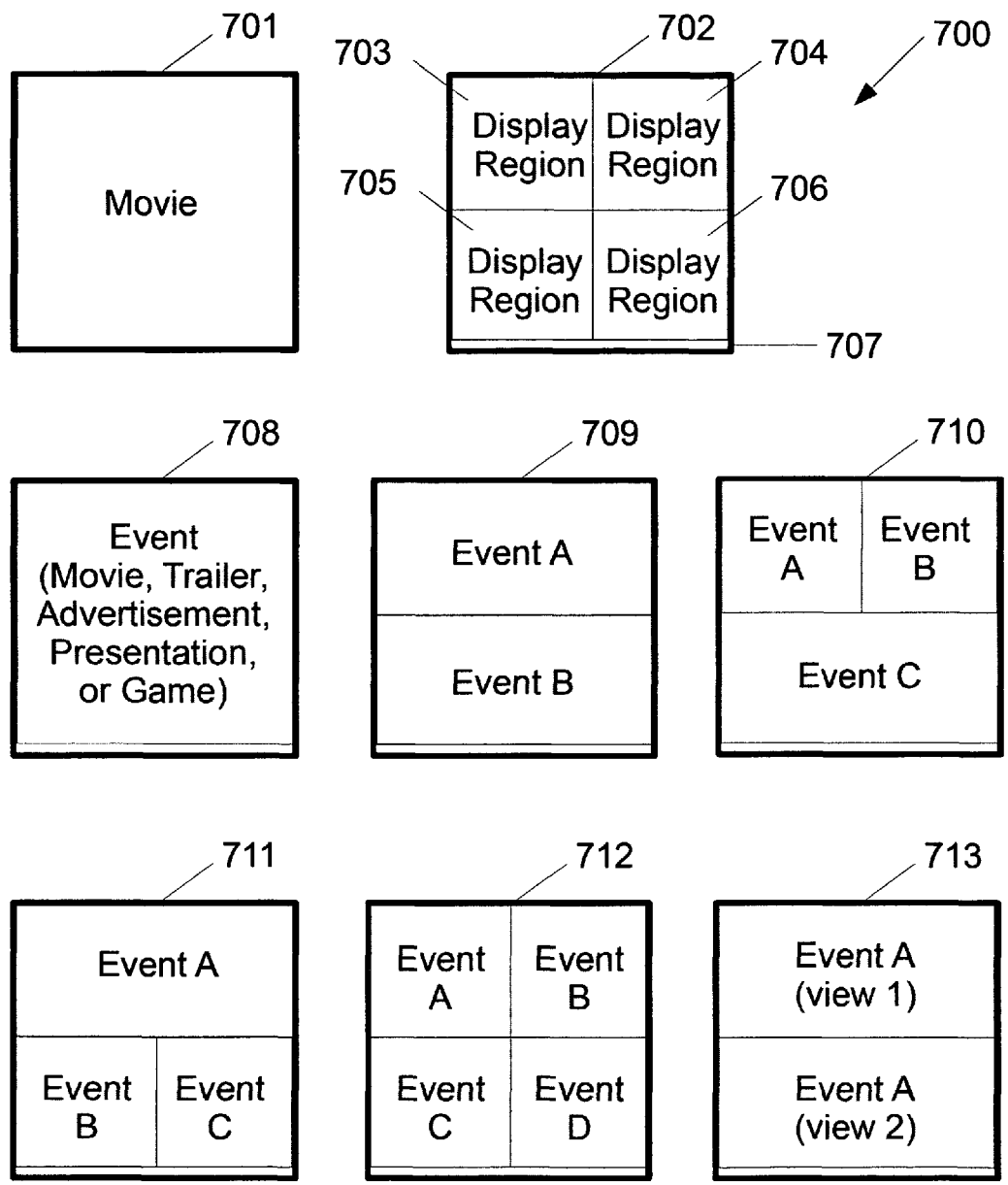
FIG. 6 illustrates a Display Screen Modality.

FIG. 6 illustrates a Display Screen Modality 700. As described in various embodiments, Display Screen Modality 700 illustrates display screen configurations allowing multiple display regions and a status bar region to be displayed where regions can change size, position, and content for multiple participants in multimedia events networked to multiple locations. A separate multimedia stream can be shown in each of the display regions of the display screen modality 700. Further, a multimedia stream in an event (scheduled activity for auditorium location and time/duration) can be different modalities such as passive (image/video/movies) or interactive (interactive videos, games, movies or presentations). Display Screen Modality 700 is configured such that either: 1) the auditorium theater screen is off, 2) the auditorium theater screen is on and showing a movie, or 3) the auditorium theater screen is on and displaying one or more display regions plus a status bar. The large screen may be halved, or quartered into partitions, etc. such that individual multimedia streams can appear in the partitioned regions and customers (or players) who are to interact with those partitioned regions will be shown either by the status bar or a status indicator on their individual wireless communication device 6011 (e.g. LED, LCD display picture or text, or audio) to let them know which screen region they have joined a session with for interactive input. Display Screen device 701 is configured to show a regular movie without a status bar at the bottom of the screen. The display content is shown at theater site default or normal position, size, and resolution that is compatible for the display content. Display Screen device 702 is controlled by theater Game Server 6010 or home game server 402. Display Screen device 702 can be configured to have multiple display regions and a status bar region. Display Region 703 provides an upper left area that can merge with the area to the right or the whole screen for multimedia content. Display Region 704 provides an upper right area that can merge with the area to the left or the whole screen for multimedia content Display Region 705 provides a lower left area that can merge with the area to the right or the whole screen for multimedia content Display Region 706 provides a lower right area that can merge with the area to the left or the whole screen for multimedia content Status Bar Region 707, located on the bottom, top or sides of the display screen can be used to display theater, event or specific content information. Single Display Region 708 provides a single region using the whole screen for single multimedia content, plus the status bar region 707. Split Display Regions 709 provides two display regions showing two separate multimedia content, plus a status bar region 707. Upper Tri-Region Display 710 provides three multimedia display regions where the upper area of horizontal is split, plus a status bar region 707. On larger screens, this may be a top half screen with several event display region multimedia streams and the upper area split into many similarly sized regions, such as splitting the upper area across its width into 2, 3, 4 or more display regions. Lower Tri-Region Display 711 provides three multimedia display regions where the lower area of horizontal is split, plus a status bar region 707. On larger screens, this may be a the lower half screen with several event display region multimedia streams and the lower area split into many similarly sized regions, such as splitting the lower area across its width into 2, 3, 4 or more display regions. Quad Display Region 712 provides four display regions for multimedia content, plus a status bar region 707. Alternate Views 713 provides display regions that can show alternate views of the same multimedia content, such as head-to-head games where a multimedia stream content model is the same, but the view perspective for each region is different (e.g. chess board view over white piece side and black piece side). In this case, the player(s) associated with a given view or display region has their input from wireless communication devices 6011 related to control that particular view, such as having two teams playing each other where one team is shown in top and other in bottom. Collectively the player(s) input for the first team may be directed for controlling aspects of the top screen's view and vice versa for the other team display, players and control input. However, the game or simulation model encompasses whole world, though input may be restricted to smaller model parts and the model may be distributed across theater game servers. Nevertheless, views are still presented to a display region as a composite image in traditional computer graphics methods.

Figure 7:
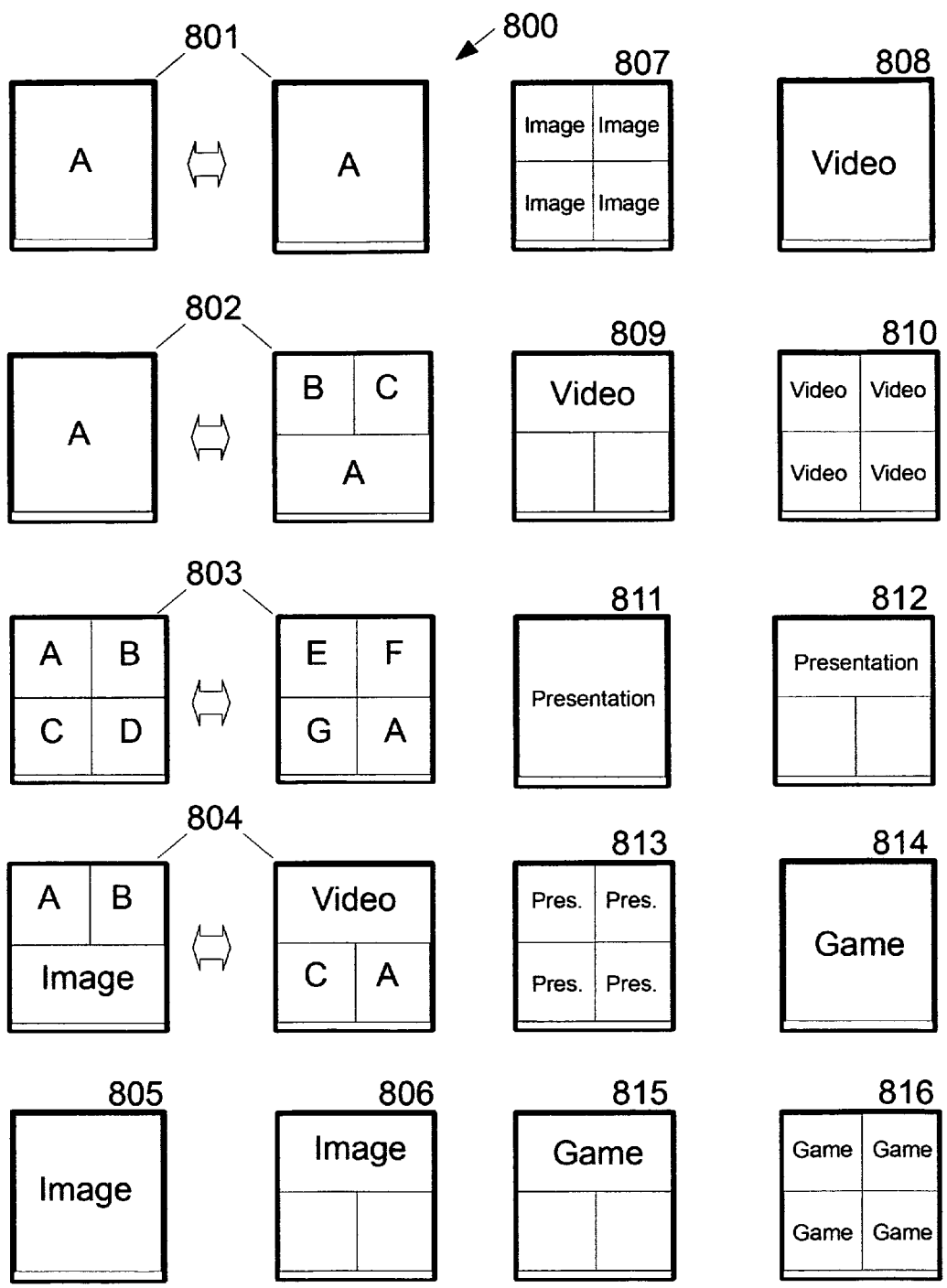
FIG. 7 illustrates various display screen configurations for events (e.g. games) playing across different screens.

FIG. 7 illustrates various display screen configurations for events (e.g. games) playing across different screens. As described in various embodiments, the system architecture allows multiple sites to feature multiple multimedia experiences on displays with different display regions that can vary by actual screen location, size and possibly view perspective. The various display screen configurations for events 800 enable the playing of many multimedia streams across different screen sites, sizes, locations and view perspectives, where participants at one theater auditorium site 102 or 201 may be all playing in an event displayed in a whole screen against participants in another theater auditorium site 102, which may be sharing a display screen system with other event multimedia streams, thus causing the second site to not display the first event on the whole screen. Display screen configurations 801 depict a networked configuration providing multiple full screen display for multimedia events, the whole screen at a first site versus another whole screen at a second site. Display screen configurations 802 depict a Screen Location and Size variation where the screen display region size and location may differ between event sites. Display screen configuration 802 shows event A content between sites can be either whole screen sized or subscreen sized depending on content streams in use at a particular site. Screen size and location is content, time and demand based according to their individual configurations, theater management scheduling and other considerations such as theater site offering premium based events reserving whole screen or only subset of content for a particular location (auditorium) and time (event session). Display screen configuration 803 shows that screen multimedia content at sites may differ. Screen regions may feature different content per region and shared events across sites may be placed in different display regions. Display screen configuration 804 shows that screen display region modalities may differ. Display regions may differ in that any region can show both passive and interactive content, such as images, videos, interactive presentations, and games. Display screen configuration 805 shows a configuration with a full screen (display region) image in a passive modality. Display screen configuration 806 shows a configuration with a half screen (display region) image in a passive modality. Display screen configuration 807 shows a configuration with a quarter screen (display region) image in a passive modality. Display screen configuration 808 shows a configuration with a full screen (display region) video in a passive or interactive (movie) modality. Display screen configuration 809 shows a configuration with a half screen (display region) video in a passive or interactive (movie) modality. Display screen configuration 810 shows a configuration with a quarter screen (display region) video in a passive or interactive (movie) modality. Display screen configuration 811 shows a configuration with a full screen (display region) presentation in a passive or interactive modality. Display screen configuration 812 shows a configuration with a half screen (display region) presentation in a passive or interactive modality. Display screen configuration 813 shows a configuration with a quarter screen (display region) presentation in a passive or interactive modality. Display screen configuration 814 shows a configuration with a full screen (display region) game in a generally interactive modality. Display screen configuration 815 shows a configuration with a half screen (display region) game in a generally interactive modality. Display screen configuration 816 shows a configuration with a quarter screen (display region) game in a generally interactive modality.

Figure 8:
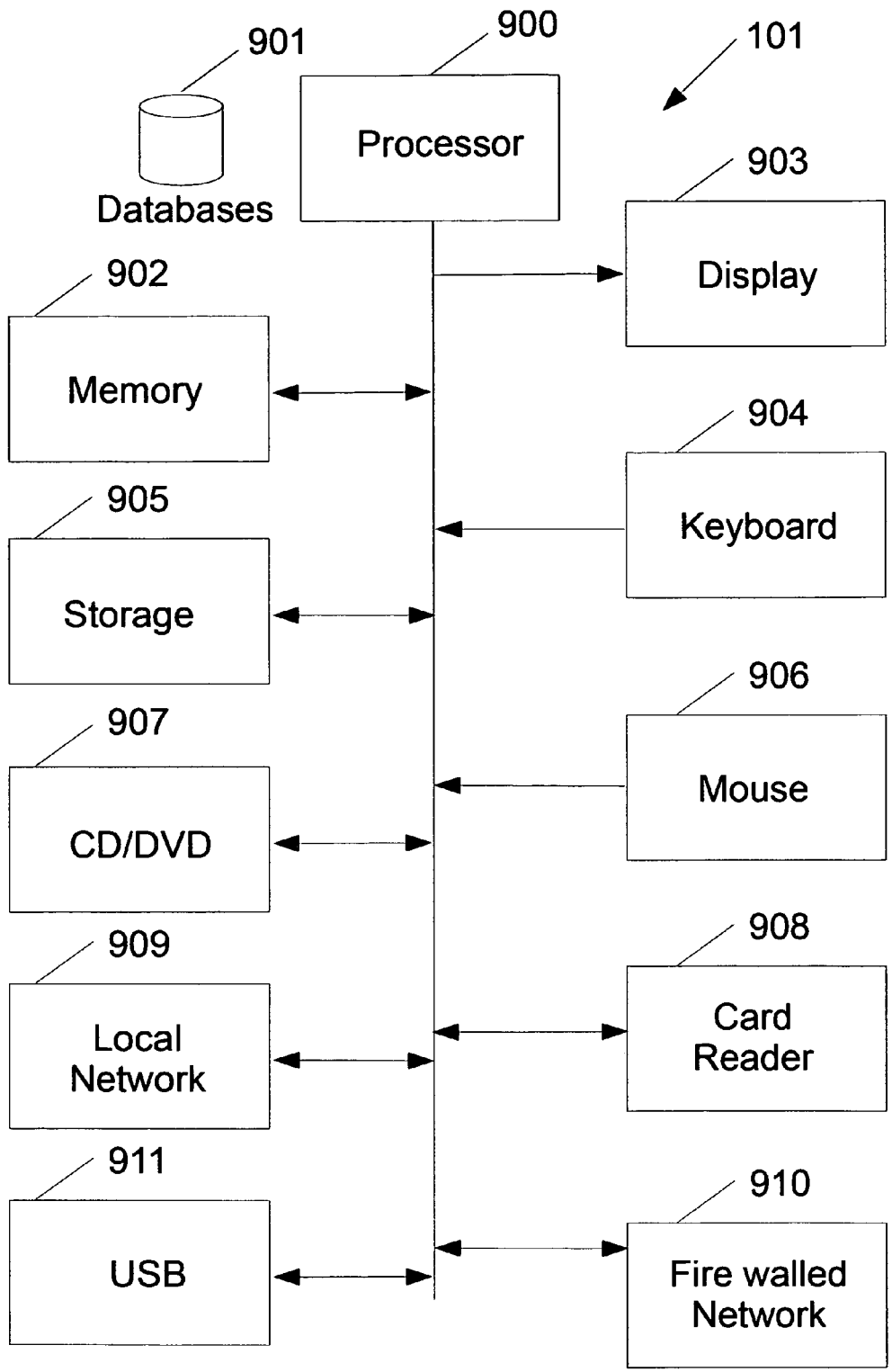
FIG. 8 illustrates a Theater Access Server 101 in a particular embodiment.

FIG. 8 illustrates a Theater Access Server 101 in a particular embodiment. As described in a particular embodiment, Theater Access Server 101 is an on-site server that intermediates access between the Internet 302 (content/communications) and premises equipment for both auditorium games and product/service sales using local databases of people, groups, events, advertisements, inventory and promotions. Theater Access Server 101 can also schedule games to run on all game servers 6010. The Theater Access Server 101 can also have an attached cellular modem 6002 to route SMS messages or TCP/IP traffic back to game servers 6010 or to players 6011 or 6007.

In a particular embodiment, Theater Access Server 101 includes Processor 900, such as an Intel (Pentium/Core 2 Duo) or AMD (Athlon) desktop machine, local databases 901, the content for which can be pulled from (Internet) remote web access content server 301 for site operations, memory 902, which can be RAM for computer program or data storage, display device 903, such as a video display, LCD, CRT, plasma display, or the like, keyboard 904, which can be a standard PC input device, such as a conventional QWERTY Latin ASCII based keyboard, data storage device 905, such as a hard drive, cursor control/pointing device 906, such as a conventional mouse, a CD/DVD device 907 for bulk storage and input, back ups, software installation, and offsite storage, card reader 908 for reading magnetic strip cards such as cash cards, credit cards and such, local network interface device 909 for connection with a local wired/wireless network for both sales (box office, kiosk, concessions) and auditorium data communications, fire-walled network 910 for access to the Internet, including access to the web access content server 301 and other logical remote theater sites (theater chain), a USB interface device 911 for both communication and external storage (reading or writing data).

Figure 9:
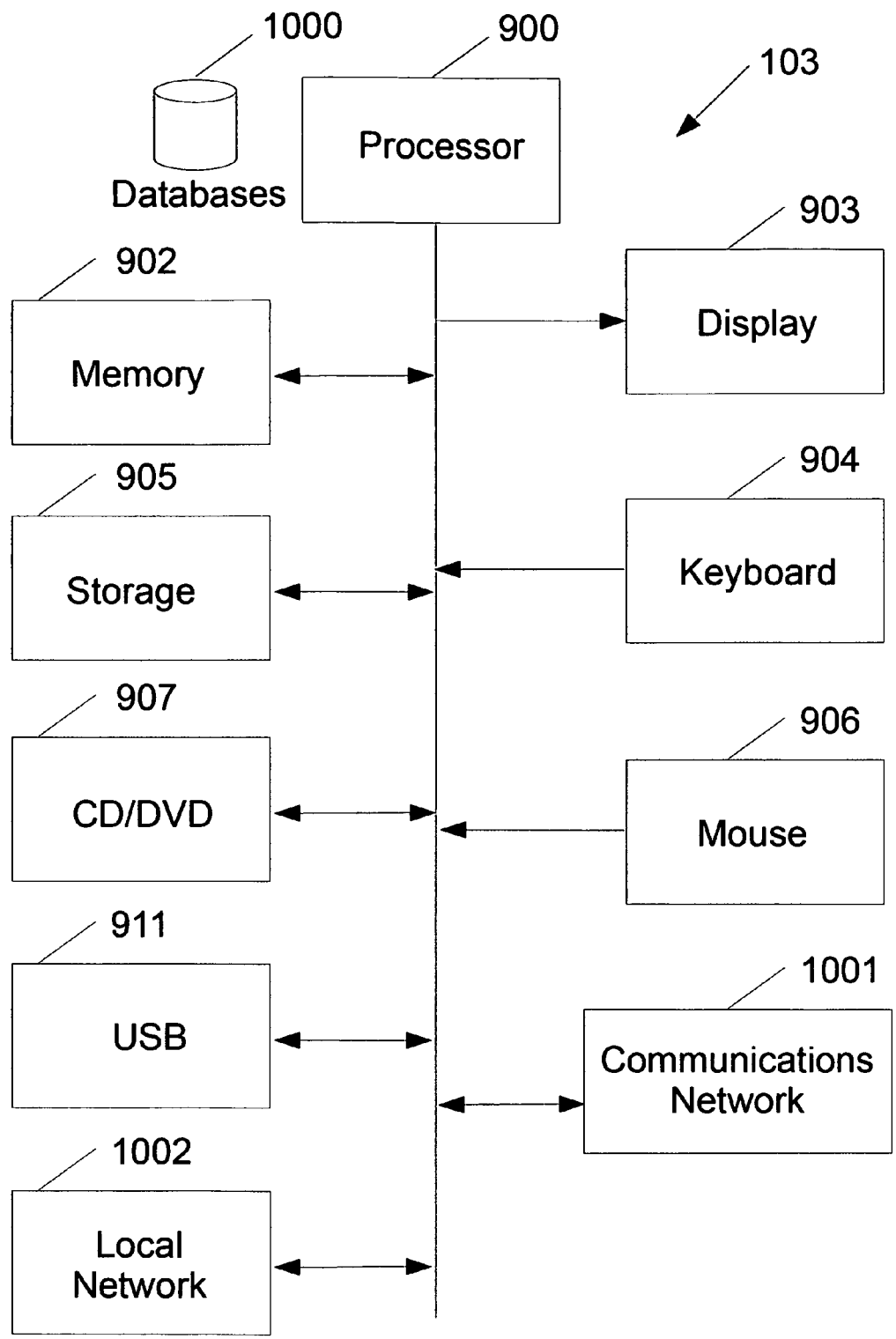
FIG. 9 illustrates a Theater Game Server 6010 (103).

FIG. 9 illustrates a Theater Game Server 6010 (103). As described in various embodiments, Theater Game Server 6010 (103) can execute multiple concurrent multimedia applications (movies & games), intermediates communication between local & remote wireless communication devices 6011 and forwards customer messages such as product/service orders (food), friend text, SMS message communications, SMS message invite requests, and application messages such as management disturbance or help requests. In a particular embodiment, Theater Game Server 6010 includes Processor 900, such as an Intel (Pentium/Core 2 Duo) or AMD (Athlon) desktop machine, memory 902, which can be RAM for computer program or data storage, one or more display devices 903, such as a video display(s), LCD, CRT, plasma display(s), or the like (e.g. with one or more video cards), keyboard 904, which can be a standard PC input device, such as a conventional QWERTY Latin ASCII based keyboard, data storage device 905, such as a hard drive, cursor control/pointing device 906, such as a conventional mouse, a CD/DVD device 907 for bulk storage and input, back ups, software installation, and offsite storage, and a USB interface device 911 for both communication and external storage (reading or writing data). In addition, a particular embodiment of Theater Game Server 6010 includes Theater Game Server Databases 1000, which include multimedia content (video, game, sound, scripts), data on players/groups, data on events (schedules, attendees), advertisements, promotions, presentations, ratings (movies, games, events) and local site details. Theater Game Server 6010 further includes Auditorium Network Interface 1001 and Local Network interface 1002 to connect with a local wired/wireless network for access both to Theater Game Server 6010 and other Game Servers.

Theater Game Server 6010 may have a cellular modem 6002 attached or integrated for SMS communications during game play. Players in the theater auditorium can be advised of an SMS telephone number to call to obtain access to the game server 6010. Alternatively, SMS messages can travel via the theater access server 6008 for theater site gateway managed routing of SMS to TCP/IP messaging. Cellular network modem 6002 can be a conventional SMS modem compatible with a conventional wireless cellular telephone network (e.g. CDMA, GPRS, Edge, or the like). The cellular network modem 6002 can provide SMS communications via communications network interface 1001.

Figure 10:
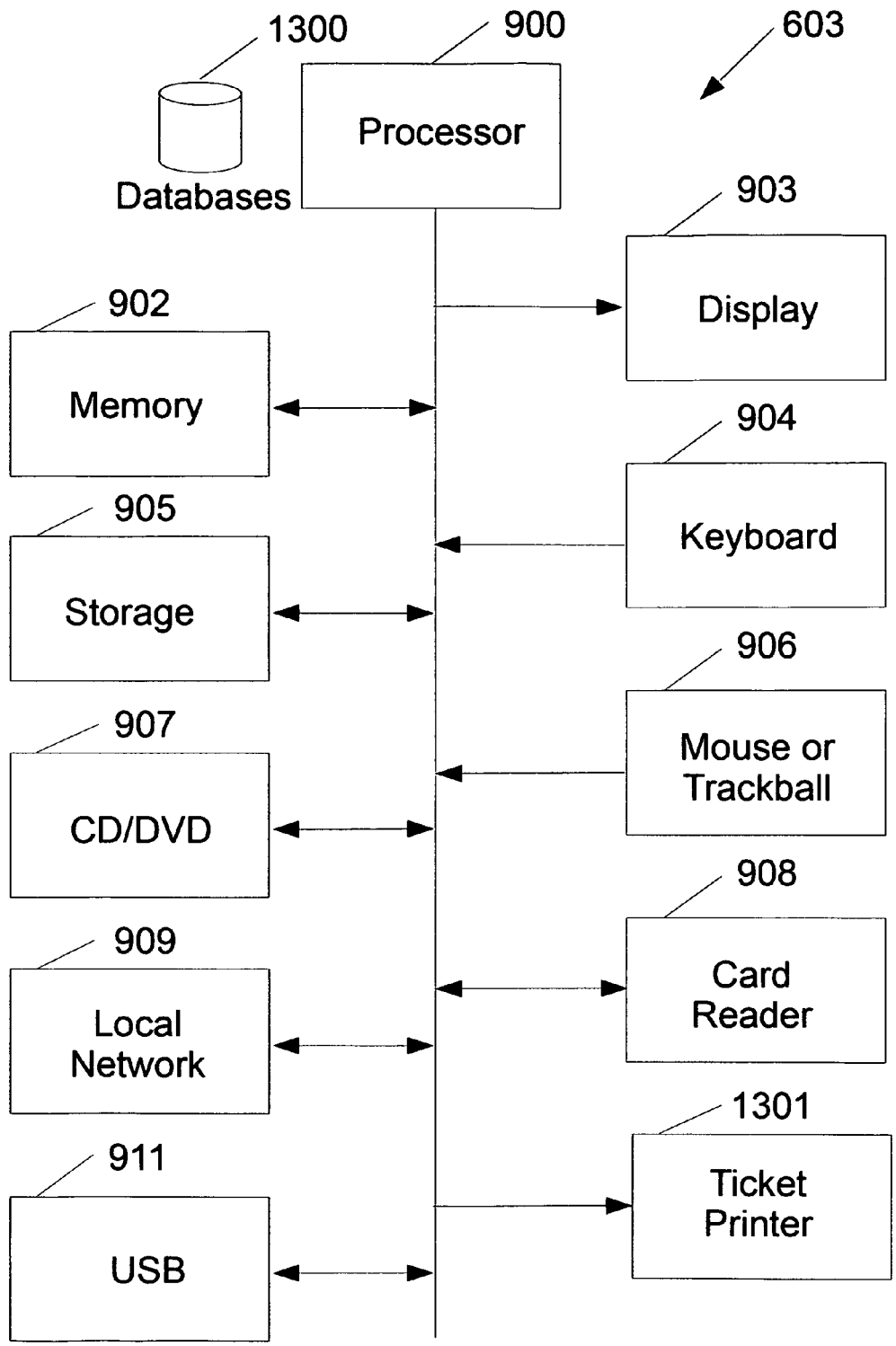
FIG. 10 illustrates a Theater Kiosk 603.

FIG. 10 illustrates a Theater Kiosk 603. As described in various embodiments, Theater Kiosk 603 allows theater patrons to search for events (movies, games, presentations), purchase tickets, enter personal profile data, join groups, sign up for group events and create events, plus send out group/buddy event invites via text messages. In a particular embodiment, Theater Kiosk 603 includes Processor 900, such as an Intel (Pentium/Core 2 Duo) or AMD (Athlon) desktop machine, memory 902, which can be RAM for computer program or data storage, display device 903, such as a video display, LCD, CRT, plasma display, or the like, keyboard 904, which can be a standard PC input device, such as a conventional QWERTY Latin ASCII based keyboard, data storage device 905, such as a hard drive, cursor control/pointing device 906, such as a conventional trackball/mouse, a CD/DVD device 907 for bulk storage and input, back ups, software installation, and offsite storage, card reader 908 for reading magnetic strip cards such as cash cards, credit cards and such, local network interface device 909 for connection with a game server device via a local wired/wireless network, and a USB interface device 911 for both communication and external storage (reading or writing data). In addition, a particular embodiment of Theater Kiosk 603 includes databases 1300 for event schedules, site details, groups, promotions, trailers and videos. Theater Kiosk 603 further includes ticket printer 1301 to print tickets for events, promotions and schedules.

Figure 11:
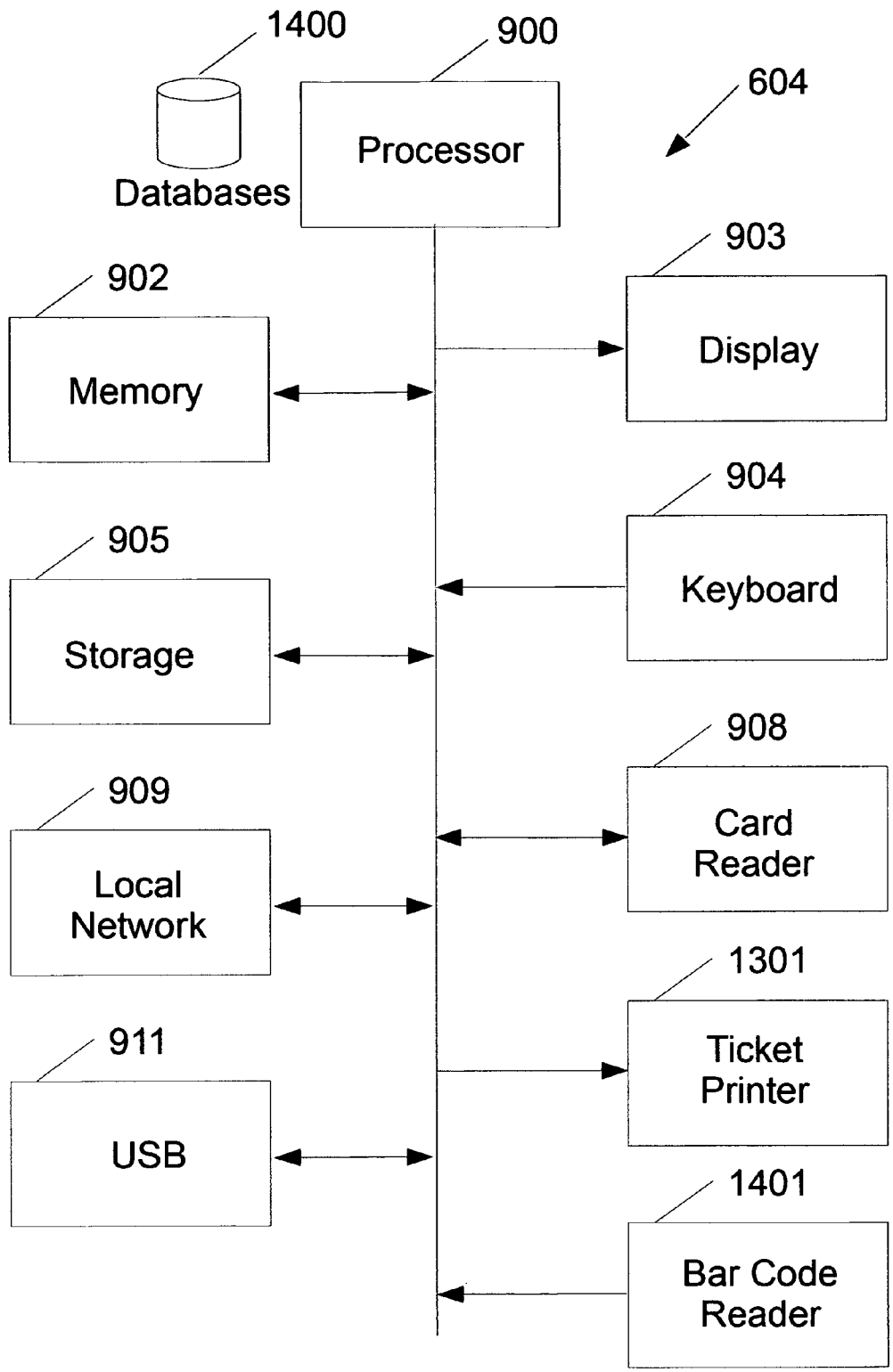
FIG. 11 illustrates a Theater Concession Terminal 604.

FIG. 11 illustrates a Theater Concession Terminal 604. As described in various embodiments, Theater Concession Terminal 604 tracks inventory, promotions, events and receives remote orders from wireless communication devices 6011. In a particular embodiment, Theater Concession Terminal 604 includes Processor 900, such as an Intel (Pentium/Core 2 Duo) or AMD (Athlon) desktop machine, memory 902, which can be RAM for computer program or data storage, display device 903, such as a video display, LCD, CRT, plasma display, or the like, keyboard 904, which can be a standard PC input device, such as a conventional QWERTY Latin ASCII based keyboard, data storage device 905, such as a hard drive, card reader 908 for reading magnetic strip cards such as cash cards, credit cards and such, local network interface device 909 for connection with a game server device via a local wired/wireless network, a USB interface device 911 for both communication and external storage (reading or writing data), and ticket printer 1301 to print tickets for events, promotions and schedules. In addition, a particular embodiment of Theater Concession Terminal 604 includes databases 1400 for inventory, promotions, event schedules, and game server details. Theater Concession Terminal 604 can also include a bar code scanner 1401 for tracking inventory in a particular embodiment.

Figure 12:
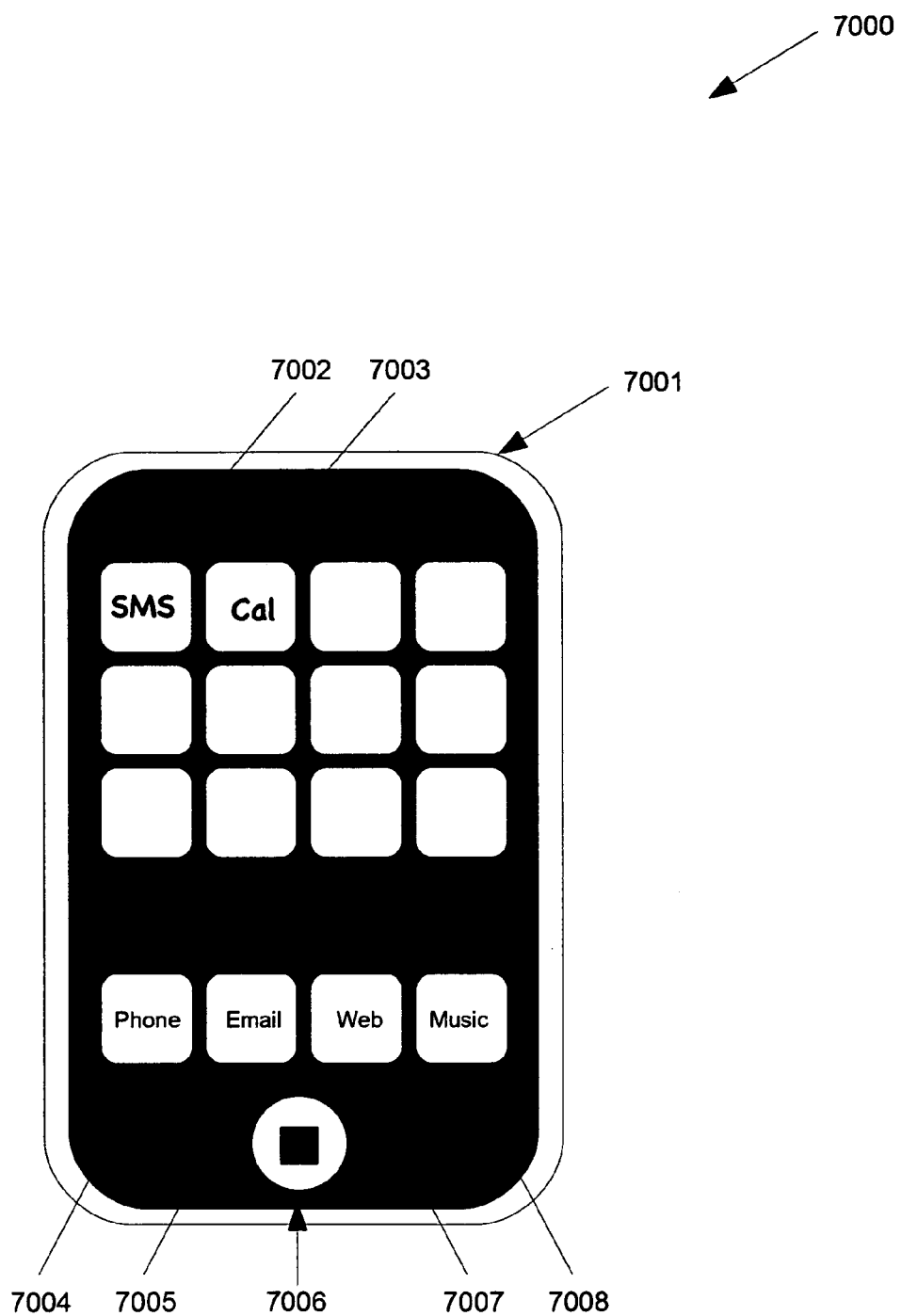
FIG. 12 illustrates a typical configuration of buttons on a conventional wireless communication device 6011 with SMS functionality as useable in a particular embodiment.

FIG. 12 illustrates a typical configuration of buttons on a conventional wireless communication device 6011 with SMS functionality as useable in a particular embodiment. As shown, the wireless communication device 6011 can be a typical wireless telephone 7001 with phone functions provided either by buttons or menus. Phone 7001 can include a button 7002 to activate an SMS text messaging application and a button 7003 to activate a calendar application. Phone 7001 can also include button 7004 to activate main phone calling/answering functionality-voice calls, button 7005 to activate "Data" service on phones allowing for email via POP TCP/IP protocol, button 7007 to activate "Data" service allowing web browsing via HTTP or HTTPS TCP/IP protocols, button 7008 to activate Music selection functionality, schedule and play music applications. Music can be downloaded via the "Data" services either on demand, asynchronously or by push. Phone 7001 can also include button 7006 to activate a Home screen, "OK", "Back" or power on/off functionality.

Figure 13:
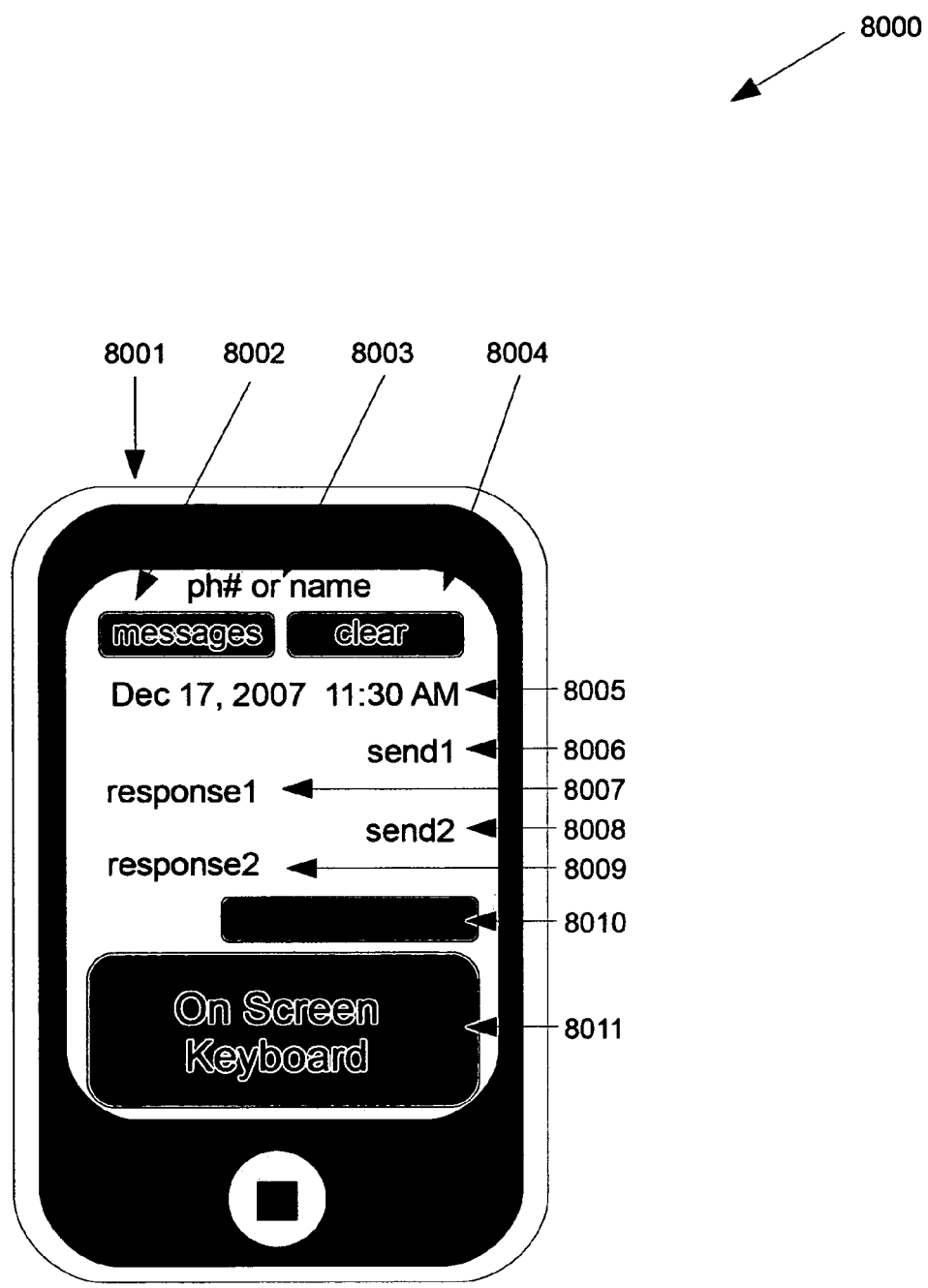
FIG. 13 illustrates a configuration of information displayed on a conventional wireless communication device 6011 with SMS functionality as useable in a particular embodiment

FIG. 13 illustrates a configuration of information displayed on a conventional wireless communication device 6011 with SMS functionality as useable in a particular embodiment. As shown, wireless telephone 8001 can include button 8002 to get list of previous people/numbers that have sent a SMS message to this phone. Phone 8001 can also include information 8003 to show the current person or number to whom or from whom SMS text messaging is sent/received. Phone 8001 can also include button 8004 to clear all SMS text message from this person or number. Phone 8001 can also include information 8005 to show the date and time the last message sent or received. Phone 8001 can also include information 8006 to show the message first sent from this phone to the phone or number in 8003. Phone 8001 can also include information 8007 to show the response SMS text message sent Phone 8001 can also include information 8008 to show the second out going SMS text message sent out, perhaps in reply to received message 8007. Subsequent SMS text message 8009 can be shown from the called person or number. Text entry box 8010 is provided for a potential third message to be sent. Phone 8001 can also include an on screen keyboard 8011 for typing in characters to be sent as an SMS text message. Note that SMS text messages that contain phone numbers can be tapped to call those (and saved in an address book), web Uniform Resource Locators (URLs) can open in browser, email addresses can open in a mail application.

Figure 14:
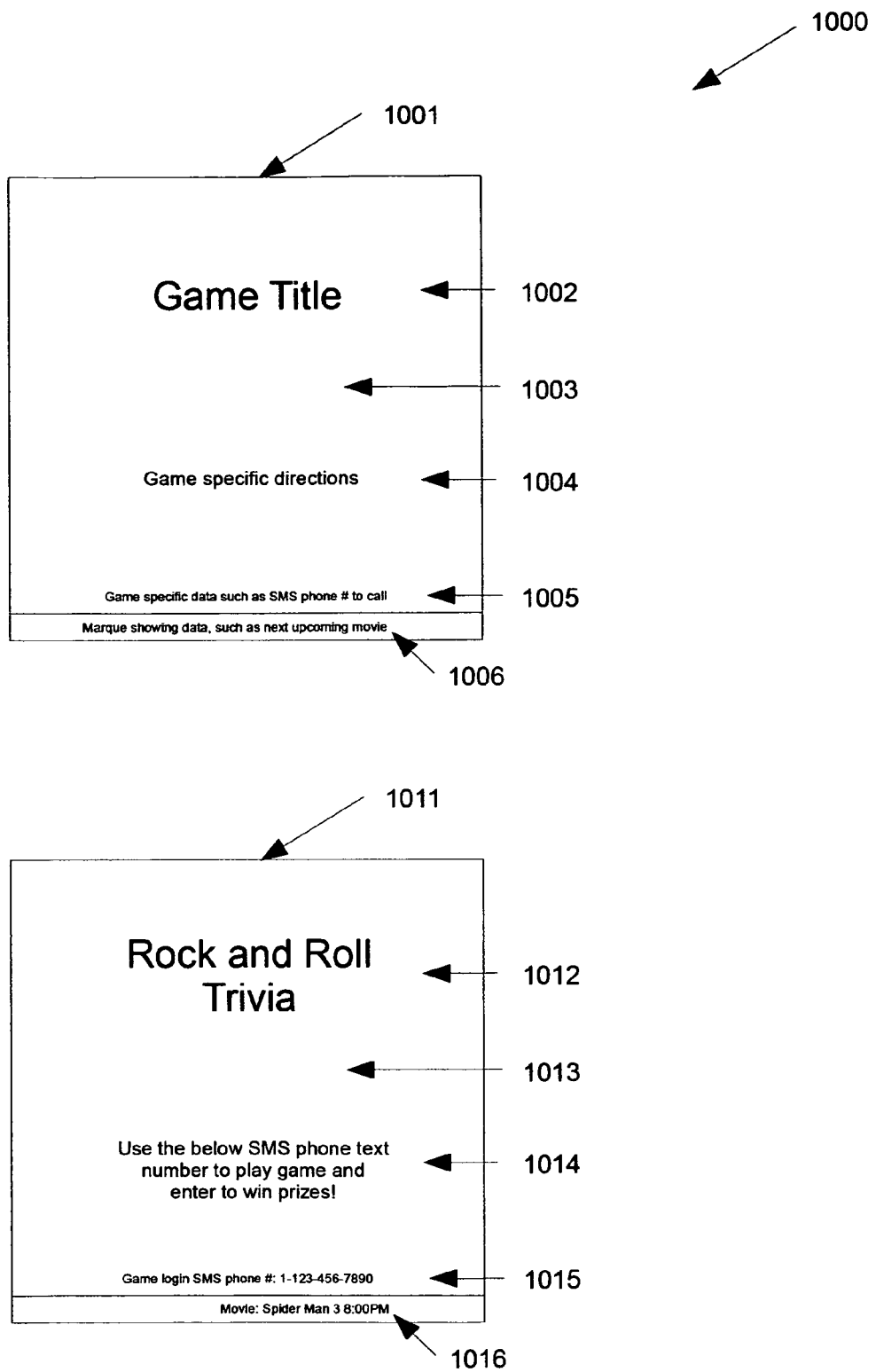
FIGS. 14-19 illustrate several sample display screen snapshots in various example embodiments.

FIGS. 14-19 illustrate several sample display screen snapshots in various example embodiments, which are described in more detail below. FIG. 14 illustrates a full theater screen view 1001 for an SMS played game. The theater screen view 1001 can show the game title 1002, background art images, animations, or such 1003, directions 1004 on generally how to play the game, game specific details on joining into the game 1005, such as a phone number to text using SMS data communications, a start phrase if a gateway needs to steer SMS packet, a possible "call sign" for the user, etc. Game specific details 1005 may state that complete game rules are posted in the lobby of theater, available on a card in seat, etc. The theater screen view 1001 can also show a marquee 1006 that scrolls theater screen data, up-coming event information, advertising, or non-game related information.

A specific example of full theater screen view 1001 is also shown as full theater screen view 1011, including information displays 1012-1016 as detailed above.

Figure 15:
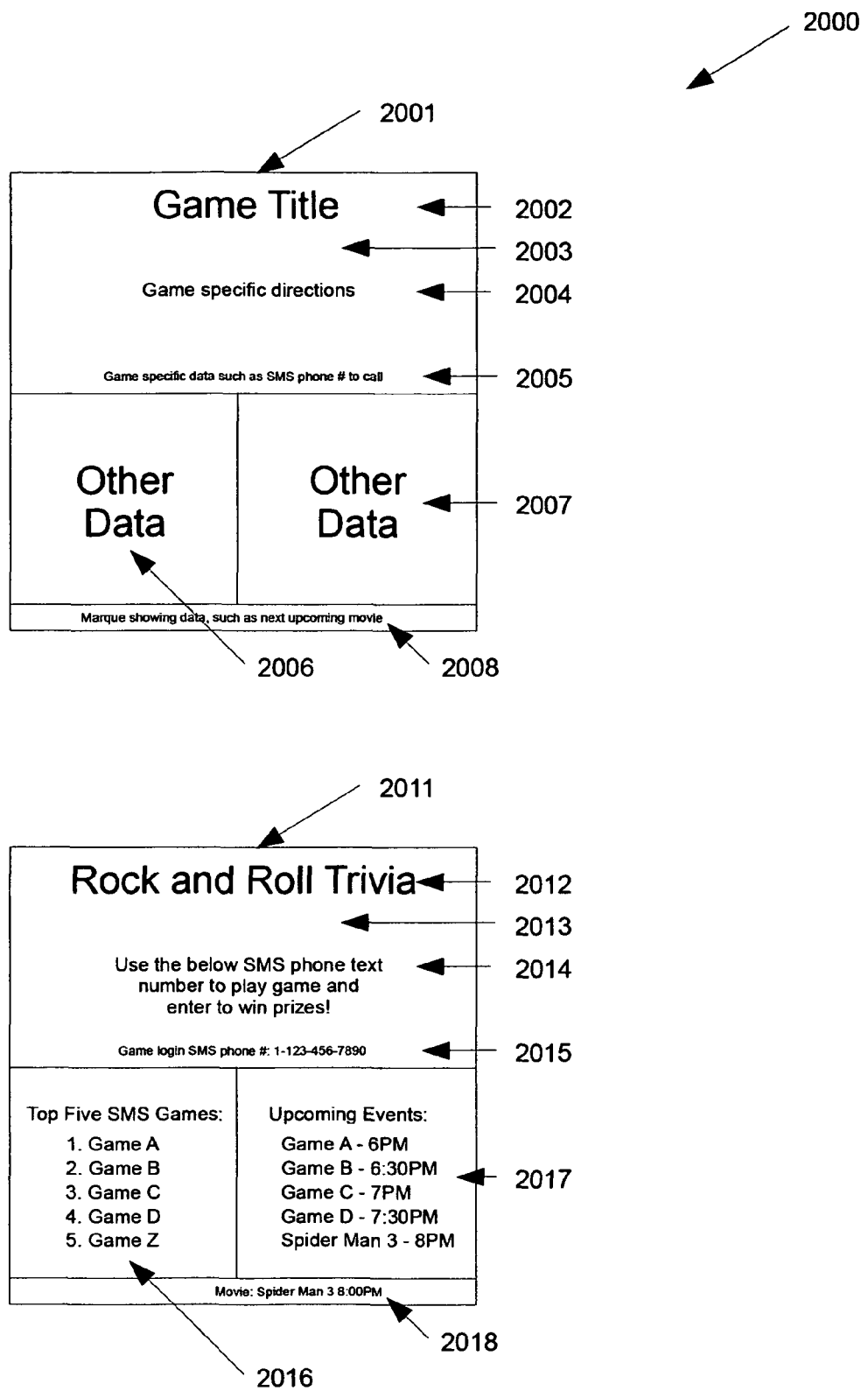

FIG. 15 illustrates a theater screen view 2001 with only half of the screen allocated for an SMS played game. The example embodiment of the theater screen view 2001 can share the theater screen with other content. The SMS played game can be displayed in a top portion, bottom portion, or one of the four quadrant portions of the screen. The theater screen view 2001 can show the game title 2002, background art images, animations, or such 2003, directions 2004 on generally how to play the game, game specific details on joining into the game 2005, such as a phone number to text using SMS data communications, a start phrase if a gateway needs to steer SMS packet, a possible "call sign" for the user, etc. Game specific details 2005 may state that complete game rules are posted in the lobby of theater, available on a card in seat, etc. The theater screen view 2001 can also show a marquee 2008 that scrolls theater screen data, up-coming event information, advertising, or non-game related information. Additionally, other data portions 2006 and 2007 can be displayed in other portions of the theater screen view 2001. The other content 2006 and 2007 can include other content stream data, such as videos, games, movies and such, or other parts of this game (progress, scores, etc).

A specific example of half theater screen view 2001 is also shown as half theater screen view 2011, including information displays 2012-2018 as detailed above.

Figure 16:
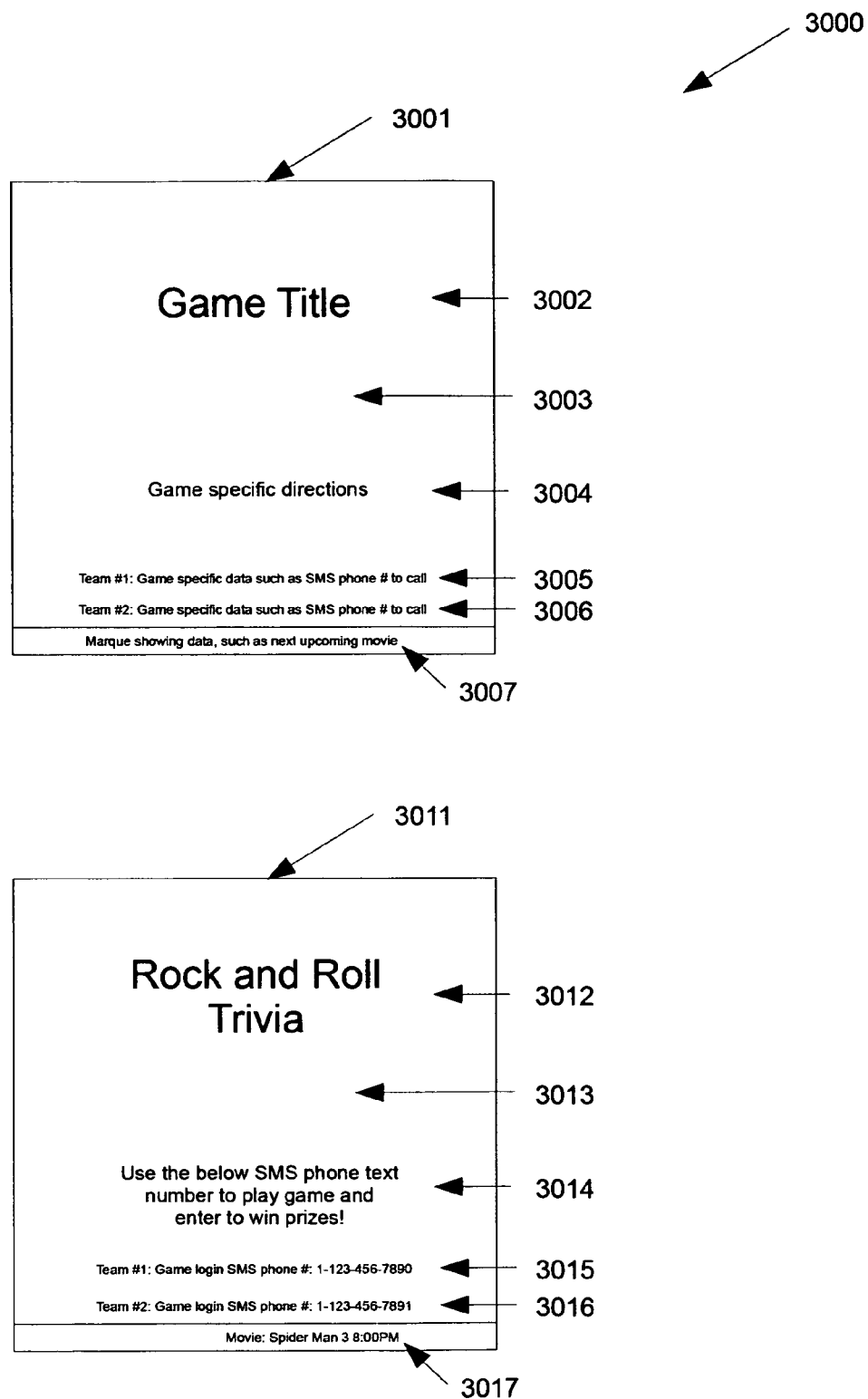

FIG. 16 illustrates a full theater screen view 3001 for a multi-team SMS played game. View 3001 can support a screen for multiple team/tournament play where players get to pick a team. Otherwise, a computer server (game server) gets to place players into a team based on a pre-defined algorithm (e.g. random, last digit of their phone number being odd, time of arrival, etc.). The theater screen view 3001 can show the game title 3002, background art images, animations, or such 3003, directions 3004 on generally how to play the game, game specific details on joining into the game 3005, such as a phone number to text using SMS data communications, a start phrase if a gateway needs to steer SMS packet, a possible "call sign" for the user, etc. Game specific details 3005 may instruct a player to select a team number from provided SMS text, etc. Additionally, game specific details can include an SMS phone number 3005 to message for team 1. Game specific details can include an SMS phone number 3006 to message for team 2. Additional teams may be similarly supported. Game specific details 3005 may also state that complete game rules are posted in the lobby of theater, available on a card in seat, etc. The theater screen view 3001 can also show a marquee 3007 that scrolls theater screen data, up-coming event information, advertising, or non-game related information.

A specific example of full theater screen multi-team view 3001 is also shown as full theater screen view 3011, including information displays 3012-3017 as detailed above.

Figure 17:
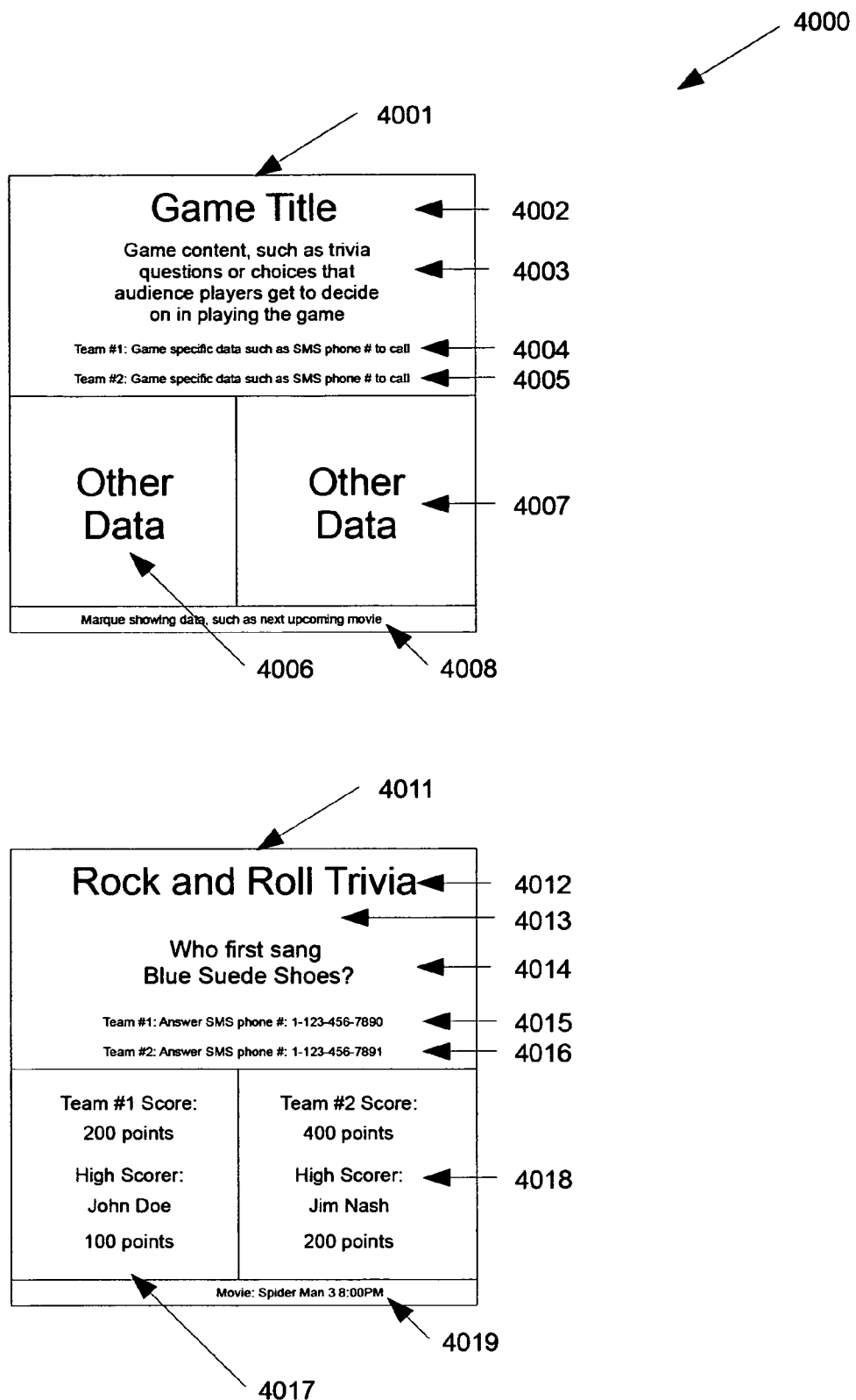

FIG. 17 illustrates a half theater screen view 4001 with only half of the screen allocated for a multi-team SMS played game. The example embodiment of the theater screen view 4001 can share the theater screen with other content. The multi-team SMS played game can be displayed in a top portion, bottom portion, or one of the four quadrant portions of the screen. View 4001 can support a screen for multiple team/tournament play where players get to pick a team. Otherwise, a computer server (game server) gets to place players into a team based on a pre-defined algorithm (e.g. random, last digit of their phone number being odd, time of arrival, etc.). The theater screen view 4001 can show the game title 4002, background art images, animations, or such 4003, directions 4004 on generally how to play the game, game specific details on joining into the game 4005, such as a phone number to text using SMS data communications, a start phrase if a gateway needs to steer SMS packet, a possible "call sign" for the user, etc. Game specific details 4004 and 4005 may instruct a player to select a team number from provided SMS text, etc. Additionally, game specific details can include an SMS phone number 4004 to message for team 1. Game specific details can include an SMS phone number 4005 to message for team 2. Additional teams may be similarly supported. Game specific details 4004 and 4005 may also state that complete game rules are posted in the lobby of theater, available on a card in seat, etc. The theater screen view 4001 can also show a marquee 4008 that scrolls theater screen data, up-coming event information, advertising, or non-game related information. Additionally, other data portions 4006 and 4007 can be displayed in other portions of the theater screen view 4001. The other content 4006 and 4007 can include other content stream data, such as videos, games, movies and such, or other parts of this game (progress, scores, etc).

A specific example of half theater screen view 4001 is also shown as half theater screen view 4011, including information displays 4012-4019 as detailed above.

Figure 18:
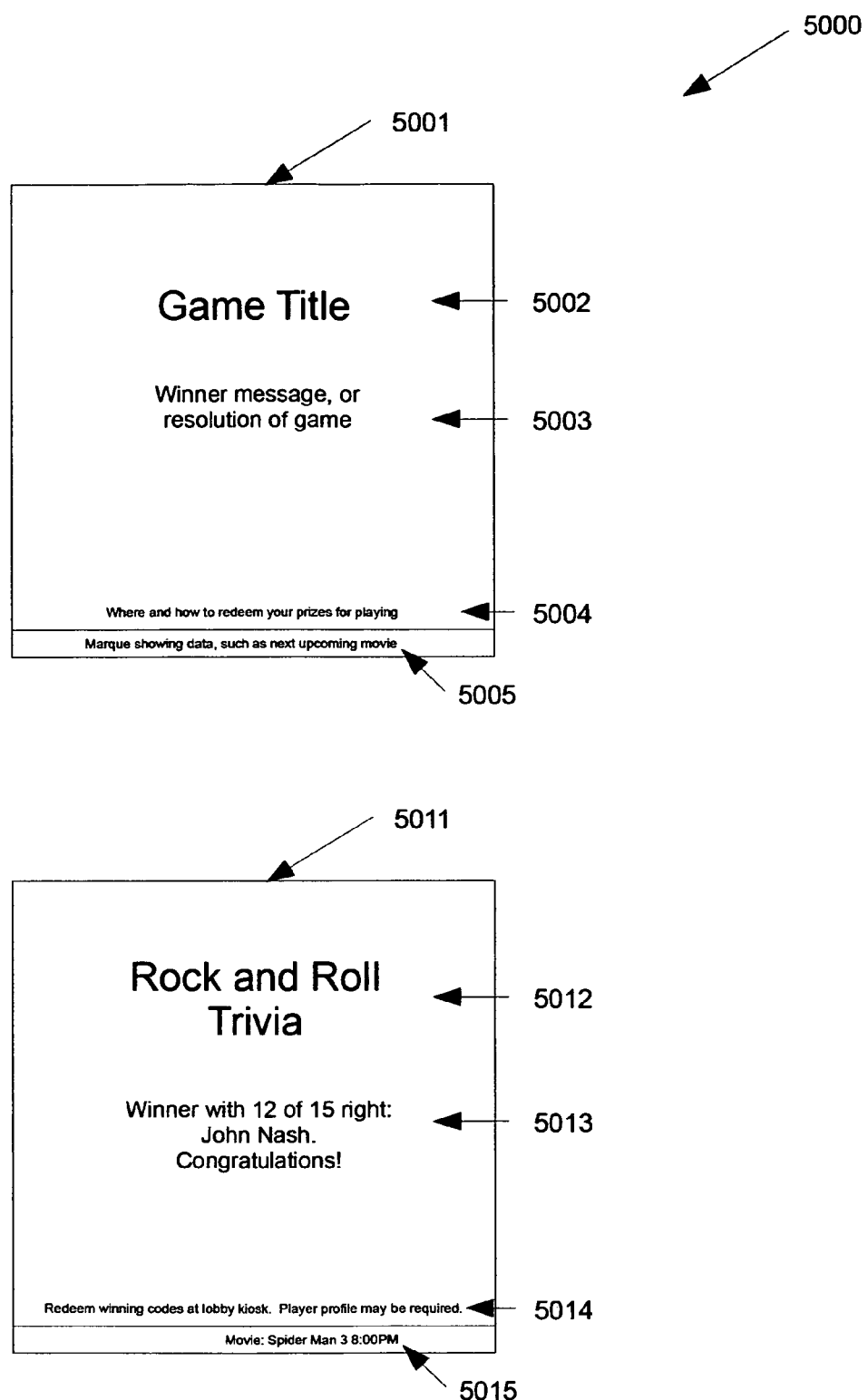

FIG. 18 illustrates a full theater screen view 5001. The example embodiment of the theater screen view 5001 can be used to show the game end or final outcome information. Theater screen view 5001 can include displays for the game title 5002, game specific (end) message 5003, and game or site specific information 5004 to inform a winning game player that they have won a prize or to show player statistics, tournament standings, etc. Game or site specific information 5004 may also direct a winning player to visit the lobby (management, kiosks, concessions booth), web or mail in code or such to redeem a prize. The theater screen view 5001 can also show a marquee 5005 that scrolls theater screen data, up-coming event information, advertising, or non-game related information.

A specific example of theater screen view 5001 is also shown as theater screen view 5011, including information displays 5012-5015 as detailed above.

Figure 19:
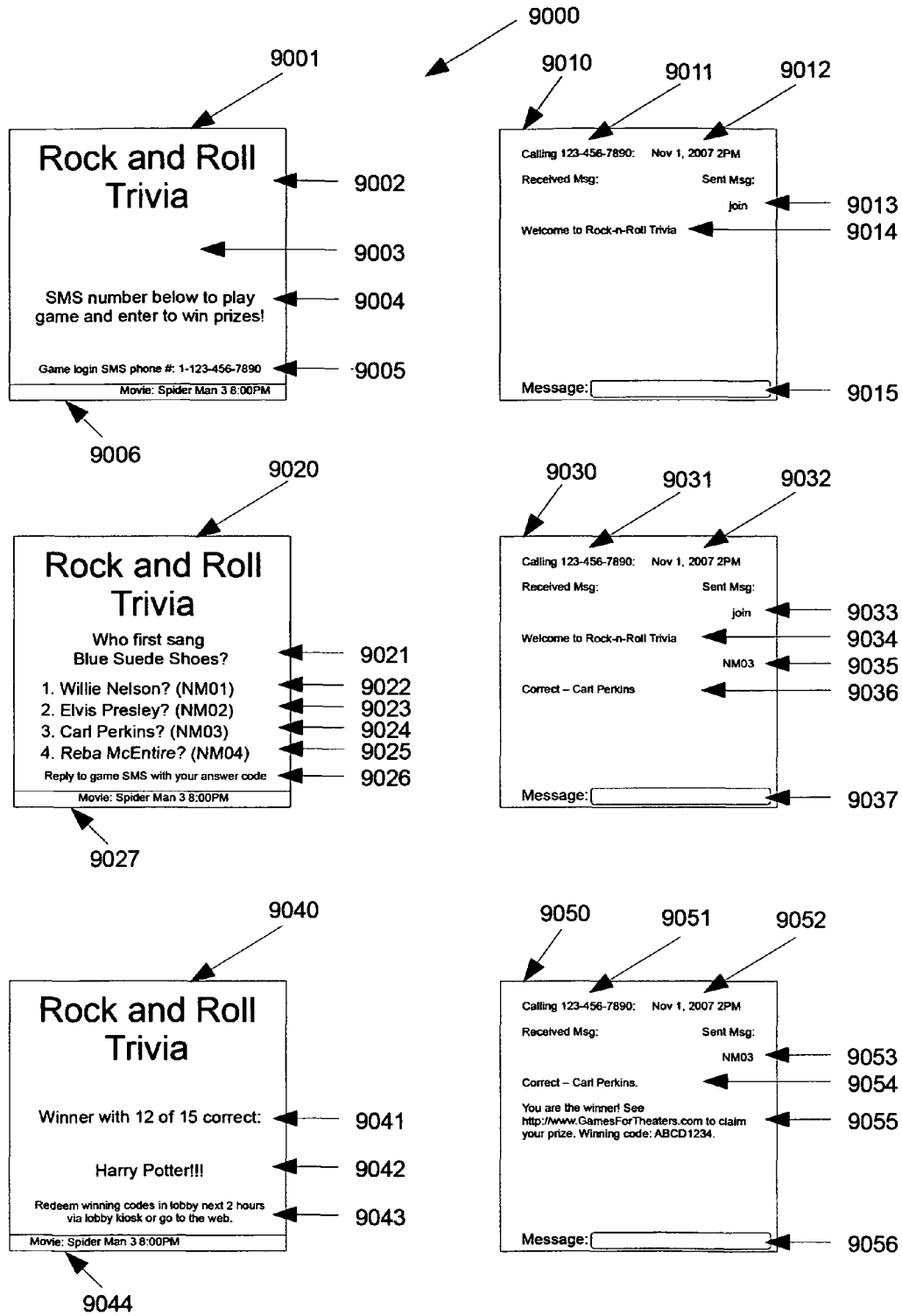

FIG. 19 illustrates a series of display screen views 9000 that illustrate an example of game player login (9001, 9010), game play (9020, 9030), and game completion (9040, 9050). Display screen views 9001, 9020, and 9040 are displayable on a common shared big screen, such as a theater screen. Display screen views 9010, 9030, and 9050 are displayable on the small display screen that is integral to the wireless communication device 6011, such as the display screen on an SMS capable cellular telephone. As shown in the example of FIG. 19, game player login theater screen view 9001 includes game title 9002, game background images/animation 9003, game specific directions 9004 instructing a user on how to login and play a game, and game specific data 9005, such as an SMS phone number to call and perhaps any initial text message content, team play information, how to information, etc. Game player login theater screen view 9001 also includes marquee 9006 showing upcoming events, movies, announcements, and the like.

FIG. 19 also illustrates a series of display screen views 9010 that illustrate an example of game player login 9010, game play 9030, and game completion 9050 from the perspective of the user of the wireless communication device 6011. Display screen views 9010, 9030, and 9050 are displayable on the small display screen that is integral to the wireless communication device 6011, such as the display screen on an SMS capable cellular telephone. As shown in the example of FIG. 19, game player login on the wireless communication device 6011 provides SMS text messaging screen view 9010 that includes information 9011 indicating the SMS phone number being called to join the game (e.g. 123-456-7890), the date 9012 that the last SMS text message was sent or received, an SMS text message 9013 sent by a player to initiate game play. In this example, the SMS text message, "join game" is sent to game server to join a game. A response SMS text message 9014 comes back to the joining player from game server telling the player that they have successfully been logged into the game. A text edit box 9015 is provided to prepare the next text message to be sent by the game player, where characters are entered either by an on-screen keyboard on the wireless communication device 6011, a phone T9 multi-tap method, touch screen input (graffiti) or perhaps voice (phone device dependent).

FIG. 19 illustrates a theater display screen view 9020 that illustrates an example of game play. Display screen views 9020 is displayable on a common shared big screen, such as a theater screen. In view 9020, a main game play screen is displayed. This main game play screen can include questions for trivia, graphics for action games, images with arrows to specify possible movements allowed of on-screen game pieces, sprites, avatars, or general video/images. Theater screen 9020 also includes game specific data 9021, for example, displaying a trivia question posed to game players, etc. Information displays 9022-9025 can be used to show possible player actions to decide/vote on, such as answering questions. Answers to the posed questions can be sent in SMS text conveying a text code for an answer or simple text of the actual answer (possible answers are not typically shown on the shared theater screen). Theater screen 9020 also includes game specific details 9026 describing how or where to send answers for this game or site. Theater screen 9020 also includes marquee 9027 showing upcoming events, movies, announcements, and the like.

FIG. 19 also illustrates a display screen view 9030 that illustrates an example of game play from the perspective of the user of the wireless communication device 6011. Display screen view 9030 is displayable on the small display screen that is integral to the wireless communication device 6011, such as the display screen on an SMS capable cellular telephone. As shown in the example of FIG. 19, game play on the wireless communication device 6011 provides SMS text messaging screen view 9030 that includes information 9031 indicating the SMS phone number being called to play the game (e.g. 123456-7890), the date 9032 that the last SMS text message was sent or received, an SMS text message 9033 sent by a player to initiate game play. In this example, the SMS text message, "join game" is sent to game server to join a game. A response SMS text message 9034 comes back to the joining player from game server telling the player that they have successfully been logged into the game. In the SMS text message 9035, a player sends a first SMS text message for game play input, in this case for selecting a particular game answer. The answer code plus the SMS of the message ties the player input to the player for the game server. A response SMS text message 9036 comes back to the player from the game server giving the player an answer to the player's choice entered in 9035 and giving game play status for this particular player, team, or device (cell phone) A text edit box 9037 is provided to prepare the next text message to be sent by the game player, where characters are entered either by an on-screen keyboard on the wireless communication device 6011, a phone T9 multi-tap method, touch screen input (graffiti) or perhaps voice (phone device dependent).

FIG. 19 illustrates a display screen view 9040 that illustrates an example of game play completion. Display screen view 9040 is displayable on a common shared big screen, such as a theater screen. As shown in the example of FIG. 19, game play completion theater screen view 9040 includes game title, game background images/animation, game specific result or completion information 9041 instructing game players on the results of a completed game, game winner information 9042, and prize redemption information 9043. Game play completion theater screen view 9040 also includes marquee 9044 showing upcoming events, movies, announcements, and the like.

FIG. 19 also illustrates a display screen view 9050 that illustrates an example of game completion from the perspective of the user of the wireless communication device 6011. Display screen view 9050 is displayable on the small display screen that is integral to the wireless communication device 6011, such as the display screen on an SMS capable cellular telephone. As shown in the example of FIG. 19, game completion on the wireless communication device 6011 provides SMS text messaging screen view 9050 that includes information 9051 indicating the SMS phone number being called to play the game (e.g. 123456-7890), the date 9052 that the last SMS text message was sent or received, and an SMS text message 9053 sent by a player to respond to a game question. In this example, the SMS text message, "NM03" is sent to the game server to respond to a game question. A response SMS text message 9054 comes back to the player from game server telling the player that they have successfully answered the game question. A further response SMS text message 9055 comes back to the player from game server telling the player that they have won the game. Response SMS text message 9055 further provides game prize redemption information so the game winner can claim a prize for winning the game. A text edit box 9056 is provided to prepare the next text message to be sent by the game player, where characters are entered either by an on-screen keyboard on the wireless communication device 6011, a phone T9 multi-tap method, touch screen input (graffiti) or perhaps voice (phone device dependent).

Figure 20:
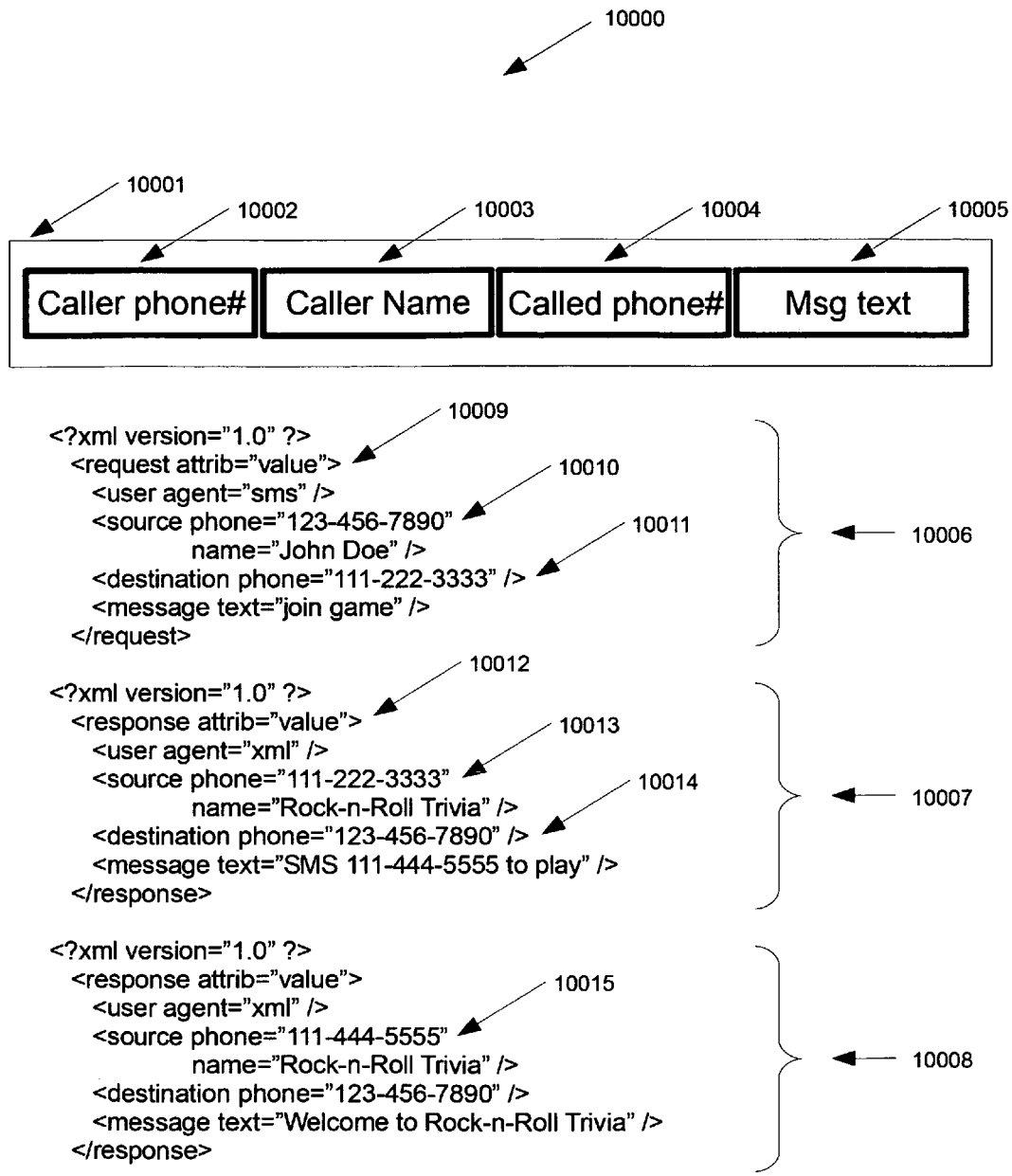
FIG. 20 illustrates sample portions of XML code in various example embodiments, including a sample XML login message, a sample XML reply message including an SMS telephone number, and a sample XML welcome message.
Figure 21:
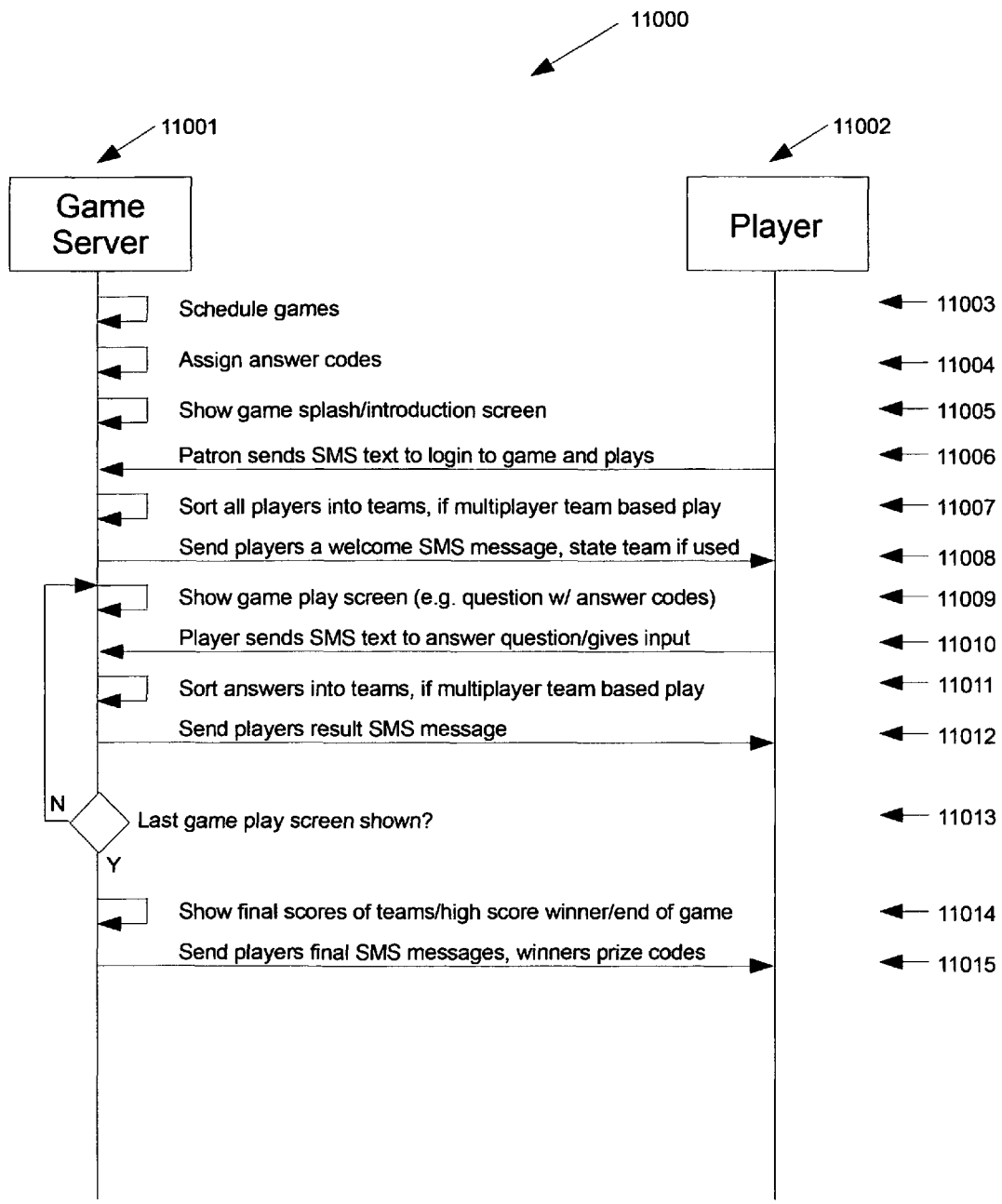
FIGS. 21-24 illustrate several sample event sequence diagrams in various example embodiments.
Figure 22:
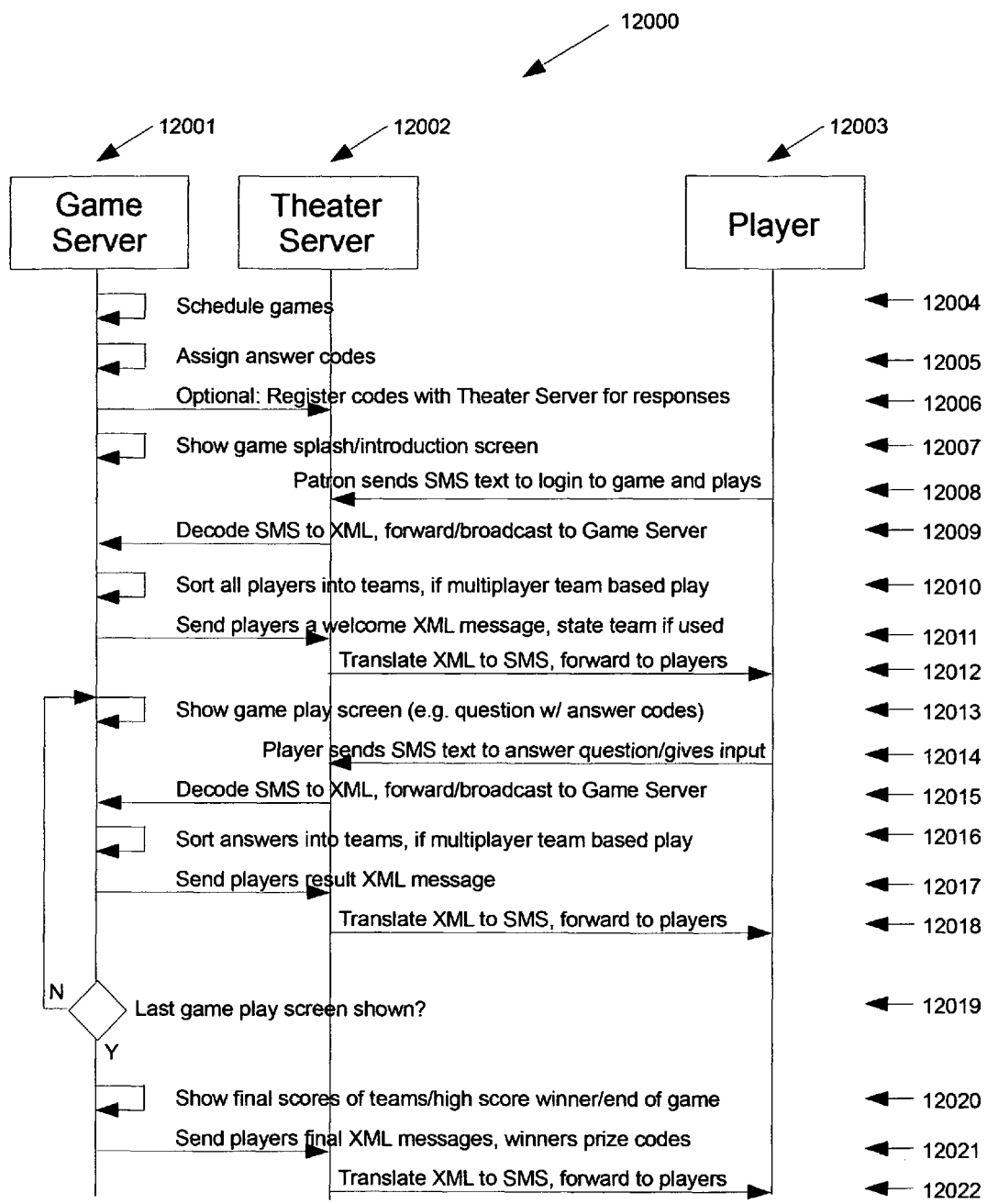
Figure 23:
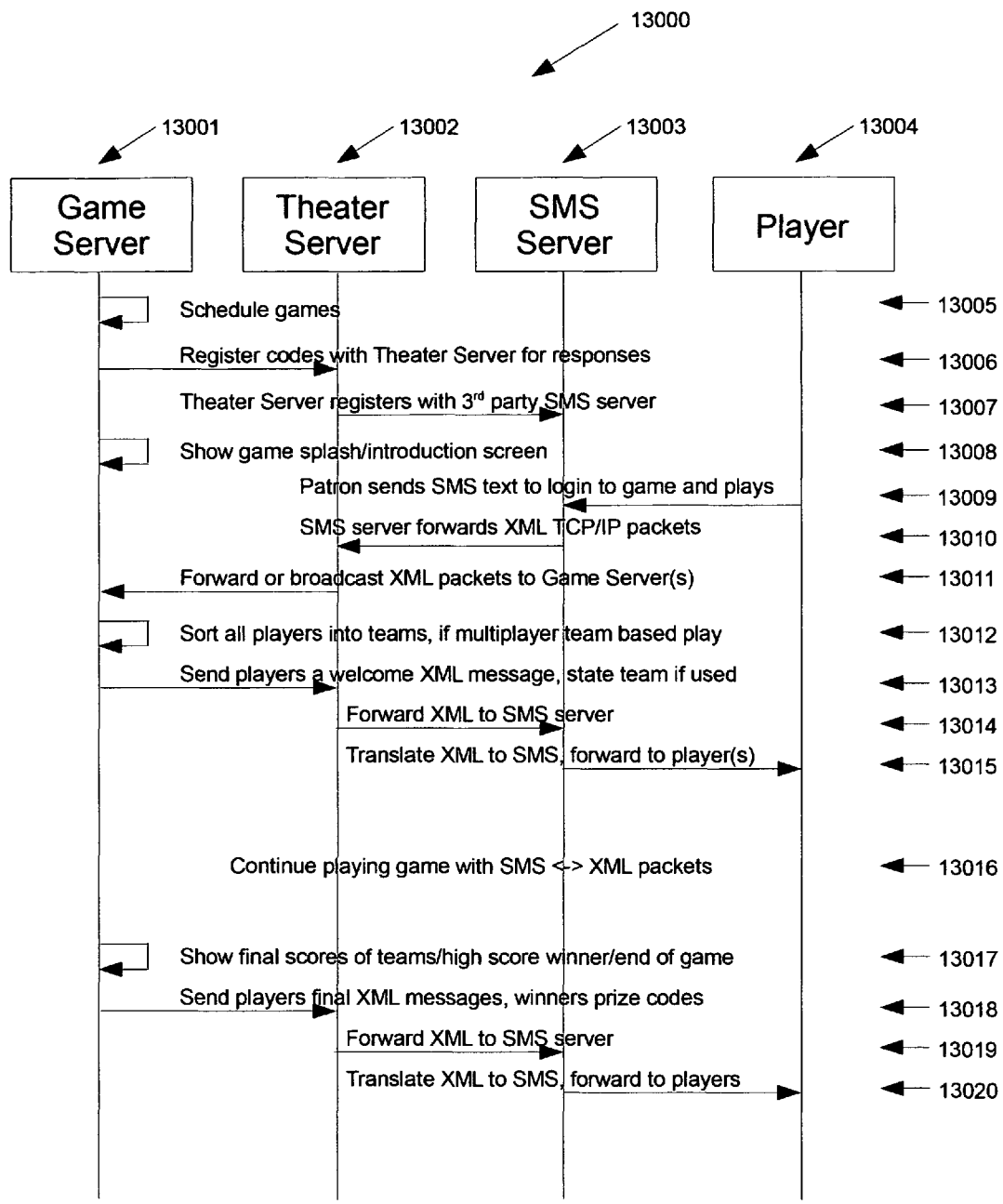
Figure 24:
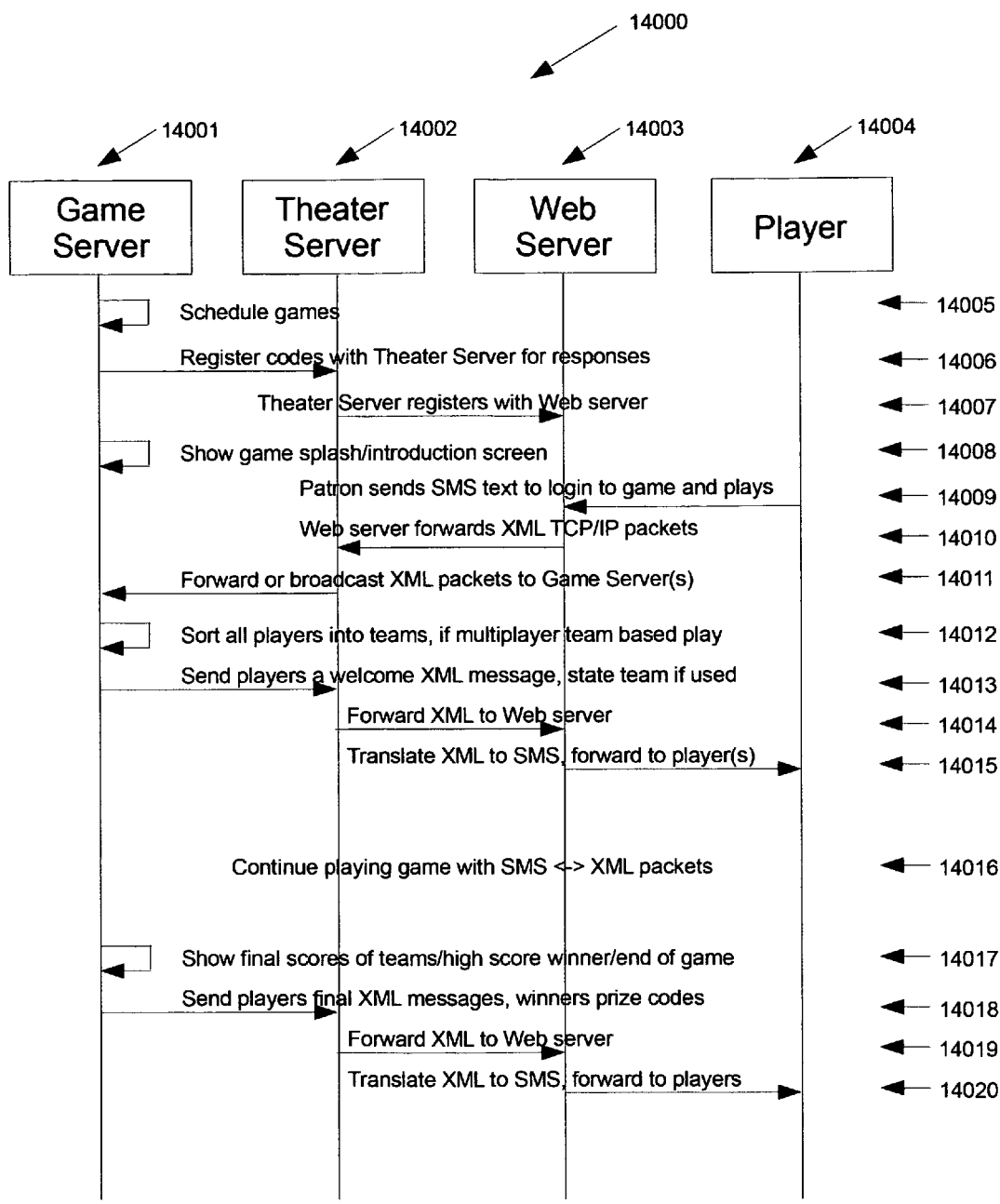

FIG. 20 illustrate sample portions of XML code in various example embodiments. In particular, FIG. 20 illustrates a sample general SMS message (short message service) 10001. The sample SMS message 10000 includes an SMS sender phone number (caller number) 10002, an SMS sender name (caller name) 10003, the called SMS phone number (called number) 10004, and message text 10005. Message text 10005 can typically be 160 7-bit characters, 140 8-bit characters, or 70 16-bit characters.

Sample XML packet 10006 can be sent in conventional TCP/IP, such as through sockets, web services, or embedded in email, etc. The example data shown in the example of FIG. 20 illustrates a person using SMS to login or join a new SMS based game. The Called number (10011) can be shown on the theater screen as a contact phone number, while game login specific data also comes from theater screen and may state what message to send as data so that multiple simultaneous games can be discerned, otherwise it may simply be a command phrase or empty.

Sample XML TCP/IP reply 10007 in the illustrated example is sent back to the player and will reach the player in SMS format. The game server, SMS gateway or third party will do the XML-to-SMS translation. This example may have a new game specific instance phone number for either specific players on a team, load balancing the available game servers (the others simply play a video synchronized according to a schedule or different means), or such.

Message 10008 is an example of an XML welcome message (e.g. "Welcome to a new game"). The XML message can be displayed to game players on a shared theater screen and to users later via SMS messaging. This particular message is used to inform players that a game has started or they have joined a game.

In a particular embodiment, the game server 6010 can prepare a "welcome" response to the initial login by a joining player. In the prepared "welcome" response to the player, the response can include the text of an IP address and port identifier that the player can use to play the game over a WiFi connection, if the client in the player device is so capable. In this case, the particular embodiment performs an SMS-to-TCP/IP hand off or translation.

As an example of the embodiment described above, consider the following example. Game Server 6010 can have: 1) game software showing games, 2) a cellular modem for SMS messages, and 3) an auditorium facing and available wireless WiFi network with a TCP address and port identifier to contact game software directly, and optionally the auditorium wireless SSID (service set ID). In this case, the game server 6010 prepared response may be of form, "Welcome to <game name>. http://<IP ADDR>:<PORT NUMBER>/ [?SSID=<SSID>[&pass=<passphrase>]]". As a particular example of this prepared response, see the format below:

"Welcome to Rock and Roll Trivia http:192.168.10.2:9494/" (SMS→IP 192.168.10.2 and Port 9494)

"Welcome to Rock and Roll Trivia http:192.168.10.2:9494/?SSID=gft-aud1" (SMS→IP 192.168.10.2, Port 9494, WiFi SSID gft-aud1 and no passphase or open)

"Welcome to Rock and Roll Trivia http://192.168.10.2:9494/?SSID=gft-aud1&pass=1234567890" (SMS→IP 192.168.10.2, Port 9494, WiFi SSID gft-aud1 and passphrase 1234567890)

Cell phone application software in wireless communication device 6011, being perhaps a preloaded application in the device or a user pre-downloaded application from web, such as by direction on theater flyers, theater screen directions, or a host web site, can drive the SMS messages and then parse this response to automatically switch over from starting with SMS text messages to use a TCP/IP wireless WiFi network.

In another particular embodiment, the game server 6010 can prepare another "welcome" response to the initial login by a joining player. In the prepared "welcome" response to the player, the response can include the text of a Web URL or other link to a file for the player's device client to download software to play by a WiFi and TCP/IP connection, if the client in the player device is so capable. In this case, the particular embodiment performs an SMS-to-file download hand off or translation.

In the example embodiment described above, a web URL for a wireless communication device (e.g. cell phone) application software download may be embedded in a game welcome message. The software can be packaged as a Java applet or midlet. In this case, the game server initial login response can be implemented as illustrated in the following example.

"Welcome to Rock and Roll Trivia http://www.GamesForTheaters.com/download/file. ad"

The sample welcome text message illustrated above is basically a text message followed by an optional web URL to get a file that a user may click upon in the SMS application to automatically download the software. The next game the user plays can be either still via SMS communications or via the downloaded application which can start with SMS to get a current game's IP address and port identifier. Then, the data communication protocol for the player can switch to TCP/IP traffic to download data for a custom user interface and button input rather than using SMS text messaging.

FIGS. 21-24 illustrate several sample event sequence diagrams in various example embodiments. The illustrated embodiments show a sequence of events as game players play games via SMS messaging. The illustrated embodiments also show a sequence of events as the disclosed system processes the player input and associated game output.

Figure 25:
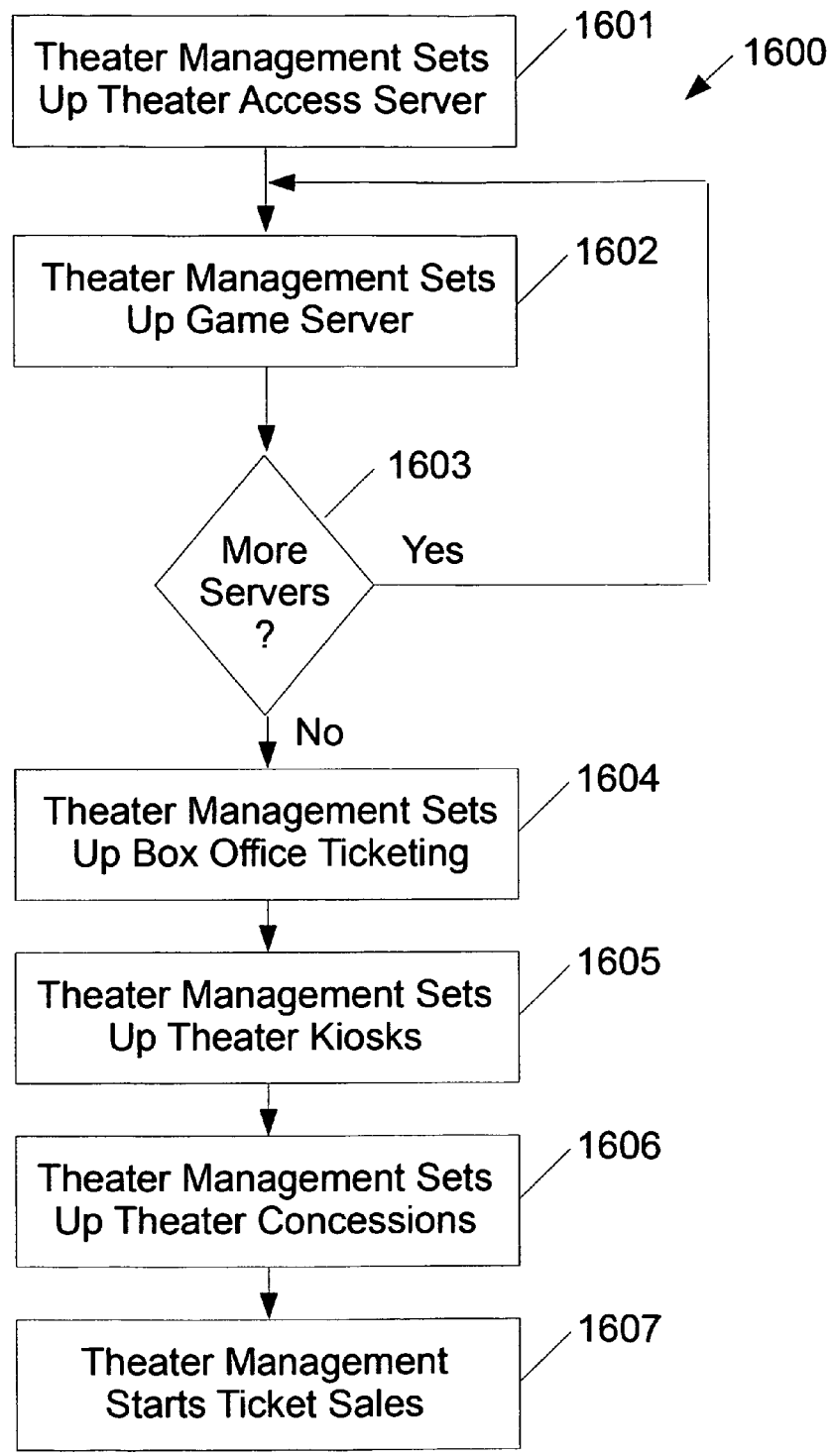
FIG. 25 illustrates a process 1600 for creating a Theater Site in a particular embodiment.

FIG. 25 illustrates a process for creating a Theater Site in a particular embodiment. As provided in a particular embodiment, the Theater Management Sets Up the Theater Access Server 101 in processing block 1601. In processing block 1602, the Theater Management Sets Up the Game Server(s) 103. In decision block 1603, Game Server 6010 set up continues until all game servers are set up. In processing block 1604, Theater Management Sets Up Box Office Ticketing. In processing block 1605, Theater Management Sets Up Theater Kiosks 603. In processing block 1606, Theater Management Sets Up Theater Concession Terminal(s) 604. In processing block 1607, Theater Management Starts Ticket Sales at the Box office and at the Kiosk 603. Theater Management also starts processing orders at the concession terminal 604.

Figure 26:
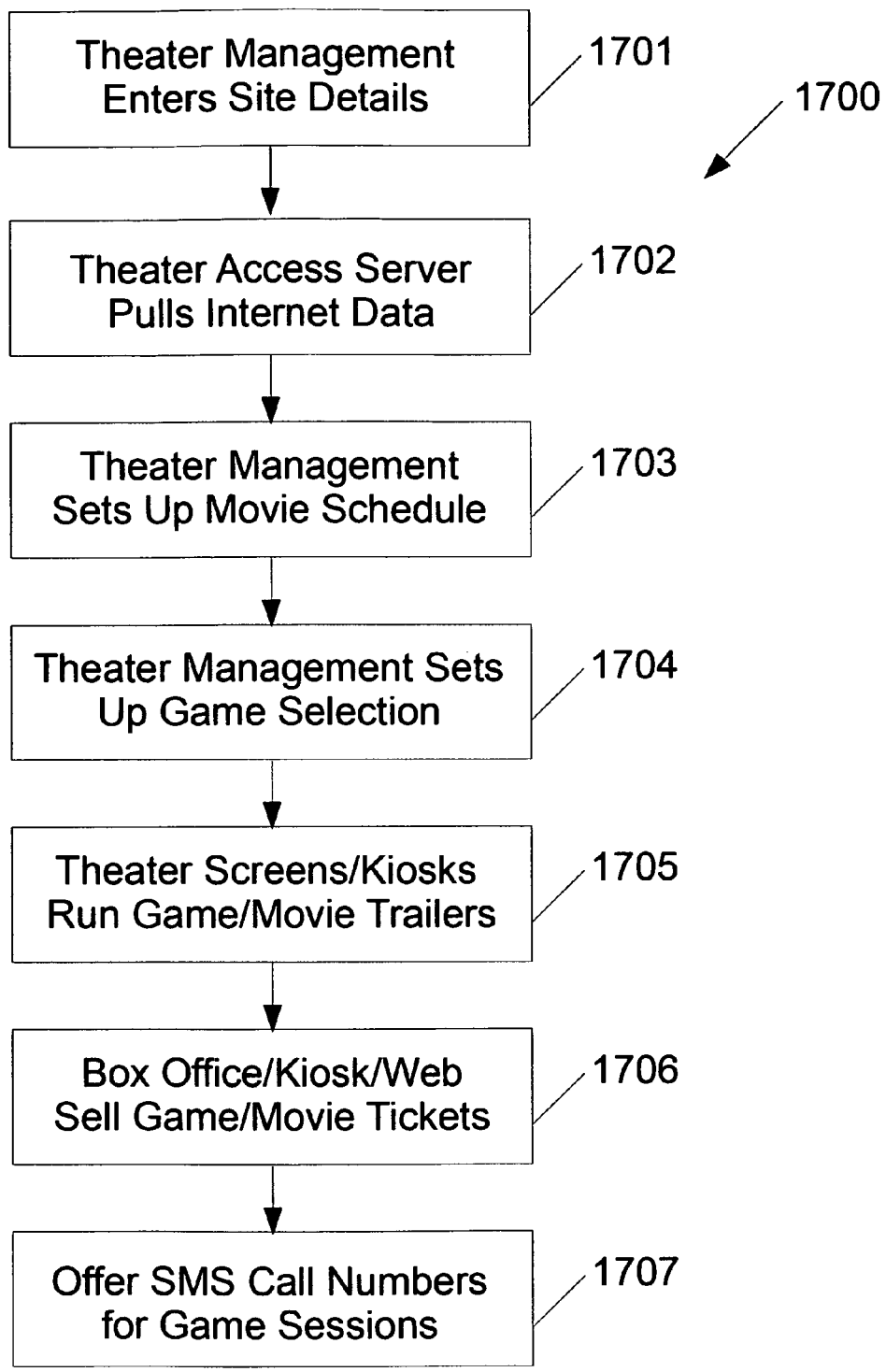
FIG. 26 illustrates a process 1700 for the set up of the Theater Access Server 101.

FIG. 26 illustrates a process for the set up of the Theater Access Server 101. As described in a particular embodiment, the process includes setting up a theater access server 101 with the Internet, ticketing, sales, event details (movies and games), plus allowing communication in/out for multi-site game play, customer download of data (event data) and player chat/schedules/invites. In processing block 1701, the Theater Management Enters Site Details, such as the name, location, theater chain, details on screens, game server(s), desired game content to download, schedules of events (movies/games), policy of event scheduling/communication, billing mechanisms (box office/cash card/credit card authorization) and layout of tickets printed. In processing block 1702, the Theater Access Server 101 Pulls Internet Data. In processing block 1703, Theater Management Sets Up the Movie Schedule. In processing block 1704, Theater Management Sets Up the Game Selection. In processing block 1705, Theater Screens/Kiosks Run Movie & Game Trailers. In processing block 1706, the Box Office/Kiosk/Web Sell Event (Movie and Game) Tickets. In processing block 1707, SMS call numbers are offered for use by wireless communication devices 6011 to participate in Game Sessions.

Figure 27:
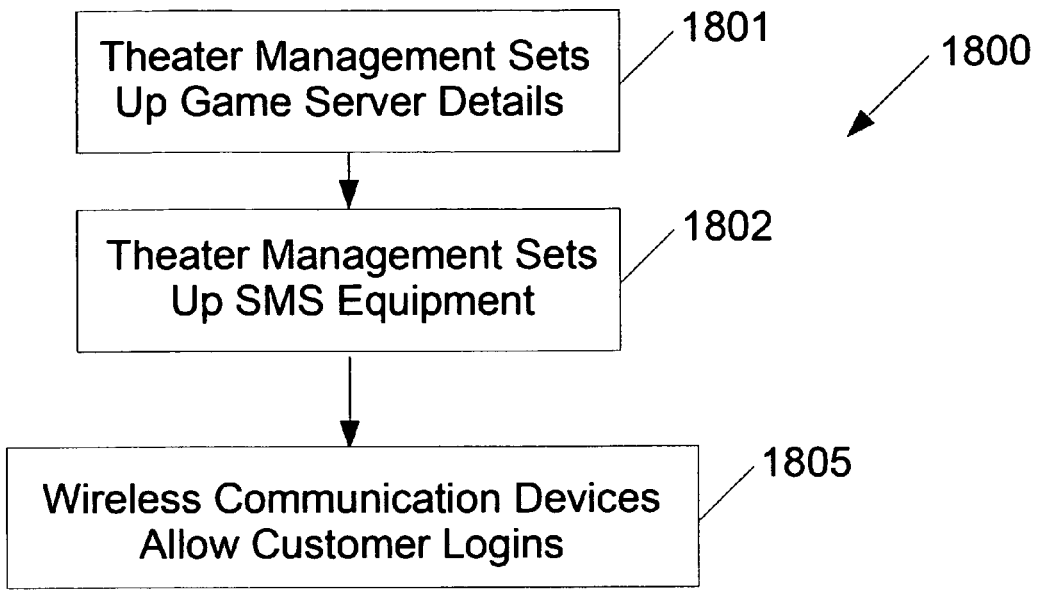
FIG. 27 illustrates a Theater Game Server 6010 Setup 1800.

FIG. 27 illustrates a Theater Game Server 6010 Setup. As described in a particular embodiment, Game Server 6010 can pull content in addition to movies, such as games, presentations, and educational/technical sessions. Theater Game Server 6010 can handle input from customers playing games or interactive content both locally and on other game servers, plus send out text messages or process data from the web. In a particular embodiment, Theater Game Server 6010 Setup processing is shown in FIG. 6M. In processing block 1801, Theater Management Sets up Game Server 6010 details. In processing block 1802, Theater Management Sets up SMS messaging equipment (e.g. cellular modems 6002). In processing block 1805, wireless communication devices 6011 can be used to allow customer logins (guest, member and host modes) and SMS communications with game server 6010.

Figure 28:
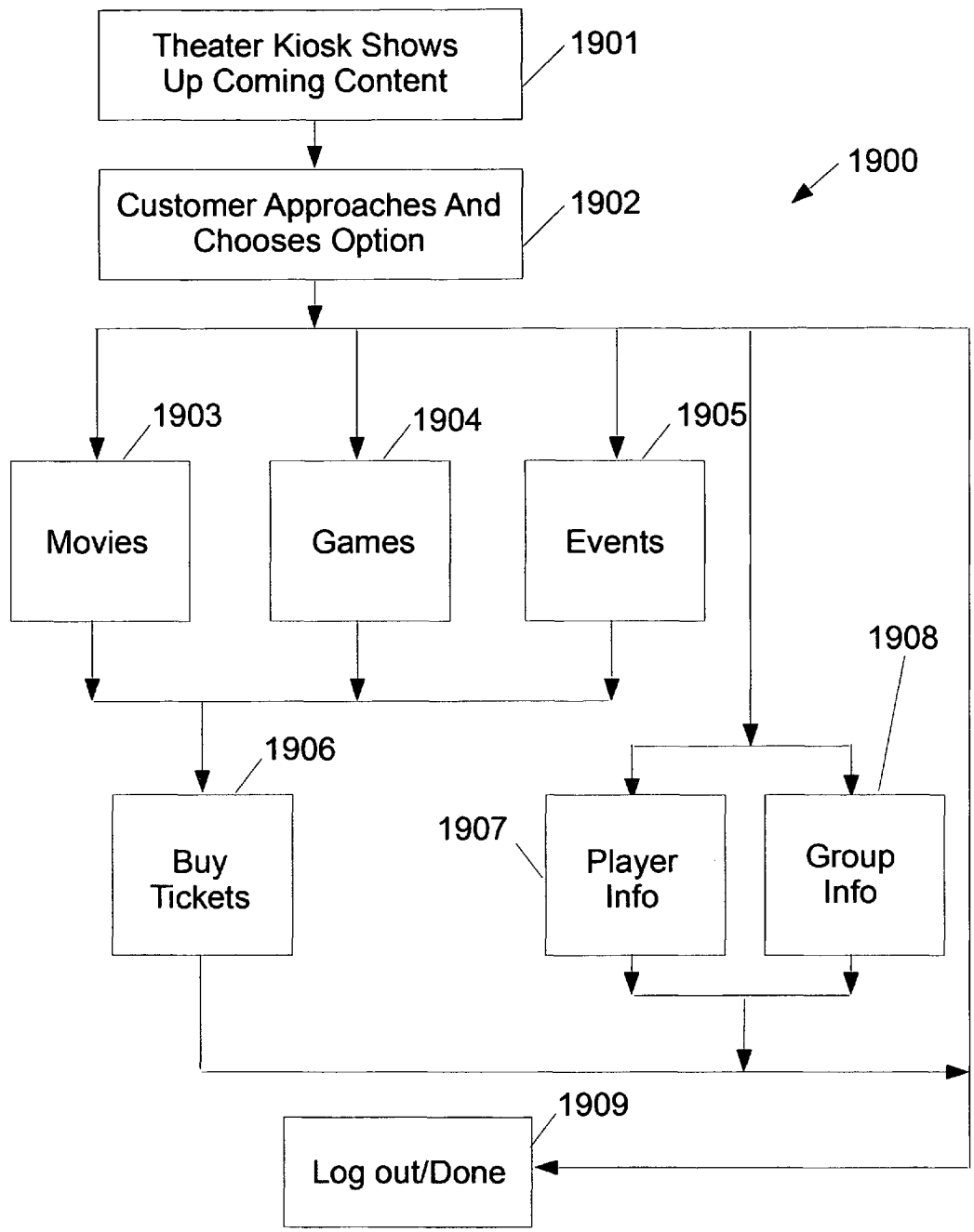
FIG. 28 illustrates a process for Theater Kiosk 603 with Customer Interactions 1900.

FIG. 28 illustrates a process for Theater Kiosk 603 with Customer Interactions. As described in a particular embodiment, a Theater Kiosk 603 allows a customer to search/buy event tickets, enter player/group details and send player invites (text messages or invite into group). In a particular embodiment, Theater Kiosk 603 processing is shown in FIG. 28. In processing block 1901, Theater Kiosk 603 shows upcoming content. In processing block 1902, a customer approaches the kiosk 603 and chooses an option. The available options are shown in blocks 1903-1909. In processing block 1903, a customer chooses a Movies option. In processing block 1904, a customer chooses a Games option. In processing block 1905, a customer chooses a General Event option (presentation, such as a technical or educational session). In processing block 1906, a customer chooses a Buy Tickets option. In processing block 1907, a customer chooses an Edit Player Information option. In processing block 1908, a customer chooses an Edit Player Group Details option, such as schedule, events and rating recommendations. In processing block 1909, a customer chooses a Logout option.

Figure 29:
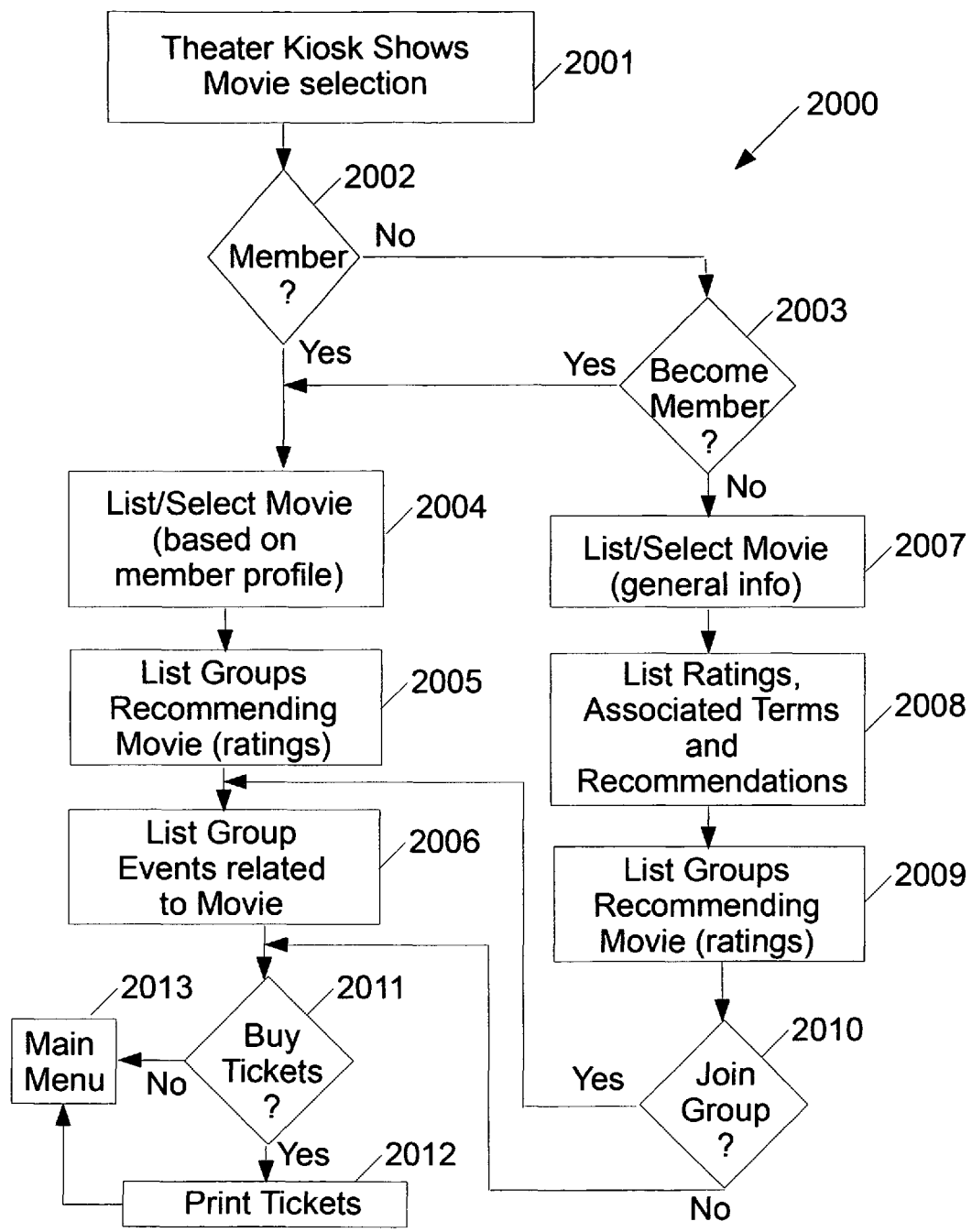
FIG. 29 illustrates a Theater Kiosk 603 Movie Search and Ticket Purchase 2000.

FIG. 29 illustrates a Kiosk 603 Movie Search and Ticket Purchase. As described in a particular embodiment, using customer and movie meta information, ratings and group recommendations, a customer is able to search and purchase tickets easily, plus schedule the movie so that others such as a group or buddy list can be invited along to the movie. In processing block 2001, Theater Kiosk 603 shows a movie selection option. In decision block 2002, the kiosk 603 uses the customer login identifier (if any) to determine if the customer is already a member with user profile information. If the customer is currently a member, processing continues at block 2004. If the customer is not currently a member, processing continues at decision block 2003. In decision block 2003, the customer is asked if s/he would like to become a member. If the customer chooses to become a member, processing continues at block 2004. If the customer chooses to not become a member, processing continues at block 2007. In processing block 2004, kiosk 603 can list and select a movie (listing ranked based on customer profile or events attended, interest keywords, group information, and other information relevant to this particular customer). In processing block 2005, kiosk 603 can list groups (name/description) who have ranked this movie before. In processing block 2006, kiosk 603 can list group events that may have featured the movie or have/will discuss this movie (e.g. fan groups). In processing block 2007, kiosk 603 can list and select a movie showing general details (title, actors, director, genre, description). In this case, customer profile information is not available. In processing block 2008, kiosk 603 can list ratings, associated terms and recommendations for the selected movie. In processing block 2009, kiosk 603 can list groups that recommend this movie (name, description). In decision block 2010, the customer is asked if s/he would like to join a group that recommends this movie or will discuss it at an event. If the customer chooses to join a group, processing continues at block 2006. If the customer chooses to not join a group, processing continues at block 2011. In decision block 2011, the customer is asked if s/he would like tickets printed. If so, the tickets are printed in processing block 2012 and the customer is directed back to the main menu.

Figure 30:
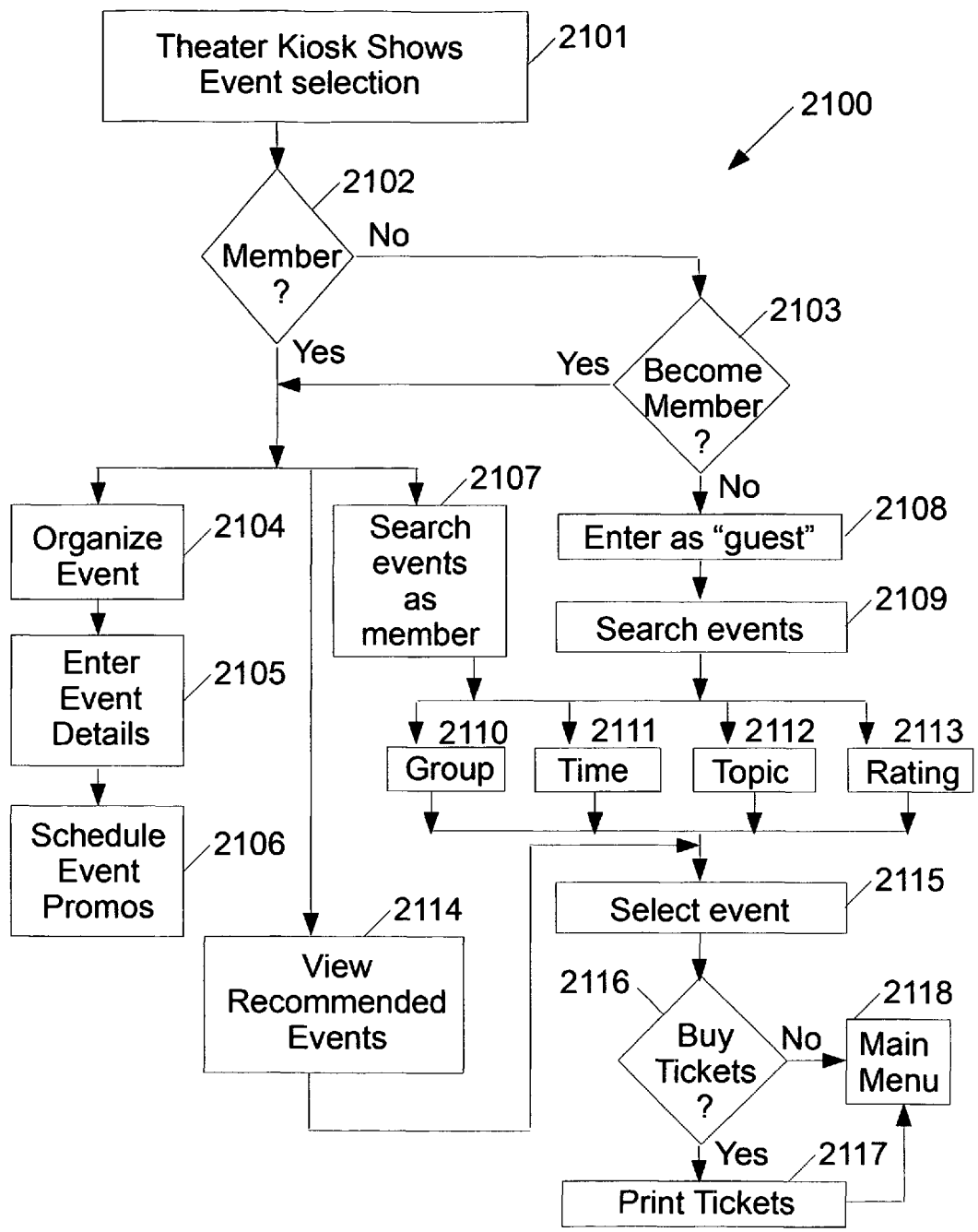
FIG. 30 illustrates a Theater Kiosk 603 Event Search and Ticket Purchase 2100.

FIG. 30 illustrates a Kiosk 603 Event Search and Ticket Purchase. As described in a particular embodiment, using customer and event meta information, ratings and group recommendations, a customer is able to search and purchase tickets easily, plus schedule the event so that others, such as a group or buddy list, can be invited along to the event. In processing block 2101, Theater Kiosk 603 shows an event selection option. In decision block 2102, the kiosk 603 uses the customer login identifier (if any) to determine if the customer is already a member with user profile information. If the customer is currently a member, processing continues at blocks 2104, 2107, or 2114. If the customer is not currently a member, processing continues at decision block 2103. In decision block 2103, the customer is asked if s/he would like to become a member. If the customer chooses to become a member, processing continues at blocks 2104, 2107, or 2114. If the customer chooses to not become a member, processing continues at block 2108. In processing block 2104, the customer is offered an option to organize a new event. In processing block 2105, the customer can enter details of event (title, description, keywords, location, group/host sponsor, cost, URL) and schedule the event, possibly pending theater management approval. In processing block 2106, the customer can schedule event promotions, advertisements and possibly trailer videos to show. In processing block 2107, the customer is offered an option to search events as a member, based on various criteria, including group, time, topic, and rating. In processing block 2108, the customer is offered an option to enter event search/selection as a guest (e.g. no previously stored customer profile or history information is available). In processing block 2109, the customer is offered an option to search events based on various criteria, including group, time, topic, and rating. In processing block 2110, the customer is offered an option to search and list events based on groups hosting an event (group name or group meta information). In processing block 2111, the customer is offered an option to search and list events based on a time an event will occur. In processing block 2112, the customer is offered an option to search and list events based on a topic (description or keywords). In processing block 2113, the customer is offered an option to search and list events based on ratings the event has received in previous occurrences. In processing block 2114, as a member with profile and perhaps group profile details, the customer is offered an option to view recommendations based on matches and ratings. In processing block 2115, the customer/member is offered the option to select an event to attend. In processing block 2116, the customer is asked if s/he would like to purchase tickets. If so, the tickets are printed in processing block 2117 and the customer is directed back to the main menu.

Figure 31:
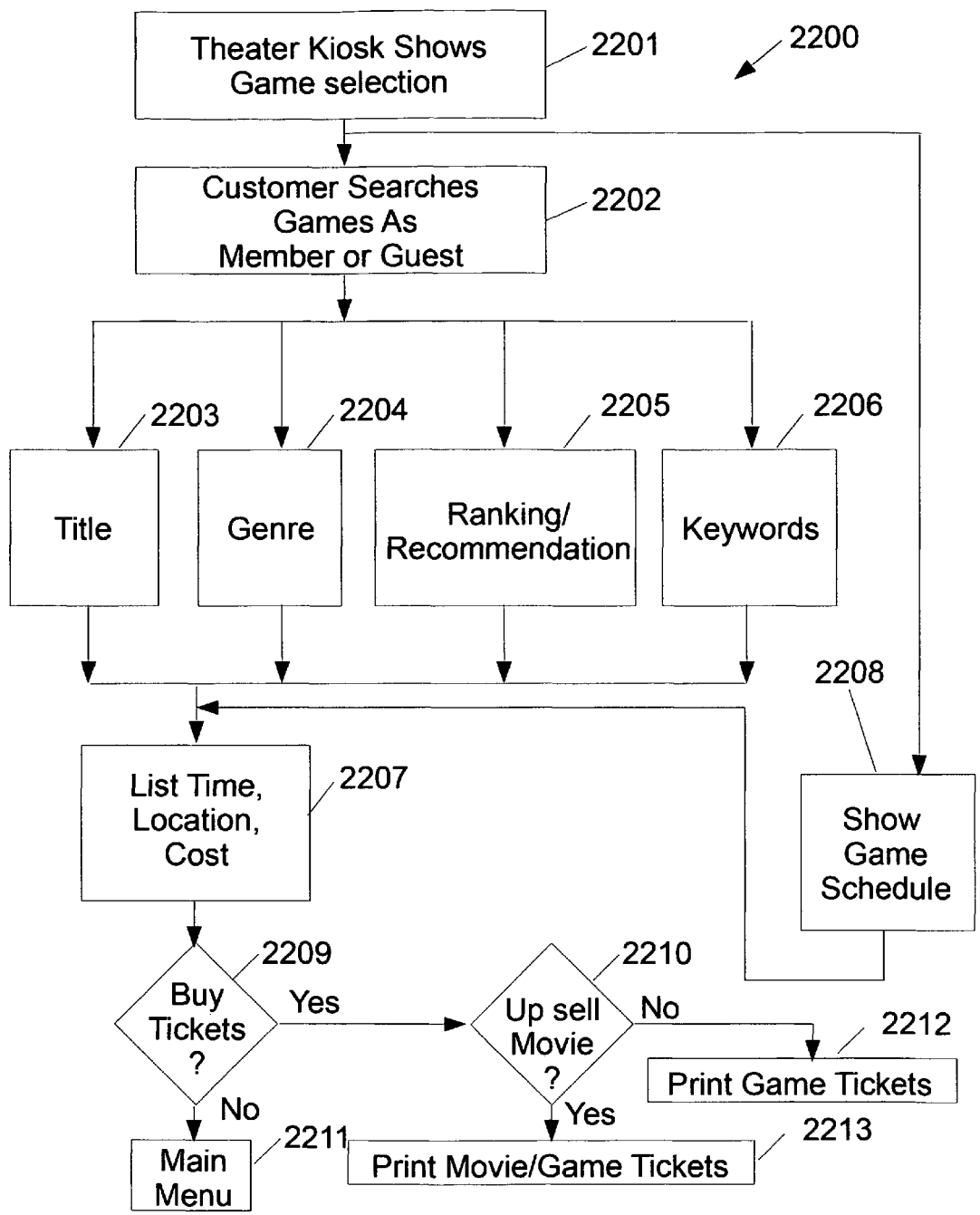
FIG. 31 illustrates a Theater Kiosk 603 Game Search and Ticket Purchase 2200.

FIG. 31 illustrates a Kiosk 603 Game Search and Ticket Purchase. As described in a particular embodiment, using player and game meta information, ratings and group recommendations, a customer is able to search and purchase tickets easily, plus schedule the game or game session so that others, such as a group or buddy list, can be invited along to play the game. In processing block 2201, Theater Kiosk 603 shows a game selection option. In processing block 2202, the customer can search games, as a member or a guest, by various criteria, including title, genre, ranking, keywords, and the like. In processing block 2203, the customer is offered a list of games by title (e.g. Pacman). In processing block 2204, the customer is offered a list of games by genre (e.g. Action/Arcade/Retro). In processing block 2205, the customer is offered a list of games by ranking (most often played by this customer, customer group members, site) and ratings. In processing block 2206, the customer is offered a list of games by description or keywords. In processing block 2207, the customer is offered game time & location (auditorium screen currently played/offered) and cost for a particular game. In processing block 2208, the customer is shown a game schedule when offered (include future times/locations). In decision block 2209, the customer is asked if s/he would like to purchase game tickets. If so, the customer is offered the option to purchase movie tickets also for the next movie showing in the auditorium for the game in decision block 2210. If the customer chooses to buy game and movie tickets, the movie and game tickets are printed in processing block 2213. If the customer chooses not to buy movie tickets, the game tickets are printed in processing block 2212. In processing block 2211, the customer can return back to a main menu (searching movies, games, events, profile/group details).

Figure 32:
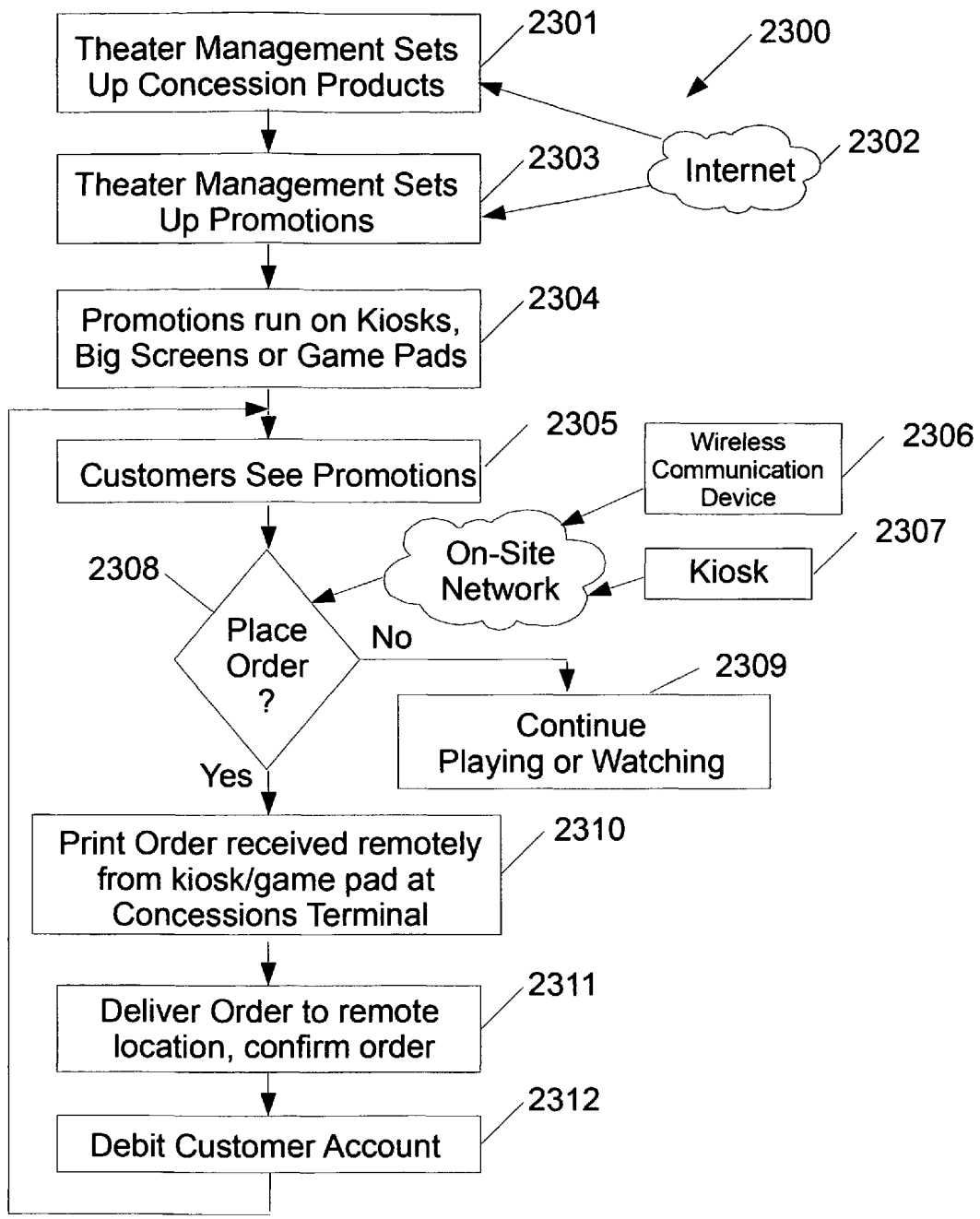
FIG. 32 illustrates a Theater Concession Terminal 604 Product/Service Remote Purchase 2300.

FIG. 32 illustrates a Theater Concession Terminal Product/Service Remote Purchase. As described in a particular embodiment, inventory, advertisement, promotions, ordering, delivery and account debit are handled in a distributed manner, where customers see advertisements and promotions at remote locations (kiosk/auditoriums/wireless communication devices), and then can order those items to have delivered to their seat in the auditorium. In processing block 2301, Theater Management sets up concession products (e.g. inventory and prices). In processing block 2303, Theater Management sets up promotions (price, products, time, event, duration, conditions, quantity), schedules when/how to show promotions (image, video, ticket stub, wireless communication device, auditorium screen, kiosk, web and phone). As part of this process, Theater Management can pull movie schedules, advertiser information/images/video, promotional information, pricing information, product information, and the like from various sources via the Internet 2302. In processing block 2304, promotions run on kiosk 603, big screens and wireless communication devices 6011. In processing block 2305, customers see promotions at the kiosk 603, big screens and wireless communication devices 6011. In processing block 2306, customers may see promotions on the big screen or wireless communication devices 6011 and place an order using wireless communication devices 6011 while seated in one of the auditoriums. In processing block 2307, customers may see promotions while at kiosk 603, and order products/services using kiosk 603, the ordered products/services optionally being provided to the customer when the customer is in attendance at a related event (e.g. movie, game, presentation or general event). Note that product/service orders placed by customers seated in the auditorium(s) using the wireless communication devices 6011 can be communicated wirelessly to the theater concession terminal 604 via the theater access server 101. Product/service orders placed by customers using the kiosk 603 can be communicated wirelessly or directly wired to the theater concession terminal 604. Similarly, confirmations and receipts can be conveyed back to the customers placing orders using wireless communication devices 6011 or kiosk 603 via the two-way communication channels described above. In this manner, a particular embodiment enables wired or wireless communication of promotions or offerings to customers in one or more auditoriums and enables wired or wireless product/service ordering and fulfillment. In decision block 2308, a customer is offered an option to place an order for a product or service using the wireless communication devices 6011 or kiosk 603. If the customer declines the option to order a product/service, the customer may continue chatting, playing a game or watching a movie/videos in processing block 2309. If the customer accepts the option to order a product/service via the wireless communication devices 6011 or the kiosk 603, the customer order is electronically communicated (wired or wirelessly), as described above, to the theater concession terminal 604. In processing block 2310, the customer order is printed or displayed at the concession terminal 604 as received from the remote devices (i.e. wireless communication devices 6011 or kiosk 603). In processing block 2311, the customer order can be delivered by theater management to the ordering customer at a location determined by the kiosk 603 identifier or the wireless communication device 6011 identifier. A confirmation or receipt can be electronically delivered to the customer via the wireless communication devices 6011 or the kiosk 603. If the ordered product/service is for a future event (e.g. advanced scheduled event), the future delivery of the product/service is confirmed with the customer by their sales confirmation code. In processing block 2312, theater management approves or adjusts customer account debit depending on successful delivery of the ordered product/service. Note that the goods/services sold by the Theater Management can include game time (e.g. credit or tokens for use in playing a game) as a concession product A customer can use wireless communication devices 6011 as described above to order game credit for him/herself or game credit for use by another player. In this manner, a first player can use wireless communication devices 6011 to buy game credit for one or more other players. For example, a first player can order game credit for players on his/her buddy list using wireless communication devices 6011. A first player can also order game credit for family members using wireless communication devices 6011.

Figure 33:
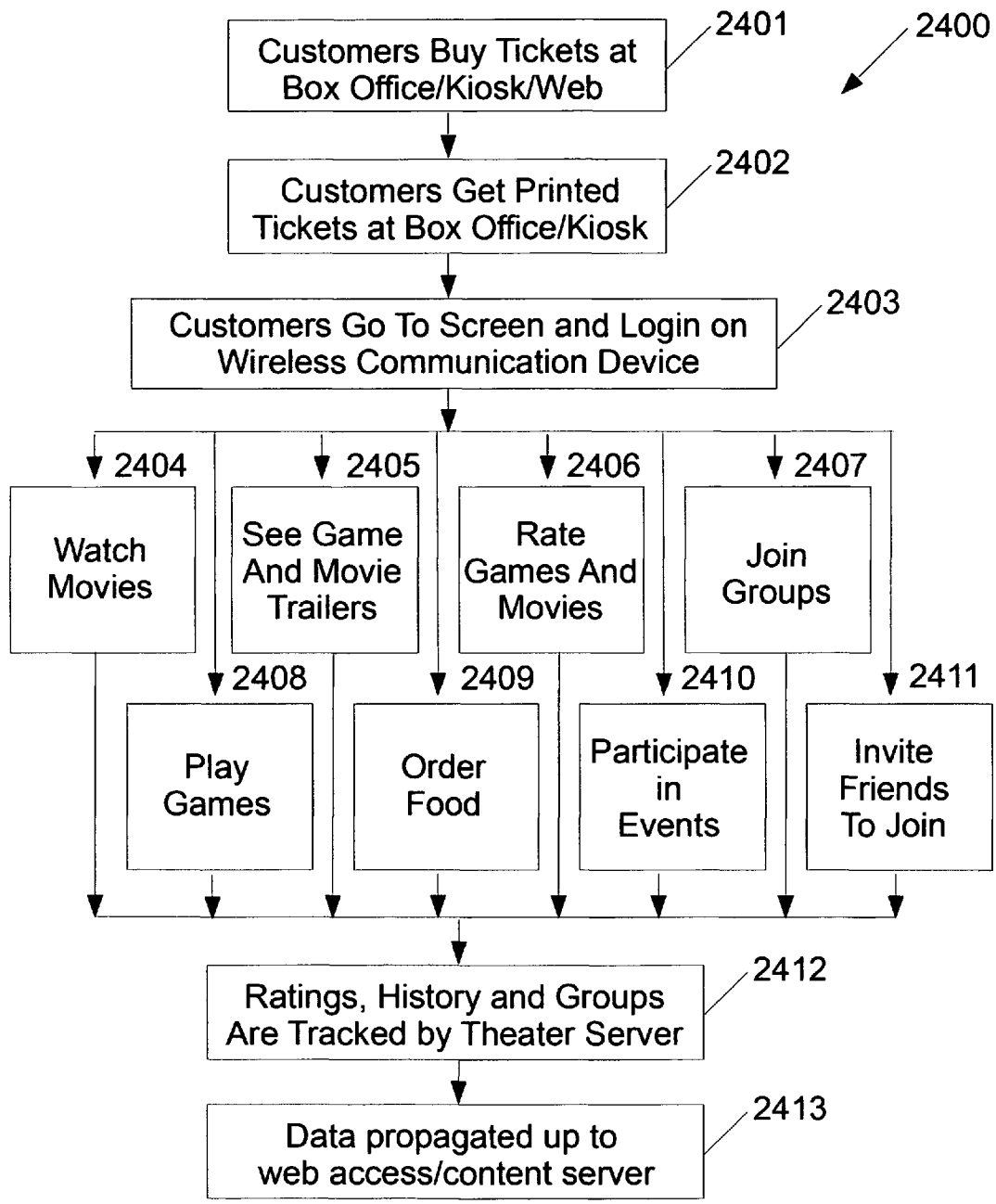
FIG. 33 illustrates a process for Customer Sign In, Purchase, Play and Coming Back to Theater Sites 2400.

FIG. 33 illustrates a process for Customer Sign In, Purchase, Play and Coming Back to Theater Sites. As described in a particular embodiment, wireless communication devices 6011, game servers 6010, theater access servers 101 and the system infrastructure described above enable customers to use profile information, community group membership, ratings and rankings to participate at events, purchase products/services while at events, chat with friends at events, or invite their friends to events. In processing block 2401, customers may buy tickets at a box office, kiosk 603, or via the Internet (e.g. WWW). In processing block 2402, customers receive a printed ticket at the box office, kiosk 603, or via mail (e.g. web orders option). In processing block 2403, customers go into a theater auditorium enabled with the functionality described herein and log into a wireless communication device 6011 using their ticket session/event code (optional for guests/movie only watchers). Once logged in, customers may choose from a variety of options, including viewing/editing their customer profiles. In processing block 2404, customers may select an option to watch a movie. In processing block 2405, customers may select an option to see game & movie trailers. In processing block 2406, customers may select an option to rate games and movies. In processing block 2407, customers may select an option to join one or more groups. In processing block 2408, customers may select an option to play games in progress (already being played by other players) or to play available games (not already being played by other players), selected games being playable both locally and with remote players. In processing block 2409, customers may select an option to order products/services, such as food from concessions (described above in connection with FIG. 23). In processing block 2410, customers may select an option to participate in events, such as presentations, educational/technical training, or survey/polls. In processing block 2411, customers may select an option to chat or invite friends (e.g. SMS text messages) to join them in the event. In processing block 2412, comments and ratings on the events are tracked for future customers, events and advertisements/promotions. In processing block 2413, data is propagated up to the web access/content server 301.

Figure 34:
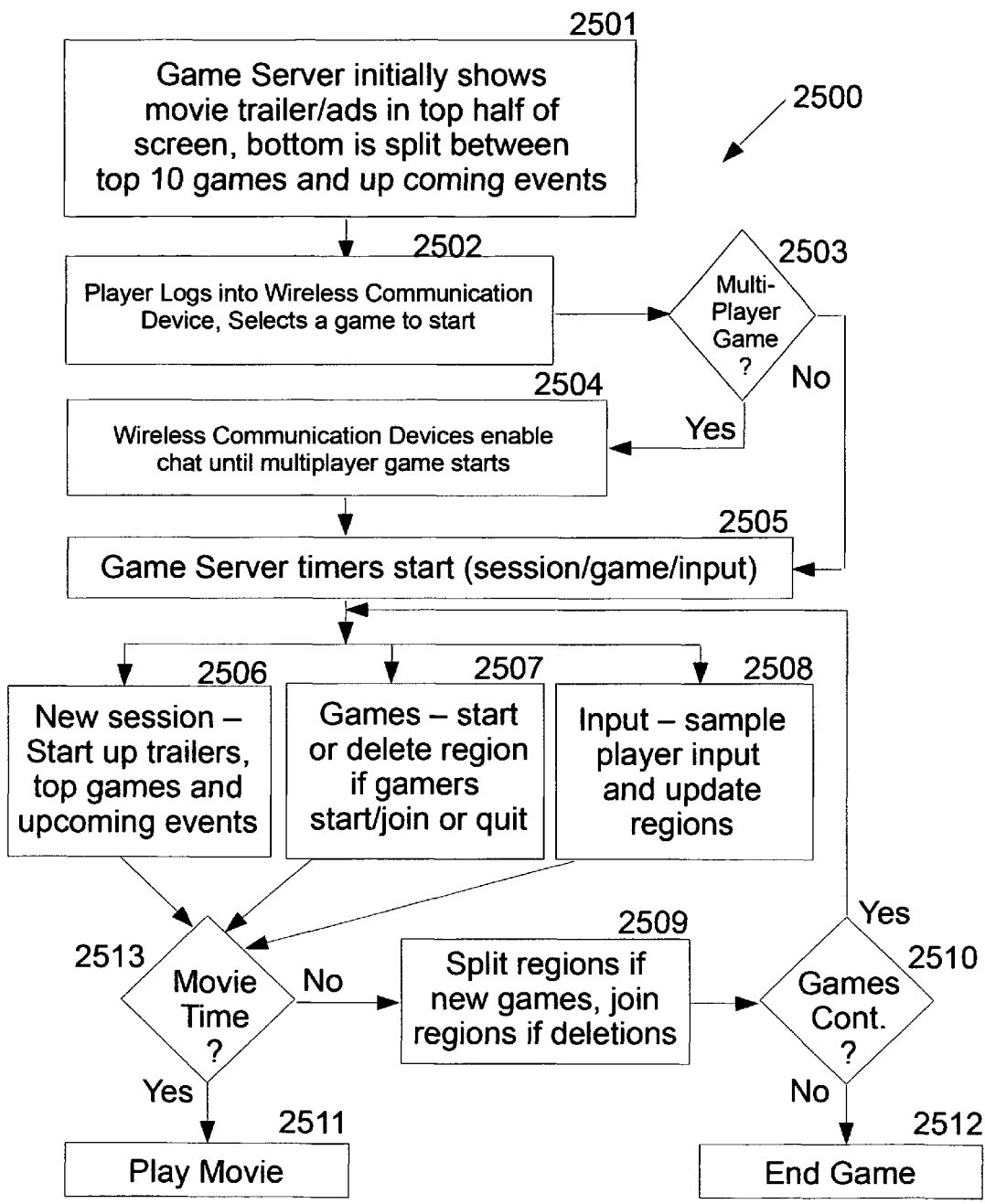
FIG. 34 illustrates a process for large, shared auditorium screen start up and player start 2500.

FIG. 34 illustrates a process for large, shared auditorium screen start up and player start. In a home setting, the shared screen is not as large as a theater auditorium display screen. However, the screen is still shared by a plurality of viewers. Thus, the term, 'shared screen' can be considered to cover both the large, shared auditorium screen and a shared home screen. As described in a particular embodiment, the use of the large shared auditorium screen is demand based, unless reserved for a particular event, which supports multiple either demand selection based or pre-selected by theater management multimedia steams (movies, trailers, advertisements, games, or presentations), where a timer is started by the Game Server 6010 that ranks & merges display regions depending on configuration settings. In process 2500, the large, shared auditorium screen supports multiple either demand selection based or pre-selected by theater management multimedia streams. The individual, private small wireless communication device 6011 display screens can be used for customer login as a player/participant, entering input, chatting with buddies, team mates and group members, plus local applications for the wireless communication devices 6011, such as theater management help and product or service order placement for delivery to customers seated in the auditorium(s). In processing block 2501, the game server initially shows movie trailer/advertisements in the top half of the large, shared auditorium screen. The lower display regions are split between listing the top ten games and up-coming events. The bottom status bar 707 denotes the next movie title and time of showing. In processing block 2502, the customer comes into an auditorium with a ticket, selects a seat and activates his/her wireless communication device 6011, uses his/her wireless communication devices 6011 to log in with the ticket session code and/or a published SMS telephone number, and selects a game to play (searching by title, genre, descriptions or such, as described above). Alternatively, the session code and/or a published SMS telephone number can be game-specific. In this case, the SMS messaging to the particular telephone number implicitly selects the game. In decision block 2503, the customer may select a multiplayer game explicitly or implicitly as described above. If a multiplayer game is selected, processing continues at processing block 2504. If a multiplayer game is not selected, processing continues at processing block 2505. In processing block 2504, for a multiplayer game, the wireless communication devices 6011 enable chatting amongst other customers until a game starts or during a game. In processing block 2505, the Game Server 6010 starts a timer for the large screen display regions and content, and updates status bar region 707. In processing block 2506, if this is a new session (e.g. start of day, after a movie finishes, all previous games/events have finished), then start up the selected game in the upper tri-mode 809 with a movie/advertisement in full width in the top horizontal portion of screen, and the lower portion of the screen split into two sections—top games offered and up-coming events. The status bar 707 notes in a scrolling marquee style the title of the next movie showing and a count down of time to go until start of the movie, or other status such as players/groups signing in and starting up of multimedia content. In processing block 2507, if other games are started, then the other games get displayed in smaller display regions of the large auditorium screen, such as lower quadrants. When Game Server 6010 timers expire or other games end and the current game persists past the other games due to paid players still being in the game, the display region of the large auditorium screen allocated to the persisting game may get promoted to being a larger display region (e.g. growing left, growing right, filling the width or height of the screen, or filling the whole screen). Otherwise, if games end due to players dropping out of the game, the movie starts, or the paid time expires, the display regions allocated to the expiring games may be deleted to allow other display regions to be promoted space-wise or new games be started. In decision block 2513, the system checks to determine if it is time to show a movie on the large screen in this auditorium. If it is time to show a movie on the large screen, processing continues at processing block 2511. Otherwise, processing continues at processing block 2509. In processing block 2509, the large auditorium screen is allocated to games and/or promotions prior to the start of a movie. As described above, the large screen can be split into various display regions as new games begin or current games expire. In decision block 2510, Game Server 6010 determines if each of the current games can continue to be played. This determination is based on whether players have paid sufficient credit for the game. Players who have paid for sufficient game time beyond the current session are allowed to keep those player session streams with possible splitting of display regions for other games. Players who have not paid for sufficient game time are not allowed to continue playing the game and the game stream is terminated. Game play continues for paid sessions. In processing block 2511, the movie is ready to begin so all display regions on the large auditorium screen merge back and just the movie shows on the large screen as normal. In processing block 2512, if there are no paid sessions, all display regions revert back to a pre-selected default display region configuration.

Figure 35:
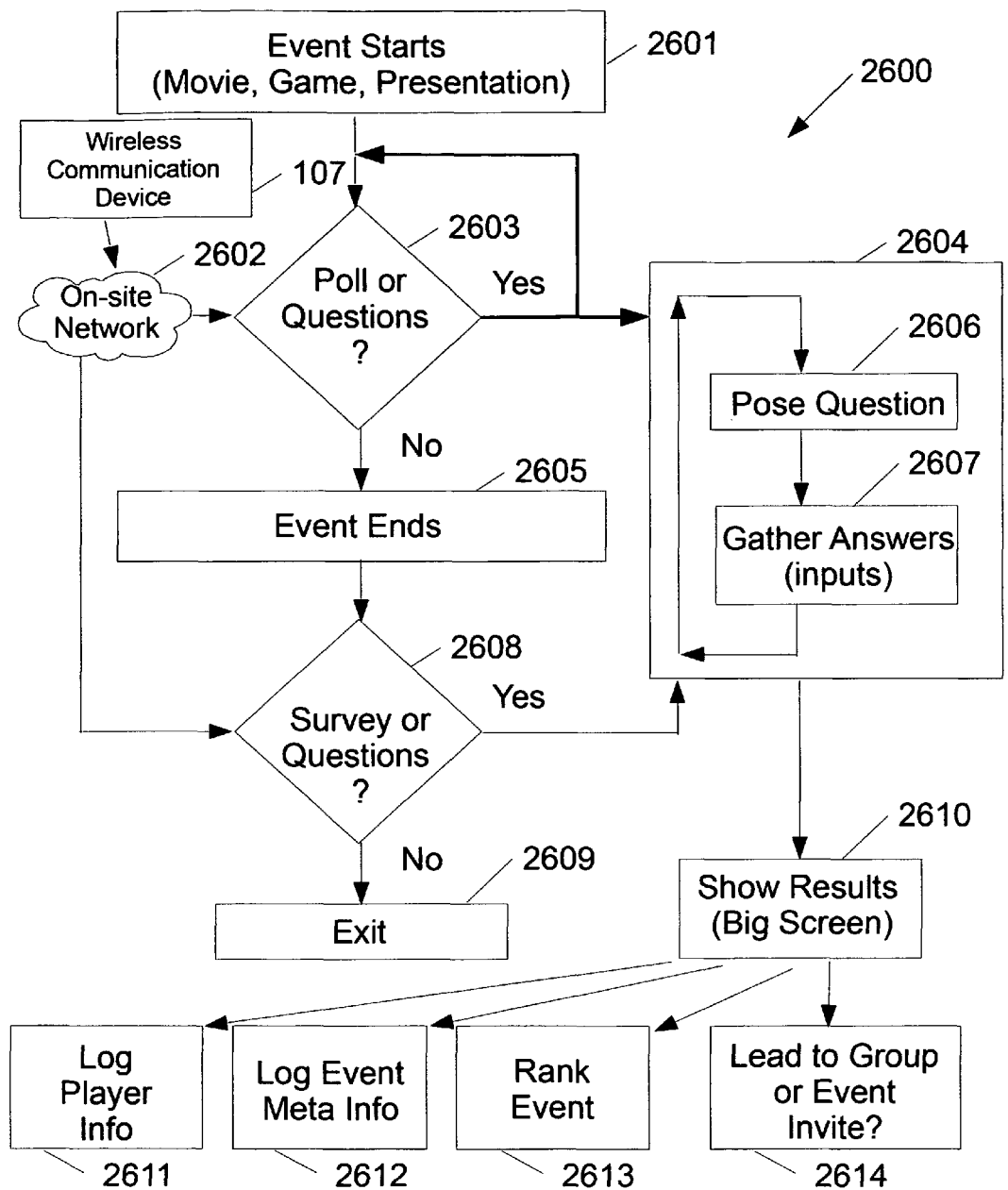
FIG. 35 illustrates a process for polling, and prompting for answers to questionnaires and ratings 2600.

FIG. 35 illustrates a process for polling, and prompting for answers to questionnaires and ratings. As described in a particular embodiment, requesting customer feedback on events, such as movies and games, allows for recommendations, based in part by audience statistics and profiles, as well as historical profiling based on attendance, event/sales causality and customer/group involvement Game player activity during advertisements as well as limited time offers or reward based behavior may lead to benefits for event content/scheduling as well as higher revenues from advertisers targeting their market demographics and profiles. In processing block 2601, an event starts (e.g. Movie, Game, Presentation). Network data traffic can be received from wireless communication devices 6011 via the system described above. In decision block 2603, customers are prompted to participate in a poll or questionnaire during an event. If customers choose to participate during the event, processing continues at processing block 2604. In decision block 2603, processing loops back to decision block 2603 for each question in the poll or questionnaire. In processing block 2604, a question or other input may be presented to event participants (processing block 2606) and related answers are gathered, for example via the wireless communication devices 6011 (processing block 2607). In processing block 2606, the wireless communication devices 6011 may display a poll or survey question. In processing block 2607, input from customers/players is obtained from their wireless communication devices 6011. In processing block 2605, the event ends, which may trigger an end survey or rating questions. In processing block 2608, customers are prompted to participate in a post-event survey or questionnaire after an event. If customers choose to participate after the event, processing continues at processing block 2604 where questions are asked and answers are obtained. In processing block 2609, if a customer wishes to skip the poll/survey, then wireless communication devices 6011 may automatically log them out, perhaps based on their schedule. In processing block 2610, poll or survey questions may be shown on the large shared auditorium screen. In processing block 2611, the theater access server 101 logs customer/player information received from Game Server 6010. This customer/player information can include paid attendance, wireless communication device usage, product/service purchases, game purchase/usage, poll/survey information from the customer/player, profile information provided by the customer/player, and related customer-specific information. This customer/player specific information can be transferred to web access/content servers 301 for aggregation with other user information and use in better targeting content, advertising, and promotions for specific audiences. In processing block 2612, event meta information is also logged and transferred to theater access server 101 and to web access/content server 301. This event-specific information can include paid attendance, wireless communication device usage, and poll/surveys submitted. In processing block 2613, the event is ranked based on survey results and the ranking is sent to theater access server 101 and web access/content server 301. Further, the event is categorized under both customers/players and groups. In processing block 2614, wireless communication devices 6011, kiosk 603, or a conventional text message may be used to invite event participants to join a group, if they hosted the event and have set up such, provided that members profiles allows such action.

Figure 36:
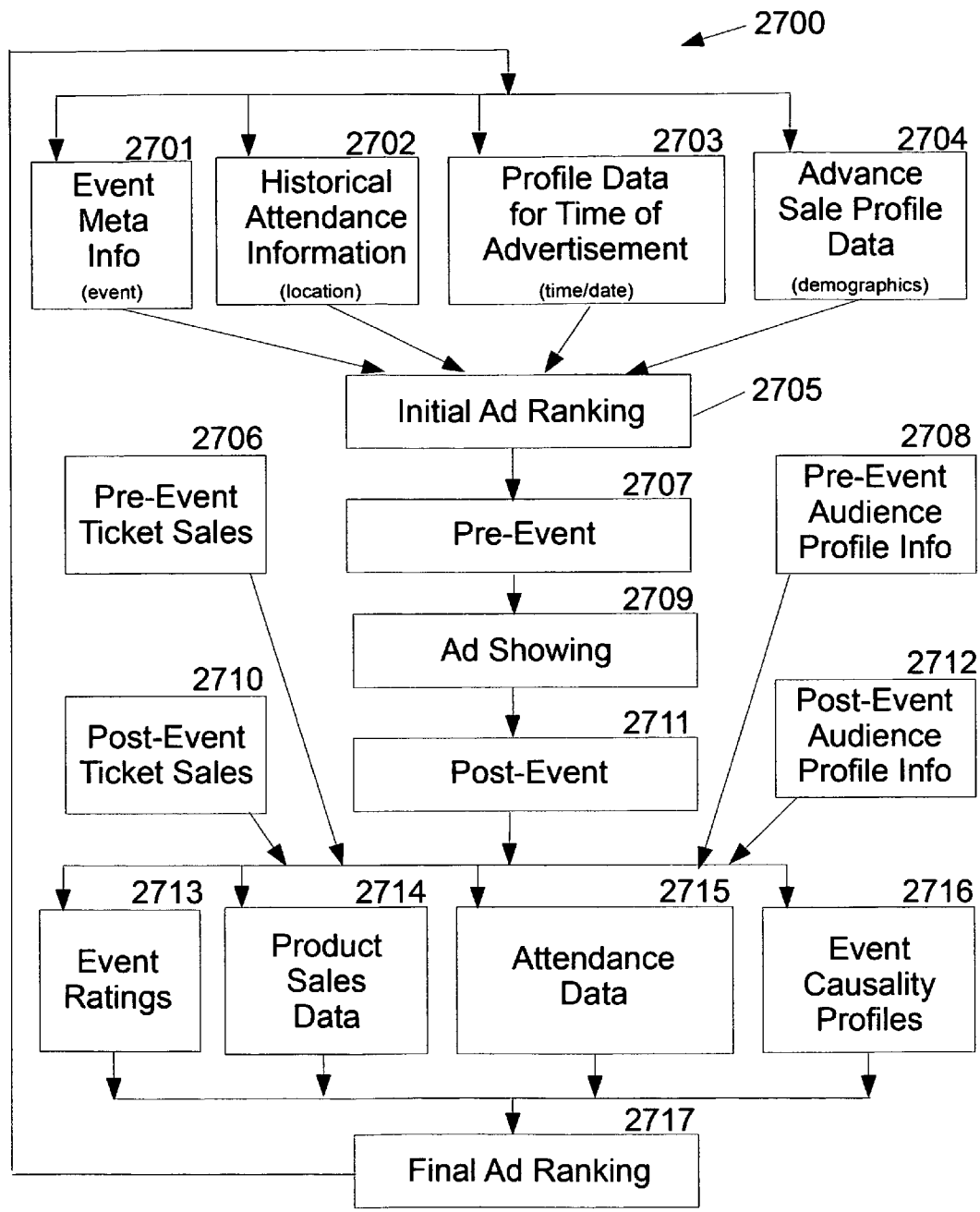
FIG. 36 illustrates a process for advertising and advertisements 2700.

FIG. 36 illustrates a process for advertising and advertisements. As described in a particular embodiment, advertisement can be driven both by normal means as event/location schedule and content information, but also using advanced business analytical methods that profiles customers in terms of choices offered, actions taken, affiliation or influence, in a feed back manner allowing both historical as well as predicted results expected. In processing block 2701, event meta information such as scheduled time, location and topic can lead to an initial advertisement ranking. In processing block 2702, Historical event attendance information (both regular "guest" ticket sales and member ticket sales) can also lead to an initial advertisement ranking. In processing block 2703, both member and group profile data (e.g. comparing to similar data previously, such as time slot, location, content type) can also lead to an initial advertisement ranking. In processing block 2704, advance sale profile data can also lead to an initial advertisement ranking. In processing block 2705, the system generates a range of initial advertisement rankings based on content, time, and location. In processing block 2706, pre-event ticket sales information (e.g. attendance numbers for games leading to movie ticket sales, etc.) can be used to rank an advertisement. In processing block 2707, a pre-event occurs, such as a trailer or games before a movie. In processing block 2708, pre-event audience profile information (such as member profile information or group details) may influence future advertisements scheduled, such as advertisements between this event and the next event. In processing block 2709, the advertisement is shown. In processing block 2710, post-event ticket sales information (number, interval of actual sales, location/method of sale, etc.) leads to a refinement of the historical event advertisement correlation. In processing block 2711, a post-event occurs. In processing block 2712, post-event audience profile information is also used for tracking actual attendance metrics. In processing block 2713, Theater Access Server 101 and remote web access/content servers 301 update databases with sales data. In processing block 2714, Theater Access Server 101 and remote web access/content servers 301 update databases with event ratings. In processing block 2715, Theater Access Server 101 and remote web access/content servers 301 update databases with attendance data. In processing block 2716, Theater Access Server 101 and remote web access/content servers 301 update databases with advance sales profile data. In processing block 2717, the initial advertisement ranking is compared with other initial rankings for analytical modelling.

Figure 37:
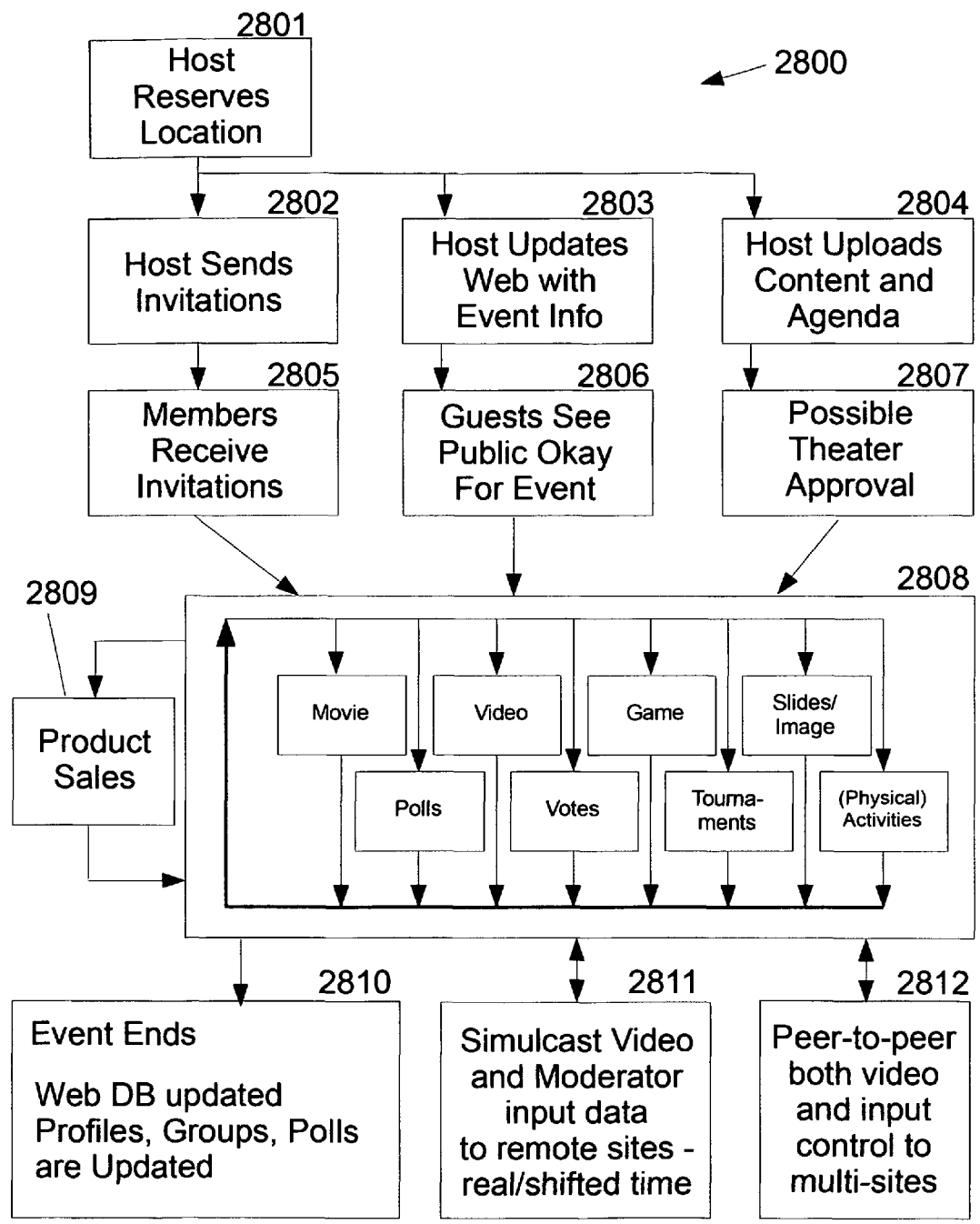
FIG. 37 illustrates a process for handling general events 2800.

FIG. 37 illustrates a process for handling general events. As described in a particular embodiment, a paid member or member group may be allowed to host an event in a theater like environment with wireless communication devices to present information to attendees and to receive feedback in real-time from the attendees. Various embodiments provide a convenient and efficient forum for conducting, for example, polls/surveys or focus groups. Various embodiments can enable educational, technical, or governmental activities/ events to occur with the means to gather participant information, individual/aggregate responses, and attendee feedback. The described system provides an efficient means of conducting certification, tests or steering governmental bodies in future directions. This is possible due to the features and capabilities of the various embodiments described herein to display shared information on an auditorium screen while displaying personal/confidential information on secure wireless communication devices 6011. Further, wireless communication device 6011 input mechanisms can support ad-hoc, mobile environments and related events. In processing block 2801, a host (member or group) reserves an auditorium screen location and time for an event, filing in details such as event name, description, hosting group (member), URL, keywords, cost, duration, pre-requisites, objectives and possible take aways. In processing block 2802, the host sends out invitations to proposed attendees (e.g. via messages to group members "inbox", phone SMS text messages, or email, RSS feed, etc.). In processing block 2803, the host updates the web (e.g. a website or blog) with event information. In processing block 2804, the host uploads, through a web-connected PC, event content and event agenda. In processing block 2805, proposed attendees and/or members (i.e. guests) receive invitations to the event. In processing block 2806, guests can search or view the event schedule (e.g. as made available at a host website), if the event is marked as a public event, perhaps joining a member group if required. In processing block 2807, Theater Management may require prior approval for the event (agendas) before the event is actually scheduled/ visible. In processing block 2808, the event begins at the theater location/time, possibly using split screens of images, videos, presentations, games, polls, surveys, tournaments, and the input devices from wireless communication devices 6011 as described above. The event may also span multiple locations either via simulcast or via a fully interactive two-directional data feed. In processing block 2809, wireless communication devices 6011 can be used to perform interactive functions, such as product/service ordering via theater concession terminals 604 as described above. Additionally, wireless communication devices 6011 can be used to alert auditorium management to report audio/visual quality, audience disturbances, or other issues. In processing block 2810, when the event ends, the theater access server 101 and web access/content server 301 update their databases on profiles of participants (member and group levels), polls and surveys/ tests, where some data may be returned (aggregate) to a event host organizer. In processing block 2811, one or more event multimedia steams (e.g. video, recorded sounds) may be transmitted to remote location in a simulcast fashion for other sites to (passively) observe content (such as a technical/educational seminar or lab). In processing block 2812, event multimedia stream(s) may be sent in peer-to-peer communication to other auditorium(s) on-site or off-site to enable two or more auditorium sites to collectively participate in event content.

Figure 38:
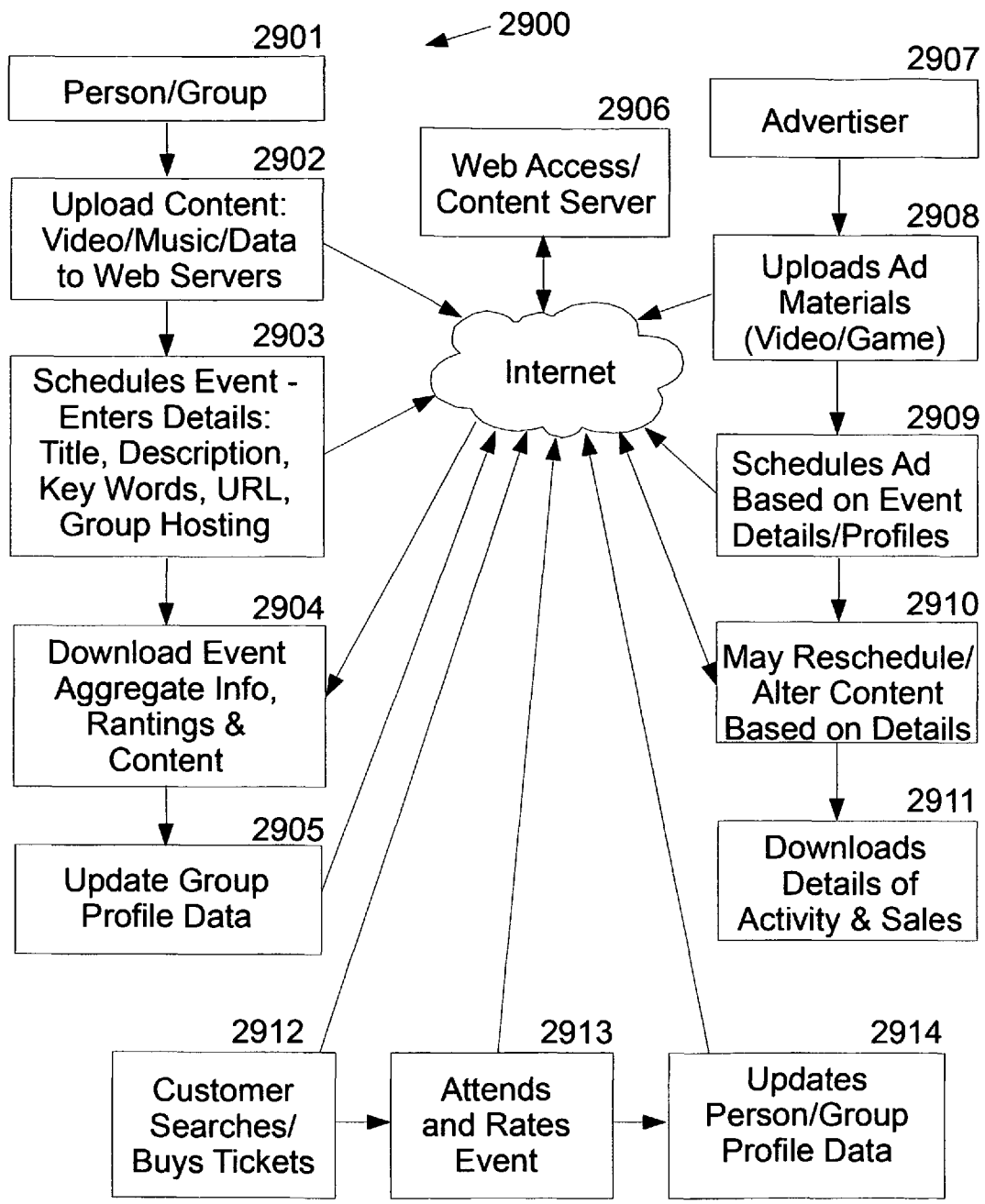
FIG. 38 illustrates a process for content upload/download 2900.

FIG. 38 illustrates a process for content upload/download. As described in a particular embodiment, the system enables a person or group to upload/download content in an efficient manner for public presentation/interaction, to collect survey or polled information, to optionally charge participants, to gather (aggregate) attendance information, and to advertise this event with group affiliation where attendees can both rank and rate content. In processing blocks 2901 and 2902, a person or group can upload content such as images, videos, games or data to web access/content server 301 for an event. In processing block 2903, a host can schedule an event by entering details such as title, description, key words, URL, name of group hosting event, cost and setting public or group only admittance. In processing block 2904, after an event occurs, an authorized person or group can download event data, such as ratings, surveys/tests, and content if modified. In processing block 2905, web access/content server 301 updates group profile data based on sales and participation data from theater access server 101, which includes participant ratings and comments. In processing block 2906, web access/content server 301 hosts content for events and pushes that data to theater sites that have events scheduled. In processing blocks 2907 and 2908, an advertiser can upload advertisement materials (e.g. images, video, presentations, game application data, and the like). In processing block 2909, the advertiser can schedule the advertisement based on event details, schedules and ranking or cost basis. In processing block 2910, the advertiser may reschedule an advertisement based on real time metrics, such as ranking changes (e.g. attendance, pre-event ratings, etc.). In processing block 2911, after the event and corresponding advertisement(s) run, the advertiser downloads (aggregate) details of the event activity, plus sales information (if product/service was on site or an event prerequisite). In processing block 2912, customers can search and buy event tickets from the web, box office 602 or kiosk 603. In processing block 2913, the customer attends and possibly rates the event. In processing block 2914, after attending an event, theater access server 101 and web access/ content server 301 update member and associated group profile details.

Figure 39:
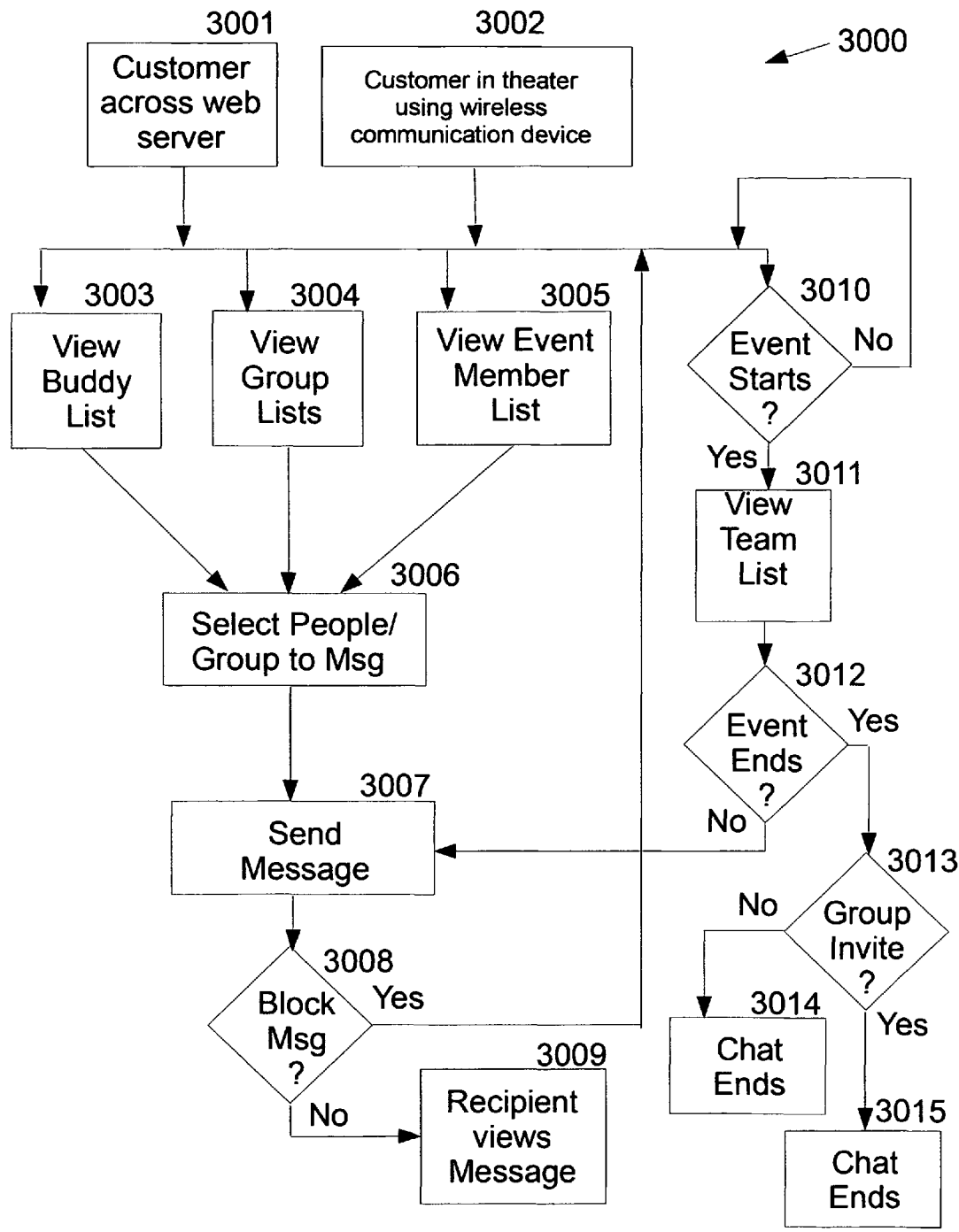
FIG. 39 illustrates a process for player chat (wireless/wired) 3000.

FIG. 39 illustrates a process for player chat (wireless/ wired). As described in a particular embodiment, the system enables customers (e.g. players at a gaming event) to search for buddies or group members, send messages to individuals, groups or team members during game play from a wireless communication device that may involve sending messages across a network, such as the Internet to remote theater sites. The method also queues up messages for participants who have not arrived at an event yet. In this case, the absent participants appear as ghosts in a computer-generated virtual space until the absent participants arrive. Upon arrival, the participants may receive and scroll through received messages for possibly sending response messages. In processing block 3001, a remote customer can access the system via the web from a remote theater location. The remote customer can perform several functions while remotely connected. In processing block 3002, a local customer in attendance at a theater site hosting a game session using a wireless communication device 6011 can perform several functions while locally connected. In processing block 3003, local or remote customers can view buddy list members. The state of members on the buddy list may be off-line, absent, on-line, or busy. The buddy list is typically based on the member logged into the wireless communication device 6011. Member profiles control whether others can view specific information in general or by event. In processing block 3004, local or remote customers can view group list(s). The state of group members may be off-line, absent, on-line, or busy. Groups are searchable by group name, description, and key words. Group properties can control view specific information in general, by event type or keywords or by viewer member/group affiliation. In processing block 3005, local or remote customers can view event list members. The event list member state may be off-line, absent, on-line, or busy. Event members may control viewability permissions based on event, member attempting view, group hosting event, or group affiliation attempting view. In processing block 3006, the customer or player, after logging into the wireless communication device 6011, can then select a member or group members to whom a chat message can be sent. In processing block 3007, a chat message is sent from the wireless communication device 6011 (e.g. via SMS messaging as described above) to Game Server 6010. If the location dictates, the chat message can be sent on to theater access server 101, web access/content server 301 and back down to a remote site theater access server 101, Game Server 6010, and finally to the remote member's wireless communication device 6011. In decision block 3008, the game servers 6010 (either local or remote site) can block messages depending on a (remote) member's privacy settings. In processing block 3009, if the recipient has not blocked the messages, the message can show up on the receiving member's wireless communication device 6011 on which the receiving member is logged in. In decision block 3010, if an event starts, then in processing block 3011, the viewing game team member list is available to search for sending member messages. In decision block 3012, when an event (e.g. game session) ends, then the team list discontinues and messages are send-able on a member to member basis only. In decision block 3013, after an event has ended, the group (e.g. officer/administrators for the group) may send out group invites or messages to attendees. In processing block 3014, if a member blocks group invites or a group hosting event message, then the group invite message is not sent to that member. In processing block 3015, if the member does not block group invites or group hosting event messages, then a group invite may be sent to the member and the member receiving the invite may respond (if not already in the group hosting event).

FIGS. 8-11 show a diagrammatic representation of a machine in the example form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server, if described herein as such, or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The software executed by these machines may be resident in the machine or transmitted or received over a network via network interface devices utilizing any one of a number of well-known transfer protocols (e.g., HTTP). Storage device 905 can be used as a machine-readable storage medium for the storage and retrieval of software implemented with the various embodiments described herein.

While the machine-readable storage medium described herein is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived there from, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Thus, computer-implemented systems and methods supporting multiple networked users in a shared venue using short messaging service communication have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
    a central display system comprising a shared screen in proximity to the central display system, the system configured to receive Short Messaging Service (SMS) messages, the shared screen configured to display a real-time shared view of a common event based on the received SMS messages, the common event comprising an interactive event shared between a plurality of users, the shared screen comprising a plurality of display regions, wherein each display region of the plurality of display regions displays different content associated with the common event; and
    a plurality of communication devices associated with the plurality of users, the devices including a display, the display displaying a personal view of the common event, the personal view being different than the shared view, the devices configured to affect the common event by transmitting SMS messages to the central display system,
    wherein the central display system is viewable by two or more users of the plurality of communication devices.

2. The system as claimed in claim 1 wherein the plurality of communication devices are in wireless data communication with the central display system.

3. The system as claimed in claim 1 wherein the central display system retains identification information for at least one of the plurality of communication devices.

4. The system as claimed in claim 1 wherein the central display system retains profile information for at least one user of one of the plurality of communication devices.

5. The system as claimed in claim 4 wherein the central display system retains loyalty program information for the at least one user of the plurality of communication devices.

6. The system as claimed in claim 1 wherein at least one of the plurality of communication devices includes functionality to initiate a product/service transaction.

7. The system as claimed in claim 6 wherein the central display system includes functionality to access a server to authenticate the product/service transaction.

8. The system as claimed in claim 1 wherein at least one of the plurality of communication devices is configured to display common event status to a user.

9. The system as claimed in claim 1 wherein at least one of the plurality of communication devices is configured to display a promotion to a user.

10. The system as claimed in claim 1 wherein at least one of the plurality of communication devices includes functionality to enable a user of the at least one communication devices to join the common event.

11. The system as claimed in claim 1 wherein at least one of the plurality of communication devices includes functionality to enable a user of the at least one communication device to join a group.

12. The system as claimed in claim 1 wherein at least one of the plurality of communication devices is remotely located relative to the central display system.

13. The system as claimed in claim 6 wherein the central display system includes functionality to access a server to convey information to users of the plurality of communication devices.

14. The system as claimed in claim 1 further including:
    a theater access server in data communication with the central display system; and
    a kiosk in data communication with the theater access server, the kiosk including functionality to process profile information for users of the plurality of communication devices.

15. The system as claimed in claim 1 further including:
    a theater access server in data communication with the central display system; and
    a theater concession terminal in data communication with the theater access server to respond to a product/service request from a user of one of the plurality of communication devices.

16. The system as claimed in claim 1 wherein the common event is a game, and wherein the central display system includes functionality to prepare a message to a user of one of the plurality of communication devices that includes an IP address and port identifier that the user can use to play the game via a TCP/IP connection.

17. The system as claimed in claim 1 wherein the common event is a game, and wherein the central display system includes functionality to prepare a message to a user of one of the plurality of communication devices includes a web URL that the user can use to download software to play the game via a TCP/IP connection.

18. An apparatus comprising:
    a central server hosting an activity for a plurality of participants, the participants having respective communication devices, the communication devices including a messaging transceiver and a local screen;
    the central server in data communication with a display system during the activity, the display system in proximity to the central server, the display system including a shared screen, the shared screen comprising a physical screen being commonly viewable by at least two of the plurality of participants of the activity, at least a portion of the activity being displayable on the shared screen and other portions of the activity being concurrently displayable on the local screens of the respective communication devices, the shared screen comprising a plurality of display regions, wherein each display region of the plurality of display regions displays different content associated with the activity; and
    the central server in data communication with the respective communication devices of the plurality of participants, each communication device configured to convey options and selections between the communication device and the central server with one or more text messages according to a Short Messaging Service (SMS) text messaging protocol, each communication device including functionality for the participants to use text messaging to interact with the activity controlled by the central server, the shared screen not being one of the plurality of communication devices.

19. A method comprising:

hosting an activity on a central server for a plurality of participants;

communicating between the central server and a display system in proximity to the central server, the display system including a shared screen, the shared screen being commonly viewable by at least two of the plurality of participants of the activity, at least a portion of the activity being displayable on the shared screen, wherein the shared screen comprises a plurality of display regions such that each display region of the plurality of display regions displays different content associated with the activity;

communicating between the central server and a plurality of communication devices, for use by the plurality of participants, at least one of the communication devices including a text messaging transceiver, at least one of the communication devices including functionality for the participants to use text messaging to interact with the activity controlled by the central server, at least one of the communication devices including functionality to concurrently display another portion of the activity via a local screen; and conveying options and selections between the communication device and the central server with one or more text messages according to a Short Messaging Service (SMS) text messaging protocol, the shared screen not being one of the plurality of communication devices.

20. The method as claimed in claim 19, further comprising initiating a product/service transaction on a particular communication device.

21. The method as claimed in claim 19, further comprising displaying a promotion to a user on a communication device of the user.

22. The method as claimed in claim 19, further comprising displaying a status of one or more members of a user's buddy list on a communication device for the user.

* * * * *